(12) United States Patent
Itagaki et al.

(10) Patent No.: US 10,548,076 B2
(45) Date of Patent: Jan. 28, 2020

(54) INFORMATION PROCESSING APPARATUS AND INFORMATION PROCESSING METHOD

(71) Applicant: SONY CORPORATION, Tokyo (JP)

(72) Inventors: Takeshi Itagaki, Saitama (JP); Tomoya Yamaura, Tokyo (JP); Yuichi Morioka, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/742,257

(22) PCT Filed: Jun. 9, 2016

(86) PCT No.: PCT/JP2016/067168
§ 371 (c)(1),
(2) Date: Jan. 5, 2018

(87) PCT Pub. No.: WO2017/038193
PCT Pub. Date: Mar. 9, 2017

(65) Prior Publication Data
US 2018/0206186 A1    Jul. 19, 2018

(30) Foreign Application Priority Data

Aug. 28, 2015  (JP) ................................ 2015-169116
Nov. 2, 2015  (JP) ................................ 2015-215417

(51) Int. Cl.
*H04W 52/02* (2009.01)
*H04W 74/08* (2009.01)
(Continued)

(52) U.S. Cl.
CPC ...... *H04W 52/0203* (2013.01); *H04B 17/318* (2015.01); *H04W 28/0247* (2013.01);
(Continued)

(58) Field of Classification Search
None
See application file for complete search history.

(56) References Cited

U.S. PATENT DOCUMENTS

| 2006/0046739 A1* | 3/2006 | Blosco ................. H04W 28/18 455/453 |
| 2008/0069041 A1 | 3/2008 | Tandai et al. |
| 2009/0154487 A1* | 6/2009 | Ryan ................... H04L 12/4035 370/445 |

(Continued)

FOREIGN PATENT DOCUMENTS

| JP | 2007-134905 A | 5/2007 |
| JP | 2008-78807 A | 4/2008 |
| JP | 2014-39287 A | 2/2014 |

OTHER PUBLICATIONS

International Search Report dated Aug. 30, 2016, in PCT/JP2016/067168 filed Jun. 9, 2016.

(Continued)

*Primary Examiner* — Candal Elpenord
(74) *Attorney, Agent, or Firm* — Xsensus, LLP

(57) ABSTRACT

A wireless resource is utilized efficiently.
An information processing apparatus is an information processing apparatus that includes a control unit. The control unit provided in the information processing apparatus performs control for aborting, when a packet decided to be transmitted from a second network different from a first network to which the own apparatus belongs is detected, reception of the packet. Further, the control unit provided in the information processing apparatus performs control for dealing with carrier sense as an idle state based on a reception strength of the packet decided to be transmitted from the second network.

18 Claims, 33 Drawing Sheets

(51) Int. Cl.
H04W 48/16 (2009.01)
H04B 17/318 (2015.01)
H04W 88/16 (2009.01)
H04W 28/02 (2009.01)

(52) U.S. Cl.
CPC ....... *H04W 48/16* (2013.01); *H04W 74/0816* (2013.01); *H04W 88/16* (2013.01)

(56) References Cited

U.S. PATENT DOCUMENTS

| | | | |
|---|---|---|---|
| 2010/0080173 A1* | 4/2010 | Takagi | H04L 27/0006 370/328 |
| 2011/0044257 A1* | 2/2011 | Utsunomiya | H04W 72/082 370/329 |
| 2011/0085612 A1 | 4/2011 | Muraoka et al. | |
| 2016/0143058 A1* | 5/2016 | Son | H04B 17/318 370/329 |
| 2017/0013482 A1* | 1/2017 | Tandai | H04L 5/0048 |

OTHER PUBLICATIONS

Shinohara, Shoko et al., "Improvement of receiver behavior for dynamic sensitivity control technique in high efficiency wireless LAN", The Institute of Electronics, Information Andcommunication Engineers, IEICE Technical Report, cq2015-66, (2015), pp. 155-160, with English Translation.

Nakahira, Toshiro et al., "Multicast Evaluation of High Efficiency Wlan with Centralized Control of CCA Threshold and Receiving Sensitivity", IEICE, (2015), p. 351, with English Translation.

Masahito Mori (Sony): "Performance Analysis of BSS Color and DSC", IEEE vol. 802.11-15/0045r0, Jan. 12, 2015 (Jan. 12, 2015), pp. 1-14, XP068082559.

Yongho Seok (Newracom): "NAV Operation for Spatial Reuse"; IEEE vol. 802.11-15/0797r0, Jul. 10, 2015 (Jul. 11, 2015), pp. 1-14, XP068094688.

Laurent Cariou (Orange): "OBSS Reuse mechanism which preserves fairness"; IEEE vol. 802.11-14/1207r0, Sep. 15, 2014 (Sep. 15, 2014), pp. 1-17, XP068071030, [retrieved on Sep. 15, 2014].

Masahito Mori (Sony): "Impact of TPC coupled to DSC for legacy unfairness issue" IEEE vol. 802.11-15/0319r0, Mar. 9, 2015 (Mar. 9, 2015), pp. 1-20, XP068082942, [retrieved on Mar. 8, 2015].

Laurent Cariou (Orange): "MAC simulation results for Dynamic sensitivity control (DSC-CCa adaptation) and transmit power control (TPC)"; IEEE Draft; vol. 802.11-14/0523r0, Apr. 17, 2014 (Apr. 17, 2014), pp. 1-16, XP068069197, [retrieved on Apr. 17, 2014].

Extended European Search Report dated Feb. 18, 2019 in European Application No. 16841225.2-1215.

* cited by examiner

FIG. 4

PROCESS CLASSIFICATION TABLE

| CRC CALCULATION RESULT OF PLCP HEADER IS ERROR-FREE | | | CRC CALCULATION RESULT OF PLCP HEADER IS ERROR |
|---|---|---|---|
| COLOR IN PLCP HEADER IS SAME AS BELONGING BSS | COLOR IN PLCP HEADER IS DIFFERENT FROM BELONGING BSS | COLOR INFORMATION DOES NOT EXIST | |
| RECEPTION | ABORTION OF RECEPTION | RECEPTION | ABORTION OF RECEPTION (ERROR) ※IFS=EIFS |

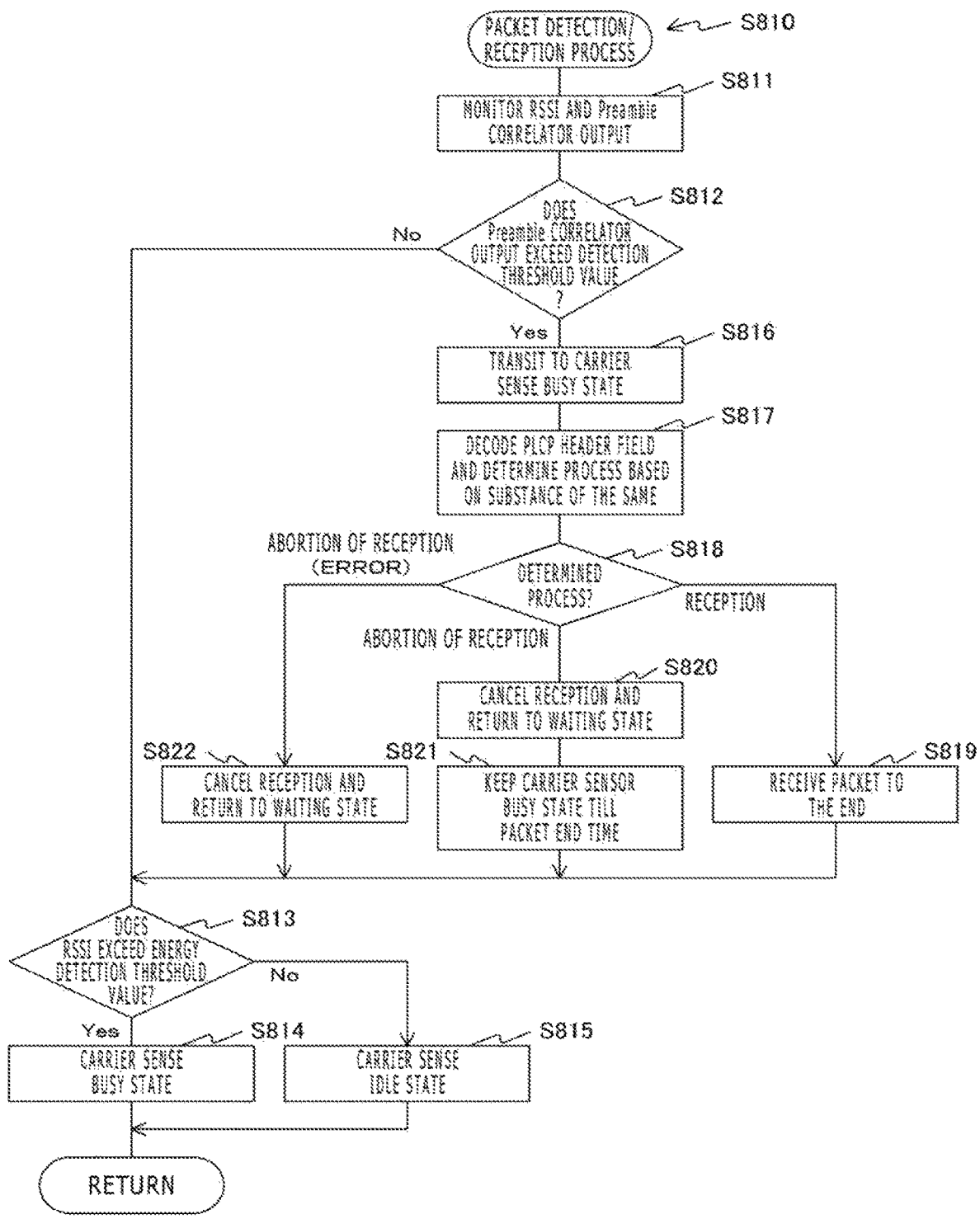

FIG.6   PROCESS CLASSIFICATION TABLE

|  | CRC CALCULATION RESULT OF PLCP HEADER IS ERROR-FREE | | | CRC CALCULATION RESULT OF PLCP HEADER IS ERROR |
| --- | --- | --- | --- | --- |
|  | COLOR IN PLCP HEADER IS SAME AS BELONGING BSS | COLOR IN PLCP HEADER IS DIFFERENT FROM BELONGING BSS | COLOR INFORMATION DOES NOT EXIST |  |
| CORRELATOR OUTPUT STRENGTH IS LOWER THAN EXTENDED CCA THRESHOLD VALUE | RECEPTION | ABORTION OF RECEPTION (IDLE) | RECEPTION | ABORTION OF RECEPTION (ERROR) ※IFS=EIFS |
| CORRELATOR OUTPUT STRENGTH IS EQUAL TO OR HIGHER THAN EXTENDED CCA THRESHOLD VALUE | RECEPTION | ABORTION OF RECEPTION (BUSY) | RECEPTION |  |

FIG. 9 FLOW OF PROCESSING OF COMPONENTS

FIG.10

| MARGIN VALUE (dB) | TRANSMISSION PARAMETER 1 OF CHANGE TARGET | | TRANSMISSION PARAMETER 2 OF CHANGE TARGET | |
|---|---|---|---|---|
| | TYPE | CHANGED COEFFICIENT VALUE | TYPE | CHANGED COEFFICIENT VALUE |
| 40 | TxPower | $\alpha=1, \beta=10$ | AIFSN | $\gamma=10$ |
| 30 | TxPower | $\alpha=1, \beta=8$ | AIFSN | $\gamma=10$ |
| 20 | TxPower | $\alpha=1.5, \beta=5$ | AIFSN | $\gamma=5$ |
| 10 | TxPower | $\alpha=2, \beta=3$ | AIFSN | $\gamma=3$ |

FIG.11 EXAMPLE OF FORMAT OF BEACON

FIG. 13
EXAMPLE OF FORMAT OF FRAME USED IN TRANSMISSION
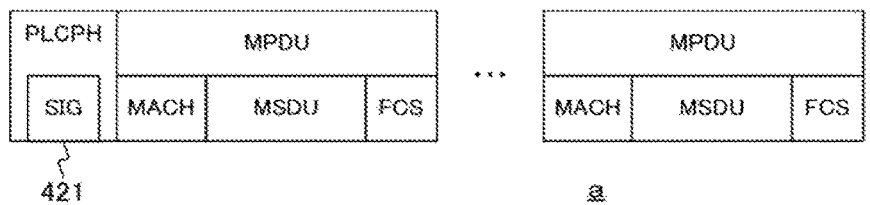
a
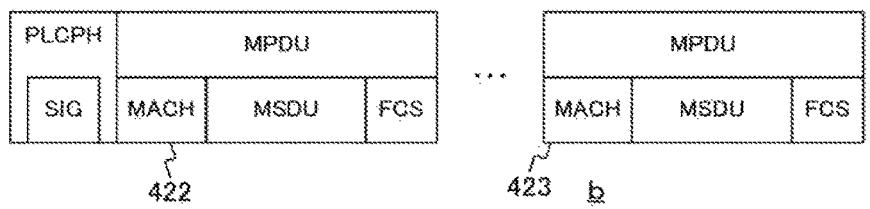
b
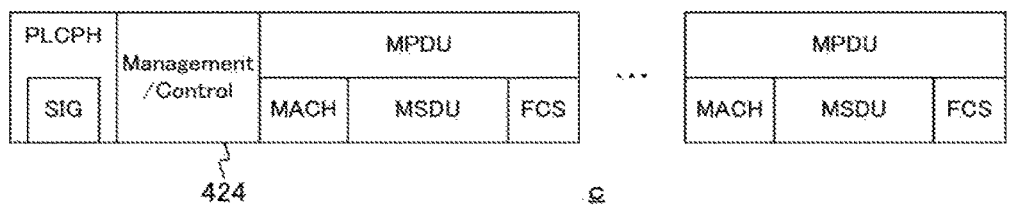
c
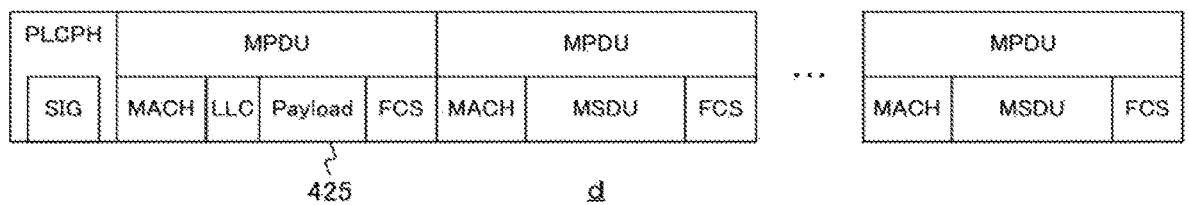
d

FIG. 14

| MODE NUMBER | MARGIN VALUE (dB) | TRANSMISSION PARAMETER 1 OF CHANGE TARGET | | TRANSMISSION PARAMETER 2 OF CHANGE TARGET | |
|---|---|---|---|---|---|
| | | TYPE | CHANGED COEFFICIENT VALUE | TYPE | CHANGED COEFFICIENT VALUE |
| 1 | 40 | TxPower | $\alpha=1, \beta=10$ | AIFSN | $\gamma=10$ |
| 2 | 30 | TxPower | $\alpha=1, \beta=8$ | AIFSN | $\gamma=10$ |
| 3 | 20 | TxPower | $\alpha=1.5, \beta=5$ | AIFSN | $\gamma=5$ |
| 4 | 10 | TxPower | $\alpha=2, \beta=3$ | AIFSN | $\gamma=3$ |

FIG. 15

EXAMPLE OF FORMAT OF BEACON

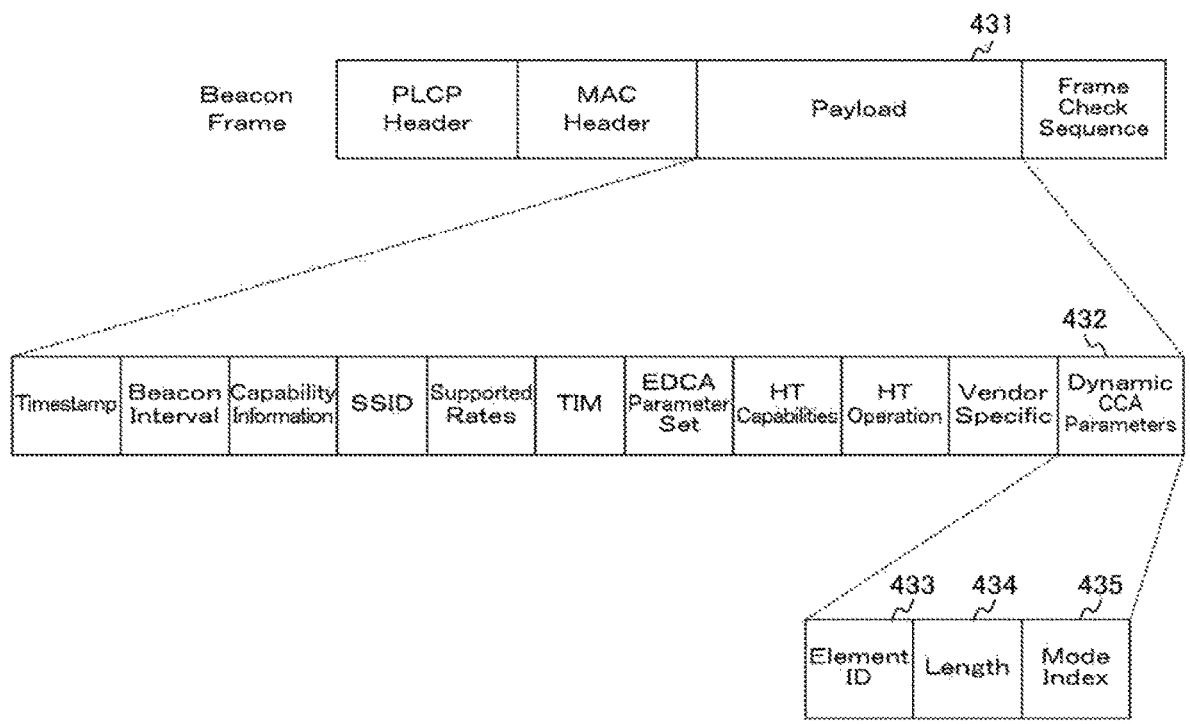

FIG. 17  EXAMPLE OF FORMAT OF BEACON

FIG.19 EXAMPLE OF FORMAT OF BEACON

FIG. 20

EXAMPLE OF FORMAT OF PLCP HEADER

| Preamble | SIGNAL (Requested Detection Level, COLOR) | (Extension) | Service | PSDU | Tail & Pad |
|---|---|---|---|---|---|
| 481 | 482 | 483 | 484 | 485 | 486 | a

| L-STF | L-LTF | L-SIG | VHT-SIG-A | VHT-STF | VHT-LTF | VHT-SIG-B | Service | PSDU | Tail & Pad |
|---|---|---|---|---|---|---|---|---|---| b

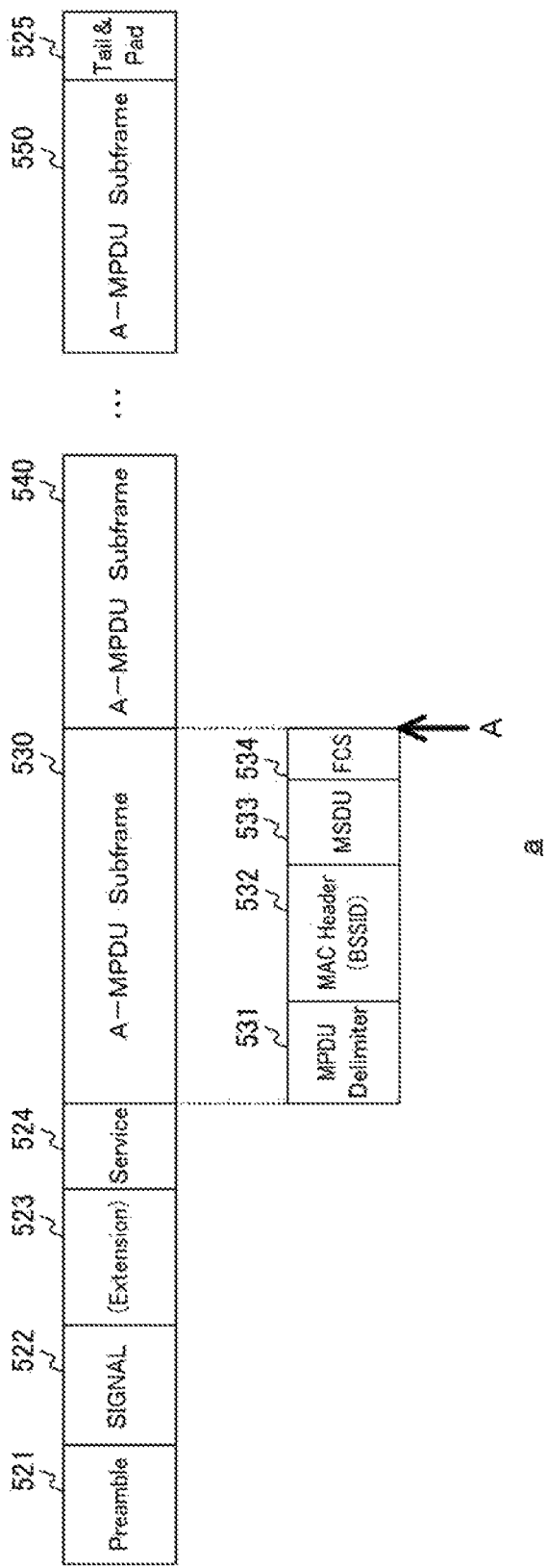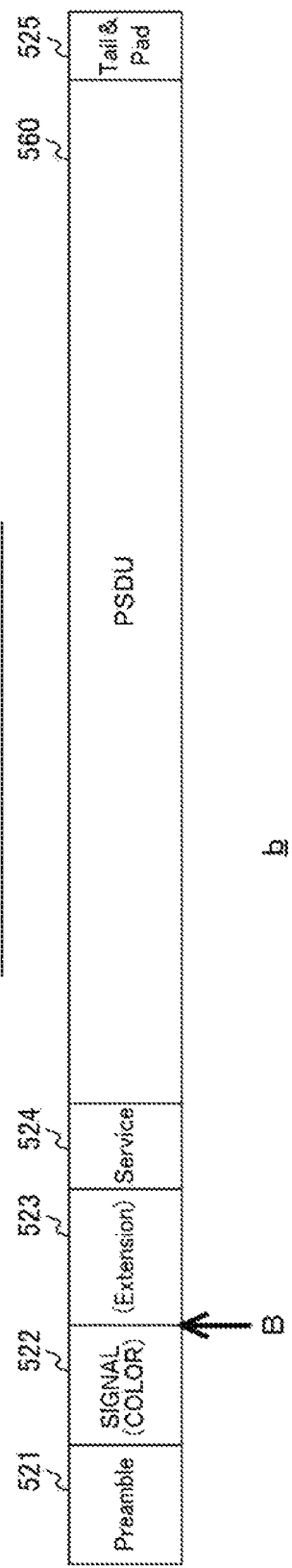
FIG. 28

FIG. 29

FIRST PROCESS CLASSIFICATION TABLE
(FOR DECISION BY PLCP HEADER)

| | CRC CALCULATION RESULT OF PLCP HEADER IS ERROR-FREE | | | CRC CALCULATION RESULT OF PLCP HEADER IS ERROR |
|---|---|---|---|---|
| | COLOR IN PLCP HEADER IS SAME AS BELONGING BSS | COLOR IN PLCP HEADER IS DIFFERENT FROM BELONGING BSS | COLOR INFORMATION DOES NOT EXIST | |
| CORRELATOR OUTPUT STRENGTH IS LOWER THAN EXTENDED CCA THRESHOLD VALUE | RECEPTION | ABORTION OF RECEPTION (IDLE) | RECEPTION | ABORTION OF RECEPTION (ERROR) ※IFS=EIFS |
| CORRELATOR OUTPUT STRENGTH IS EQUAL TO OR HIGHER THAN EXTENDED CCA THRESHOLD VALUE | RECEPTION | ABORTION OF RECEPTION (BUSY) | RECEPTION | | a

SECOND PROCESS CLASSIFICATION TABLE
(FOR DECISION BY MAC HEADER)

| | CRC CALCULATION RESULT FOR MAC FCS IS ERROR-FREE | | CRC CALCULATION RESULT FOR MAC FCS IS IN ERROR |
|---|---|---|---|
| | BSSID IN MAC HEADER IS SAME AS BELONGING BSS | BSSID IN MAC HEADER IS DIFFERENT FROM BELONGING BSS | |
| CORRELATOR OUTPUT STRENGTH IS LOWER THAN EXTENDED CCA THRESHOLD VALUE | CONTINUATION OF RECEPTION | ABORTION OF RECEPTION (IDLE) | CONTINUATION OF RECEPTION |
| CORRELATOR OUTPUT STRENGTH IS EQUAL TO OR HIGHER THAN EXTENDED CCA THRESHOLD VALUE | CONTINUATION OF RECEPTION | ABORTION OF RECEPTION (BUSY) | | b

INFORMATION PROCESSING APPARATUS AND INFORMATION PROCESSING METHOD

TECHNICAL FIELD

The present technology relates to an information processing apparatus. Particularly, the present technology relates to an information processing apparatus and an information processing method by which information is exchanged utilizing wireless communication.

BACKGROUND ART

In the past, in a wireless system, there is a case in which, when a plurality of wireless terminals perform transmission of data using same wireless resources (frequency and time), interference arises from collision of the data, resulting in failure in reception of the data at the reception side. Therefore, where a plurality of wireless terminals that use a same frequency exists, it is desirable to provide a contrivance by which one wireless terminal can occupy the frequency as far as possible within a certain time band to transmit data so as to prevent collision of data.

As a technology for providing such a contrivance as described above, for example, a technology is available which avoids collision using carrier sense. In this technology, a wireless terminal, before data transmission, enters into a reception mode, in which it measures reception power in a frequency channel to be used (hereinafter referred to also as channel). Then, the wireless terminal decides the measured reception power with a threshold value and suppresses transmission until an available wireless resource is confirmed thereby to avoid collision of data. The threshold value is hereinafter referred to also as carrier sense level. In order to suppress transmission to avoid collision or conversely avoid excessive suppression of transmission in this manner, a technology for setting a carrier sense level appropriately is demanded.

Therefore, for example, a wireless communication apparatus has been proposed in which media access is performed efficiently by temporarily changing the carrier sense level (for example, refer to PTL 1).

CITATION LIST

Patent Literature

[PTL 1]
  JP 2007-134905A

SUMMARY

Technical Problem

In the existing technology described above, since the possibility that a wireless communication apparatus in which the carrier sense level is varied may acquire the transmission right of data in comparison with a wireless communication apparatus in which the carrier sense level is not varied is high, unfairness in transmission opportunity arises. Therefore, it is important to reduce the unfairness in transmission opportunity and efficiently utilize a wireless resource.

The present technology has been created in view of such a situation as described above, and it is an object of the present technology to efficiently utilize a wireless resource.

Solution to Problem

The present technology has been created in order to solve the problem described above, and a first aspect of the present technology is an information processing apparatus including a control unit that aborts, when a packet decided to be transmitted from a second network different from a first network to which the own apparatus belongs is detected, reception of the packet and deals with carrier sense as an idle state based on a reception strength of the packet, and an information processing method for the information processing apparatus and a program for causing a computer to execute the method. This brings about action that, when the packet decided to be transmitted from the second network, reception of the packet is aborted, and the carrier sense is dealt with as the idle state based on the reception strength of the packet.

Further, in this first aspect, the control unit may perform control for dealing with the carrier sense as an idle state based on a result of comparison between the reception strength of the packet and a first threshold value. This brings about action that the carrier sense is dealt with as the idle state based on the result of the comparison between the reception strength of the packet and the first threshold value.

Further, in this first aspect, the control unit may identify the second network to which an apparatus from which the packet is transmitted belongs based on a network identifier added to a header of a physical layer of the packet. This brings about action that the second network to which the apparatus from which the packet is transmitted belongs is identified based on the network identifier added to the header of the physical layer of the packet.

Further, in this first aspect, the control unit may identify the second network based on a result of comparison between the network identifier added to the header of the physical layer of the packet and a network identifier of the first network. This brings about action that the second network is identified based on the result of the comparison between the network identifier added to the header of the physical layer of the packet and the network identifier of the first network.

Further, in this first aspect, the control unit may identify the second network based on a result of comparison between a network identifier added to a header of a data link layer of the packet and a network identifier of the first network. This brings about action that the second network is identified based on the result of the comparison between the network identifier added to the header of the data link layer of the packet and the network identifier of the first network.

Further, in this first aspect, the control unit may perform control for transmitting information for specifying a set of first information used by a different apparatus belonging to the first network and used for determination of the first threshold value and a wireless transmission parameter that interlocks with the first information to the different apparatus. This brings about action that information for specifying the set of the first information and the wireless transmission parameter is transmitted to the different apparatus.

Further, in this first aspect, the control unit may perform control for transmitting, as the first information, one of information for specifying the first threshold value and information for designating a range within which the first threshold value is to be changed by the different apparatus by which a reference frame is received based on a ratio between the information for specifying the first threshold value and a reception strength of the reference frame. This brings about action that one of information for specifying the first threshold value and information for designating the range within which the first threshold value is to be changed by the different apparatus by which the reference frame is received is transmitted based on the ratio between the information for specifying the first threshold value and the reception strength of the reference frame.

Further, in this first aspect, the wireless transmission parameter may be at least one of transmission power, transmission fixed waiting time, carrier sense random waiting time, a maximum frame time length, a usable channel bandwidth and a usable channel frequency. This brings about action that at least one wireless transmission parameter from among them is transmitted.

Further, in this first aspect, the control unit may perform control for changing, when a frame transmitted from a different apparatus belonging to the first network and destined for the own apparatus includes information regarding transmission power of the frame, transmission power for a reception response of the frame based on the information regarding the transmission power and transmitting the reception response. This brings about action that, when the frame transmitted from the different apparatus belonging to the first network and destined for the own apparatus includes information regarding the transmission power of the frame, the transmission power for the reception response of the frame is changed based on the information regarding the transmission power and the reception response is transmitted.

Further, in this first aspect, the reference frame may be a beacon transmitted from an apparatus belonging to the first network. This brings about action that the beacon transmitted from the apparatus belonging to the first network is used as the reference frame.

Further, in this first aspect, the information processing apparatus may share information for specifying the set of the first information and the wireless transmission parameter with at least one of a different apparatus belonging to the first network and a different apparatus belonging to the second network. This brings about action that information for specifying the set of the first information and the wireless transmission parameter is shared with at least one of the different apparatus belonging to the first network and the different apparatus belonging to the second network.

Further, in this first aspect, the control unit may change the first threshold value and perform control for transmitting data based on a wireless transmission parameter changed in response to the first threshold value after changed. This brings about action that the first threshold value is changed, and data is transmitted based on the wireless transmission parameter changed in response to the first threshold value after changed.

Further, in this first aspect, the control unit may change the wireless transmission parameter in an interlocking relationship with the first threshold value. This brings about action that the wireless transmission parameter is changed in the interlocking relationship with the first threshold value.

Further, in this first aspect, the control unit may change the first threshold value based on information included in a frame transmitted from a different apparatus belonging to the first network. This brings about action that the first threshold value is changed based on information included in the frame transmitted from the different apparatus belonging to the first network.

Further, in this first aspect, the control unit may perform control for changing the first threshold value based on a margin value included in the frame and a reception strength of the frame. This brings about action that the first threshold value is changed based on the margin value included in the frame and the reception strength of the frame.

Further, in this first aspect, the control unit may perform control for changing the first threshold value within a range determined based on the margin value and the reception strength. This brings about action that the first threshold value is changed within the range determined based on the margin value and the reception strength.

Further, in this first aspect, the control unit may perform control for determining the wireless transmission parameter based on information included in a frame transmitted from a different apparatus belonging to the first network and a changing amount of the first threshold value from a reference value. This brings about action that the wireless transmission parameter is determined based on information included in the frame transmitted from the different apparatus belonging to the first network and the changing amount of the first threshold value from the reference value.

Further, in this first aspect, the wireless transmission parameter may be a parameter for setting transmission power, and the control unit may perform, when the wireless transmission parameter is to be changed, control for including information regarding transmission power to be set with the wireless transmission parameter after changed into a frame to be transmitted to an apparatus belonging to the first network. This brings about action that, when the wireless transmission parameter is to be changed, information regarding the transmission power to be set with the wireless transmission parameter after changed is included into the frame to be transmitted to the apparatus belonging to the first network.

Further, in this first aspect, the frame may be a beacon transmitted from an apparatus belonging to the first network. This brings about action that the beacon transmitted from the apparatus belonging to the first network is used.

Advantageous Effect of Invention

With the present technology, a superior effect that a wireless resource can be utilized efficiently can be achieved. It is to be noted that the effect described here is not necessarily limitative, but any of effects described in the present disclosure may be exhibited.

BRIEF DESCRIPTION OF DRAWINGS

FIG. 4 is a view depicting an example of a relationship (process classification table) between processes performed by the information processing apparatus (AP) 100 in the first embodiment of the present technology and PLCP headers.

FIG. 5 is a flow chart depicting a packet detection/reception decision process from within the transmission and reception process by the information processing apparatus (AP) 100 in the first embodiment of the present technology.

FIG. 6 is a view depicting an example of a relationship (process classification table) between processes performed by the information processing apparatus (AP) 100 in the first embodiment of the present technology and PLCP headers.

FIG. 10 is a view depicting an example of combinations of margin values and interlocking parameter calculation information stored in a storage unit 120 in the first embodiment of the present technology.

FIG. 13 is a view depicting an example of a format of a frame to be used for transmission by the information processing apparatus (STA) 200 in the first embodiment of the present technology.

FIG. 14 is a view depicting an example of combinations of margin values and interlocking parameter calculation information shared between the information processing apparatus (AP) 100 and the information processing apparatus (STA) 200 in the first embodiment of the present technology.

FIG. 15 is a view depicting an example of a format of a beacon frame exchanged between the different information processing apparatuses in the first embodiment of the present technology.

FIG. 20 is a view depicting an example of a format of a PPDU exchanged between different apparatuses configuring a communication system 10 in a fourth embodiment of the present technology.

FIG. 28 is a view depicting an example of a format of a frame exchanged between different apparatuses configuring a communication system 10 in a seventh embodiment of the present technology.

FIG. 29 is a view depicting an example of a relationship (process classification table) between processes performed by an information processing apparatus (AP) 100 in the seventh embodiment of the present technology and PLCP headers and MAC headers.

DESCRIPTION OF EMBODIMENTS

In the following, modes for carrying out the present technology (hereinafter referred to as embodiment) are described. Description is given in accordance with the following order.

1. First embodiment (example in which a STA (station) determines an extended CCA (Clear Channel Assessment) threshold value on the basis of a margin value notified from an AP (Access Point))

2. Second embodiment (example in which an upper limit level to an extended CCA threshold value and a lower limit level to transmission power are set)

3. Third embodiment (example in which an STA uses an extended CCA threshold value notified from an AP)

4. Fourth embodiment (example in which a desired detection level is issued as a notification to a communication partner)

5. Fifth embodiment (example in which setting of an extended CCA threshold value is perform by an STA taking execution of transmission power control as a premise)

6. Sixth embodiment (example in which a process for suppressing excessive decrease of transmission power is added in response to a situation as a rule)

7. Seventh embodiment (example in which both an extended CCA operation utilizing a PLCP header and an extended CCA operation utilizing a MAC header are used)

8. Application Examples

<1. First Embodiment>

[Example of Configuration of Communication System]

Figure 1:
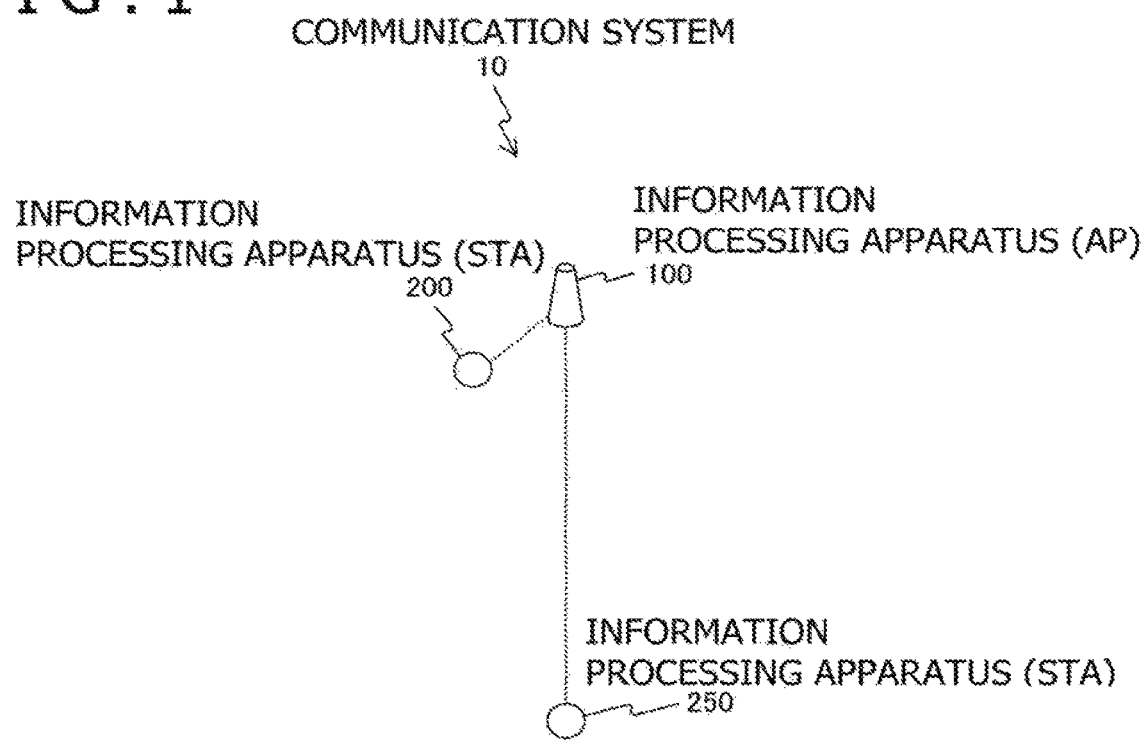
FIG. 1 is a view depicting an example of a system configuration of a communication system 10 in a first embodiment of the present technology.

FIG. 1 is a view depicting an example of a system configuration of a communication system 10 in a first embodiment of the present technology.

The communication system 10 includes an information processing apparatus (AP) 100, another information processing apparatus (STA) 200 and a further information processing apparatus (STA) 250. The communication system 10 is a system that complies with a wireless LAN (Local Area Network) or a communication system based on a wireless LAN.

The information processing apparatus (AP) 100 is a wireless communication apparatus corresponding to a master unit (master station, base station) at which the communication system 10 is centered. The information processing apparatus (AP) 100 may be connected to an external network such as the Internet by wired connection or wireless connection. For example, the information processing apparatus (AP) 100 can be used as an access point in a wireless LAN system.

The information processing apparatus (STA) 200 and the information processing apparatus (STA) 250 are wireless communication apparatus corresponding to slave units (slave stations) individually communicating by wireless communication with the information processing apparatus (AP) 100. Further, in FIG. 1, each wireless connection between different apparatus is schematically indicated by a dotted line. For example, the information processing apparatus (STA) 200 and information processing apparatus (STA) 250 can be used as stations in the wireless LAN system.

The information processing apparatus (STA) 200 has at least one of an extended CCA function and a function for changing transmission power (TPC (Transmit Power Control) function).

Here, the extended CCA function signifies a function that operates such that, when it is decided that a detected packet is a packet transmitted from a wireless network different from a wireless network to which the own apparatus belongs, the own apparatus aborts a reception operation halfway and returns to a standby state returns, and when a relationship between a reception strength of the packet and a decision threshold value (hereinafter referred to as extended CCA threshold value) satisfies a predetermined condition, a channel state is dealt with as an idle state even during a packet signal duration.

Where the information processing apparatus (STA) 200 has the extended CCA function, both transmission using the extended CCA and normal transmission in which the extended CCA is not used are possible. Where the extended CCA is not used, the information processing apparatus (STA) 200 deals, during a packet signal duration, with the channel state as a busy state except such exceptions as unexpected loss of a signal or an error of a PHY (Physical Layer) header irrespective of a wireless network to which an apparatus of the transmission source of the detected packet belongs.

Further, for example, where the information processing apparatus (STA) 200 has a TPC function, both transmission using the TPC and normal transmission in which the TPC is not used are possible.

The information processing apparatus (STA) 250 does not have the extended CCA function. In particular, the information processing apparatus (STA) 250 does not have a function by which a channel state is dealt with as an idle state during the signal duration of the packet based on conditions of a wireless network to which an apparatus of the transmission source of the detected packet belongs and the reception strength. Therefore, the information processing apparatus (STA) 250 deals, during the signal duration of the packet, with a channel state as a busy state except the exceptions described above irrespective of the wireless network to which an apparatus of the transmission source of the detected packet belongs. In the following description, the information processing apparatus (STA) 200 is referred to also as HE (High Efficiency) apparatus and the information processing apparatus (STA) 250 is referred to also as legacy apparatus. Further, where the HE apparatus and the legacy apparatus are not distinguished from each other specifically, the apparatus are referred to also as information processing apparatus (STA) simply and totally.

The information processing apparatus (STA) 200 may dynamically change the extended CCA threshold value described above. In this manner, the information processing apparatus (STA) 200 can dynamically change the extended CCA threshold value within a range prescribed by the legislation.

Further, an operation mode when the extended CCA of the information processing apparatus (STA) 200 is not used is referred to also as normal mode, and an operation mode when the extended CCA threshold value is dynamically changed using the extended CCA is referred to also as extended CCA mode. Further, a parameter used for data transmission by the information processing apparatus (STA) 200 is referred to also as transmission parameter. The transmission parameter is a parameter such as, for example, transmission power, an EDCA (Enhanced Distributed Channel Access) parameter, a slot parameter, a maximum frame time length, a bandwidth or an operation channel. Further, the transmission parameter in the normal mode is referred to also as default transmission parameter, and the transmission parameter in the extended CCA mode is referred also as interlocking parameter. Note that it is assumed that the legacy apparatus uses a default threshold value and the default transmission parameter. Further, the default threshold value and the default transmission parameter may be equal among the apparatus or may be different in different apparatus.

[Example of Configuration of Information Processing Apparatus]

Figure 2:
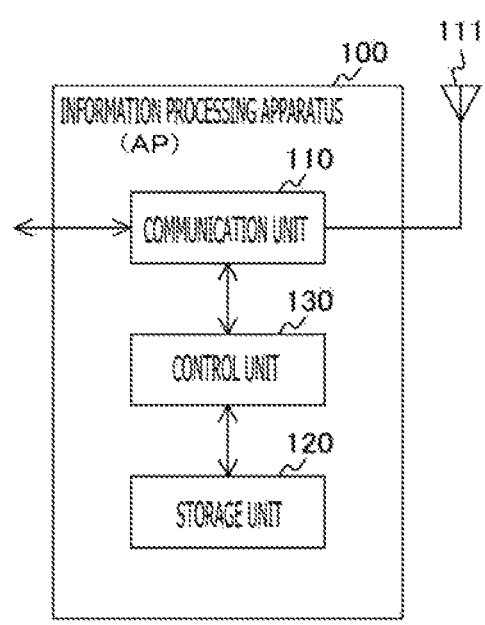
FIG. 2 is a block diagram depicting an example of a functional configuration of an information processing apparatus (AP) 100 in the first embodiment of the present technology.

FIG. 2 is a block diagram depicting an example of a functional configuration of the information processing apparatus (AP) 100 in the first embodiment of the present technology. It is to be noted that the functional configuration of the information processing apparatus (STA) 200 is substantially similar to that of the information processing apparatus (AP) 100, and therefore, description of them is omitted.

The information processing apparatus (AP) 100 includes a communication unit 110, an antenna 111, a storage unit 120 and a control unit 130.

The communication unit 110 performs transmission and reception of a packet through the antenna 111. For example, signal processing in general of the data link layer and the physical layer relating to transmission and reception of data is included in the communication unit 110.

Here, the data link layer processing particularly includes addition and removal of LLC (Logical Link Control)/SNAP (Subnetwork Access Protocol) headers to and from the data payload from an upper layer, addition/removal of a MAC (Media Access Control) header, addition of an error detection code/detection of a packet error, re-sending, media access processing by CSMA/CA (Carrier Sense Multiple Access/Collision Avoidance), generation of a management frame and a control frame and so forth.

Meanwhile, the physical layer processing particularly includes processes for performing encode, interleave and modulation on the basis of a coding and modulation scheme set by the control unit 130, and addition of a PLCP (Physical Layer Convergence Protocol) header and a PLCP preamble, detection and channel estimation processes based on the preamble, analog/digital signal conversion, frequency convert, amplification, filtering and so forth.

The storage unit 120 performs recording and reproduction of data on and from a predetermined recording medium. For example, the storage unit 120 is implemented by various recording media. For example, recording media such as a fixed memory such as a HDD (Hard Disc Drive) or a flash memory, a memory card having a fixed memory built therein, an optical disk, a magneto-optical disk and a hologram memory can be used.

The control unit 130 functions as an arithmetic processing unit and a control apparatus and controls general operation in the information processing apparatus (AP) 100 in accordance with various programs. For example, the control unit 130 is implemented by an electronic circuit such as a CPU (Central Processing Unit) or a microprocessor. It is to be noted that the control unit 130 may include a ROM (Read Only Memory) in which programs, arithmetic operation parameters and so forth to be used are stored, and a RAM (Random Access Memory) for temporarily storing parameters and so forth that vary suitably.

For example, the control unit 130 performs setting of various parameters to be used by the communication unit 110. Further, the control unit 130 creates rules to be informed to information processing apparatus (STA) connected to the information processing apparatus (AP) 100 (rules relating to change of an extended CCA threshold value used in a network (extended CCA margin value and interlocking parameter calculation information)).

Further, for example, the control unit 130 performs control for aborting, when a packet decided to be transmitted from a second network different from a first network to which the information processing apparatus (AP) 100 belongs is detected, reception of the packet. In this case, the control unit 130 performs control for dealing with the carrier sense as an idle state on the basis of a reception strength of the packet. In particular, the control unit 130 compares the reception strength of the packet and a first threshold value (extended CCA threshold value) with each other and performs, on the basis of a result of the comparison, control for dealing with the carrier sense as an idle state.

For example, the control unit 130 can identify, on the basis of a network identifier (called, for example, COLOR information or BSS COLOR information) added to the header of a physical layer (for example, the PLCP layer) in a received packet, a network to which an apparatus from which the packet is transmitted belongs. In particular, the control unit 130 identifies, on the basis of a result of comparison between the network identifier added to the header of a physical layer in the packet and the network identifier of the network to which the own apparatus belongs, the network to which the apparatus from which the packet is transmitted belongs.

Further, for example, the control unit 130 performs control for changing the first threshold value (extended CCA threshold value) and transmitting data on the basis of a wireless transmission parameter changed in response to the first threshold value after changed. In this case, the control unit 130 can change the wireless transmission parameter in an interlocking relationship with the first threshold value.

[Example of Operation of Carrier Sense and Extended CCA]

Here, an example of a general operation of the carrier sense and the extended CCA is described.

Figure 3:
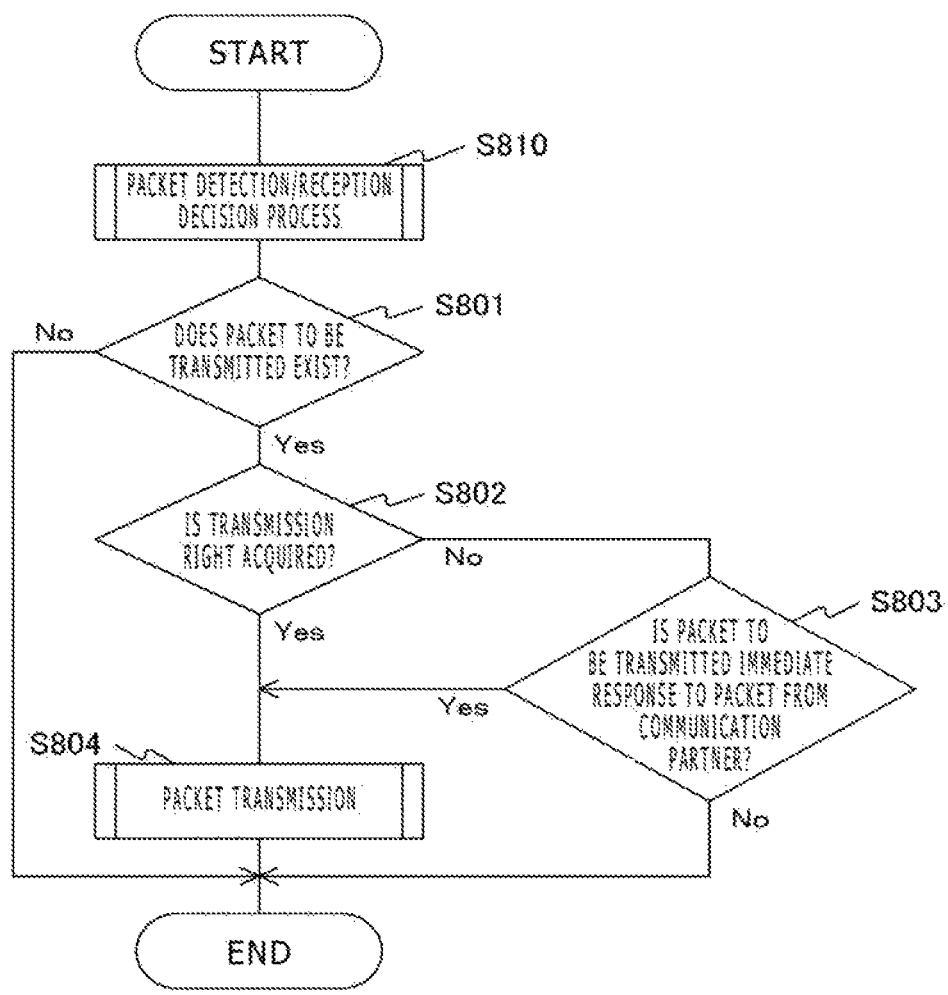
FIG. 3 is a flow chart illustrating an example of a processing procedure of a packet transmission and reception process by the information processing apparatus (AP) 100 in the first embodiment of the present technology.

FIG. 3 is a flow chart depicting an example of a processing procedure of a packet transmission and reception process by the information processing apparatus (AP) 100 in the first embodiment of the present technology. It is to be noted that, while the information processing apparatus (AP) 100 is described with reference to FIG. 3, the processing procedure can be applied similarly also to the other information processing apparatus (information processing apparatus (STA) 200). In other words, this transmission and reception process is a process that is similar between the master station side and the slave station side.

The control unit 130 of the information processing apparatus (AP) 100 performs a packet detection/reception decision process within a period of time other than periods of time during transmission and during reception (step S810). This packet detection/reception decision process is hereinafter described in detail with reference to FIG. 5.

Then, the control unit 130 of the information processing apparatus (AP) 100 decides whether or not there exists a packet to be transmitted (step S801). If a packet to be transmitted does not exist (step S801), then the operation of the packet transmission and reception process is ended.

If a packet to be transmitted exists (step S801), then the control unit 130 of the information processing apparatus (AP) 100 decides whether or not the information processing apparatus (AP) 100 has a transmission right acquired already (step S802).

Here, it is assumed that the state in which the transmission right is acquired signifies a state in which a backoff counter that is decremented in response to a period of time within which a carrier sense result is IDLE is 0.

If the information processing apparatus (AP) 100 has the transmission right acquired already (step S802), the control unit 130 of the information processing apparatus (AP) 100 performs packet transmission (step S804). If the information processing apparatus (AP) 100 does not have the transmission right acquired as yet (step S802), then the control unit 130 of the information processing apparatus (AP) 100 decides whether or not the packet to be transmitted is an immediate response to a packet received from the communication partner (step S803).

It is to be noted that the packet to become an immediate response to a packet received from the communication partner is, for example, a CTS (Clear to Send) frame, an ACK (ACKnowledge) frame or a Block Ack frame.

If the packet to be transmitted is not an immediate response to a packet received from the communication partner (step S803), then the operation of the packet transmission and reception process is ended without performing transmission of the packet (step S803). If the packet to be transmitted is an immediate response to a packet received from the communication partner (step S803), then the control unit 130 of the information processing apparatus (AP) 100 performs packet transmission (step S804). In this manner, transmission of a packet that is an immediate response to a packet received from the communication partner can be performed irrespective of the state of the carrier sense.

In this manner, the information processing apparatus (AP) 100 performs transmission of a packet when there is a packet to be transmitted and besides the information processing apparatus (AP) 100 has a transmission right acquired already and when a packet to be transmitted is an immediate response to a packet from a communication partner.

[Example of Operation for Packet Detection/Reception Decision Process]

FIG. 4 is a view depicting an example of a relationship (process classification table) between processes to be performed by the information processing apparatus (AP) 100 and PLCP headers in the first embodiment of the present technology. It is to be noted that description with reference to FIG. 4 is given in detail with reference to FIG. 5.

FIG. 5 is a flow chart illustrating a packet detection/reception decision process (processing procedure at step S810 depicted in FIG. 3) from within the transmission and reception process by the information processing apparatus (AP) 100 in the first embodiment of the present technology.

First, the control unit 130 of the information processing apparatus (AP) 100 performs measurement of an RSSI (Received signal strength indication) of a signal inputted thereto through the antenna 111 and retains the RSSI determined by the measurement. Further, the control unit 130 of the information processing apparatus (AP) 100 performs correlation calculation of a Preamble pattern to determine a correlator output (step S811). This correlator output signifies a correlation output strength COL (Correlator Output Level). Here, the relationship between the RSSI and the correlation output strength COL can be indicated briefly by the following expression.

$$\text{correlation output strength COL}=\text{RSSI}\times\text{normalized correlator output}$$

In particular, the correlator output is not a normalized correlator output level but a correlator output obtained by conversion reflecting the reception power.

In this manner, each of the information processing apparatuses (AP and STA) monitors, while it is in a waiting state, measurement of the RSSI and the Preamble correlator output in regard to a signal inputted thereto through an antenna (step S811).

Then, the control unit 130 of the information processing apparatus (AP) 100 performs correlation calculation of the Preamble pattern and compares an output of this (Preamble correlator output) and a detection threshold value with each other (step S812). Here, the detection threshold value is a detection threshold value for reading the SIGNAL field in prior to the decision process.

If the value of the Preamble correlator output is equal to or lower than the detection threshold value (step S812), then the control unit 130 of the information processing apparatus (AP) 100 compares the measured RSSI and an energy detection threshold value ED with each other (step S813). Then, the control unit 130 of the information processing apparatus (AP) 100 decides whether or not the RSSI is higher than the energy detection threshold value ED (step S813). Here, the energy detection threshold value ED can be set, for example, to −62 dBm per 20 MHz bandwidth.

On the other hand, if the value of the Preamble correlator output exceeds the detection threshold value (step S813), then the control unit 130 of the information processing apparatus (AP) 100 transits to a carrier sense BUSY state (step S814), whereafter the operation of the packet detection/reception decision process is ended. On the other hand, if the RSSI is equal to or lower than the energy detection threshold value ED (step S813), then the control unit 130 of the information processing apparatus (AP) 100 transits to a carrier sense IDLE state (step S815) and then ends the operation of the packet detection/reception decision process.

On the other hand, if the value of the Preamble correlator output exceeds the detection threshold value (step S812), then the control unit 130 of the information processing apparatus (AP) 100 transits to a carrier sense BUSY state (step S816). Then, the control unit 130 of the information processing apparatus (AP) 100 decodes the subsequent SIGNAL field in the PLCP header and reads out information and so forth in the SIGNAL field (step S817).

For example, the control unit 130 of the information processing apparatus (AP) 100 reads out the "COLOR" field depicted in FIG. 20 and CRC (Cyclic Redundancy Check (cyclic redundancy check)) of the PLCP header. In the "COLOR" field, COLOR information that is a wireless network identifier is placed.

Here, the COLOR information (BSS COLOR information) is information informed in advance from the partner apparatus (for example, a master station) connected to the own apparatus and is information (for example, a numerical value) with which a BSS (Basic Service Set) to which the own apparatus belongs can be identified. Further, the COLOR information (BSS COLOR information) is an example of an identifier for identifying the BSS in the PLCP layer. It is to be noted that, as similar information, a BSSID is placed in the MAC header. However, the COLOR information can be represented in a simplified form from that of the BSSID in the physical layer (PLCP layer).

Further, the control unit 130 of the information processing apparatus (AP) 100 collates the read out information and the process classification table depicted in FIG. 4 with each other to determine a subsequent process (step S817).

In particular, the control unit 130 of the information processing apparatus (AP) 100 calculates the CRC of the PLCP header to confirm presence or absence of an error in the PLCP header. Here, if the PLCP header has an error, then the validity of the value of the field cannot be confirmed. Therefore, when the PLCP header has an error, the subsequent process is determined as "abortion of reception (ERROR)" as depicted in FIG. 4. On the other hand, if the CRC of the PLCP header does not have an error, then the control unit 130 of the information processing apparatus (AP) 100 determines a process on the basis of the substance of the "COLOR" field.

In particular, if a COLOR field exists and the value in the COLOR field is equal to the value of the BSS to which the own apparatus belongs, then the subsequent process is determined as "reception." On the other hand, if a COLOR field exists and besides the value in the COLOR field is different from that of the BSS to which the own apparatus belongs, then the subsequent process is determined as "abortion of reception." On the other hand, if no COLOR field exits, then the subsequent process is determined as "reception."

A case is assumed in which the information processing apparatus (AP) 100 does not have a function for interpreting COLOR information. In this case, if the CRC calculation result of the PLCP header has no error, then the subsequent process is determined as "reception" irrespective of whether or not COLOR information exists and irrespective of the value of the COLOR information.

In this manner, the control unit 130 of the information processing apparatus (AP) 100 determines one of "reception," "abortion of reception" and "abortion of reception (ERROR)" as the subsequent process (step S817).

If "reception" is determined as the subsequent process (step S818), then the control unit 130 of the information processing apparatus (AP) 100 continuously performs reception of a detected packet to the last (step S819).

If "abortion of reception" is determined as the subsequent process (step S818), then the control unit 130 of the information processing apparatus (AP) 100 aborts the reception of a detected packet at the point of time of an end of the PLCP header and returns to a waiting state (step S820). However, the carrier sense state is dealt with as BUSY till the point of time of the end of the packet (step S821). Further, the control unit 130 of the information processing apparatus (AP) 100 determines the frame interval (IFS (Inter Frame Space)) before a transmission trial in the next cycle as AIFS (Arbitration IFS) or DIFS (Distributed access IFS).

On the other hand, if "abortion of reception (ERROR)" is determined as the subsequent process (step S818), then the control unit 130 of the information processing apparatus (AP) 100 aborts the reception of a detected packet at the point of time of an end of the PLCP header and returns to a waiting state (step S822).

Here, the embodiment of the present technology indicates an example of a case in which the extended CCA function described hereinabove is used. In particular, the embodiment of the present technology indicates an example in which reception of a packet decided not to have been transmitted from the BSS to which the own apparatus belongs using the BSS identifier (COLOR information) and the extended CCA threshold value (decision threshold value) is aborted and, depending upon a condition, an operation for dealing with a channel as a free state is performed. This operation is called, in the embodiment of the present technology, extended CCA operation. Further, as a method of obtaining an extended CCA threshold value to be used in this operation, a plurality of variations are available.

Note that it is assumed that a default value of the extended CCA threshold value when no particular value is designated is a value with which an operation equivalent to such a general carrier sense operation described hereinabove is performed. In other words, it is assumed that, determining that the default value is equal to or lower than the preamble detection threshold value, an operation similar to that of FIG. 5 is performed equivalently.

[Example of Operation of Packet Detection/Reception Decision Process Upon Extended CCA Operation]

FIG. 6 is a view depicting an example of a relationship (process classification table) between processes to be executed by the information processing apparatus (AP) 100 and PLCP headers in the first embodiment of the present technology. It is to be noted that description with reference to FIG. 6 is given in detail with reference to FIG. 7.

Figure 7:
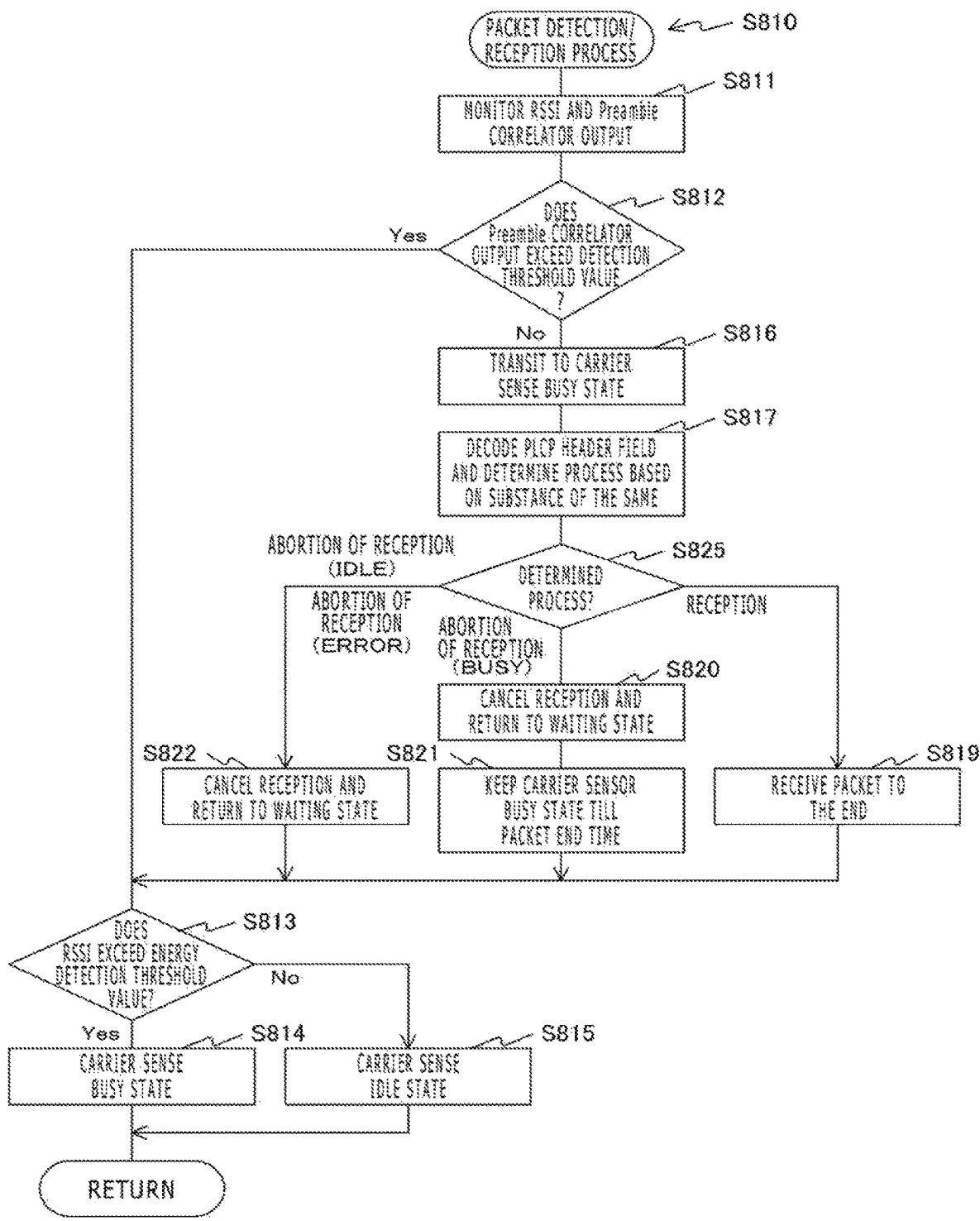
FIG. 7 is a flow chart depicting a packet detection/reception decision process from within the transmission and reception process by the information processing apparatus (AP) 100 in the first embodiment of the present technology.

FIG. 7 is a flow chart depicting a packet detection/reception decision process (processing procedure at step S810 depicted in FIG. 3) from within the transmission and reception process by the information processing apparatus (AP) 100 in the first embodiment of the present technology. It is to be noted that, since FIG. 7 is a modification to part of FIG. 5, portions common to those of FIG. 5 are denoted by like reference characters and description of them is omitted.

The control unit 130 of the information processing apparatus (AP) 100 decodes the subsequent SIGNAL field in the PLCP header and reads out information and so forth in the SIGNAL field (step S817).

Further, the control unit 130 of the information processing apparatus (AP) 100 collates the read out information and the process classification table depicted in FIG. 6 with each other to determine a subsequent process (step S825).

In particular, the control unit 130 of the information processing apparatus (AP) 100 calculates the CRC of the PLCP header and confirms presence or absence of an error in the PLCP header. Here, if an error exists in the PLCP header, then the validity of the value of the field cannot be confirmed. Therefore, as depicted in FIG. 6, when an error exists in the PLCP header, the subsequent process is determined as "abortion of reception (ERROR)." On the other hand, if no error exists in the CRC in the PLCP header, a process is determined on the basis of the substances of the extended CCA threshold value and the "COLOR" field.

Here, especially where it is assumed that information that specifies an extended CCA threshold value is not included in the packet itself (namely, where a format depicted in FIG. 20 is assumed as the PPDU format of an arriving packet), a value specified from the substance of the "Requested Detection Level" field described in the arriving packet itself is used as the extended CCA threshold value. If it is assumed that information that specifies an extended CCA threshold value is not included in the packet itself, then as the extended CCA threshold value, a value derived in advance by a different method and retained is used.

In particular, if a COLOR field exists and the value of the COLOR field is same as the value of the BSS to which the own apparatus belongs, then the subsequent process is determined as "reception." On the other hand, if a COLOR field does not exist, then the subsequent process is determined as "reception."

On the other hand, if a COLOR field exists and besides the value of the COLOR field is different from that of the BSS to which the own apparatus belongs, the subsequent process is determined as "abortion of reception." In this case, it is decided whether the correlator output strength (value of the Preamble correlator output) is lower or is equal to or higher than the extended CCA threshold value. Then, if the correlator output strength is lower than the extended CCA threshold value, then the subsequent process is determined as "abortion of reception (IDLE)." On the other hand, if the correlator output strength is equal to or higher than the extended CCA threshold value, then the subsequent process is determined as "abortion of reception (BUSY)." It is to be noted that the value to be compared with the extended CCA threshold value may be a different index representative of an intensity of the reception signal such as the RSSI.

In this manner, the control unit 130 of the information processing apparatus (AP) 100 determines, as the subsequent process, one of "reception," "abortion of reception (IDLE)," "abortion of reception (BUSY)" and "abortion of reception (ERROR)" (step S817).

Further, if "abortion of reception (IDLE)" is determined as the subsequent process (step S825), then the control unit 130 of the information processing apparatus (AP) 100 aborts the reception of a detected packet at the point of time of an end of the PLCP header and returns to a waiting state (step S822). In this case, the control unit 130 of the information processing apparatus (AP) 100 deals with the carrier sense as being in an idle state (step S822).

[Example of General Processing]

Figure 8:
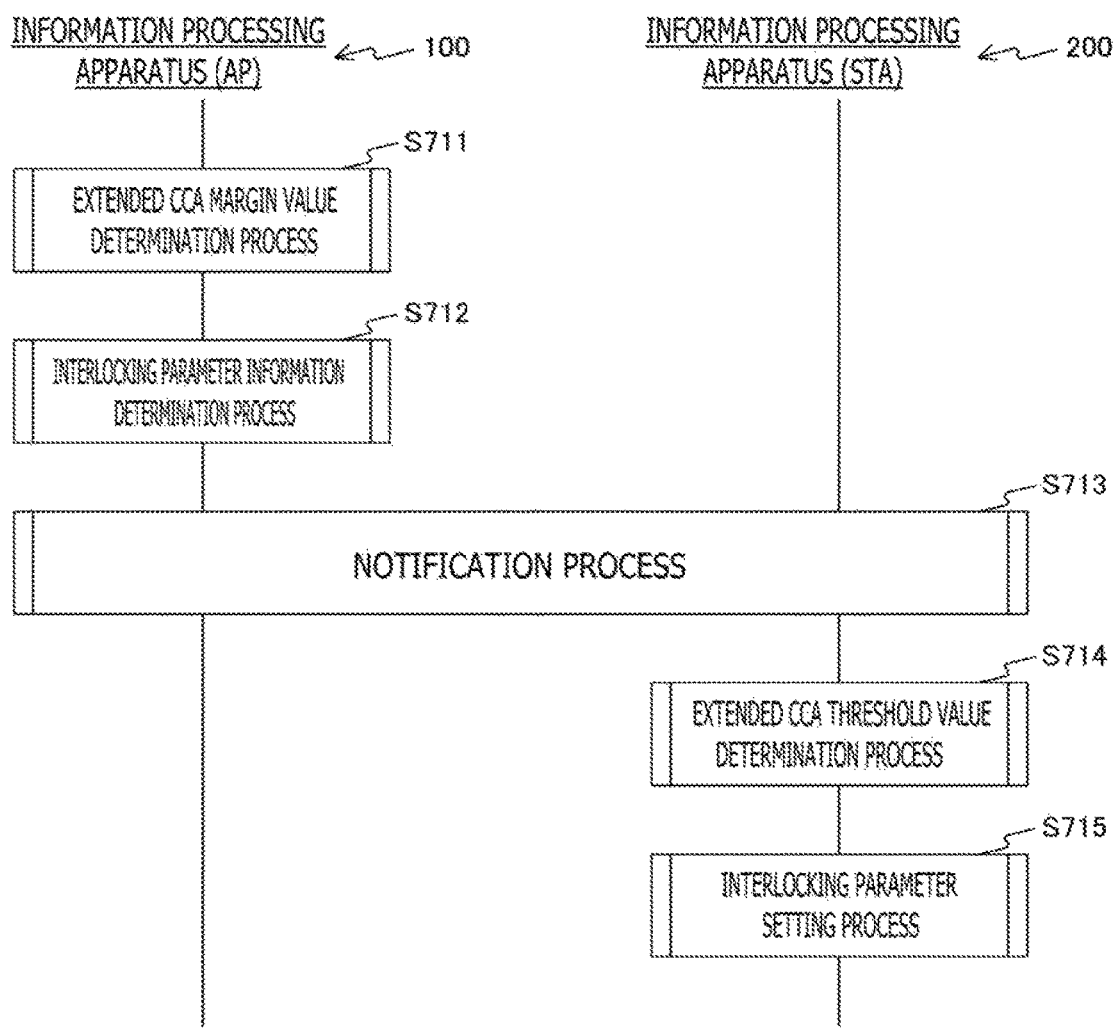
FIG. 8 is a sequence chart depicting an example of a flow of entire processes executed by different information processing apparatuses configuring the communication system 10 in the first embodiment of the present technology.

FIG. 8 is a sequence chart depicting an example of a flow of entire processing executed by the individual information processing apparatus that configure the communication system 10 in the first embodiment of the present technology. In FIG. 8, a flow of general processing relating to the information processing apparatus (AP) 100 and the information processing apparatus (STA) 200 as the information processing apparatus configuring the communication system 10 is depicted.

First, the communication system 10 performs an extended CCA margin value determination process (step S711). Then, the information processing apparatus (AP) 100 performs an interlocking parameter information determination process (step S712). Then, the information processing apparatus (AP) 100 performs a notification process to the information processing apparatus (STA) 200 (step S713).

Then, the information processing apparatus (STA) 200 performs an extended CCA threshold value determination process (step S714). Then, the information processing apparatus (STA) 200 performs an interlocking parameter setting process (step S715).

[One Example of Flow of Processes]

Figure 9:
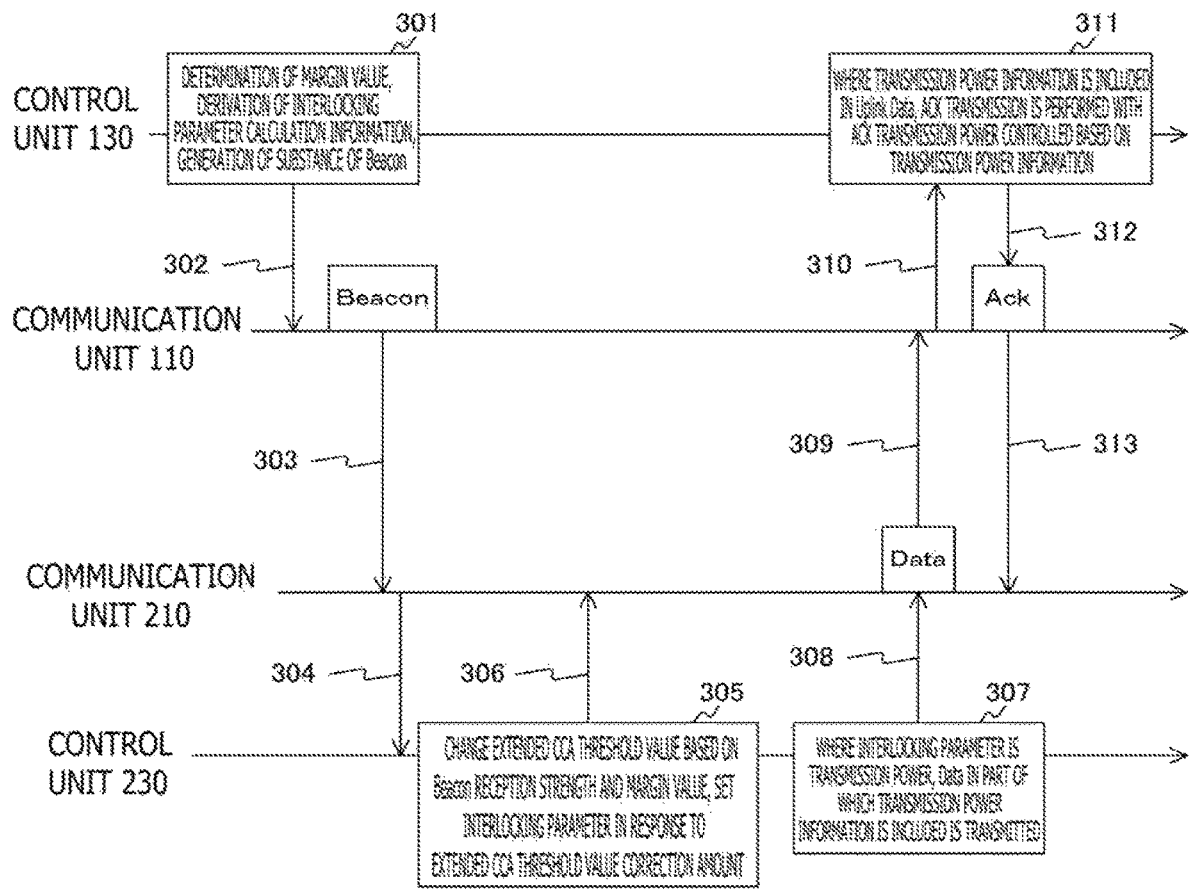
FIG. 9 is a view depicting an example of a flow of processes executed by components of the different information processing apparatuses configuring the communication system 10 in the first embodiment of the present technology.

FIG. 9 is a view depicting an example of a flow of processes executed by the components of the individual information processing apparatus that configure the communication system 10 in the first embodiment of the present technology. In FIG. 9, as units in the individual information processing apparatus configuring the communication system 10, a flow of processes relating to the communication unit 110 and the control unit 130 of the information processing apparatus (AP) 100 and a communication unit 210 and a control unit 230 of the information processing apparatus (STA) 200 is depicted. It is to be noted that the communication unit 210 and the control unit 230 correspond to the communication unit 110 and the control unit 130 depicted in FIG. 2, respectively.

First, the control unit 130 of the information processing apparatus (AP) 100 determines a margin value (extended CCA margin value) to be used when an extended CCA threshold value is to be determined and derives interlocking parameter calculation information (301). Further, the control unit 130 of the information processing apparatus (AP) 100 generates the substance of a beacon (301). Then, the control unit 130 of the information processing apparatus (AP) 100 outputs the substance of them to the communication unit 110 (302).

The communication unit 110 of the information processing apparatus (AP) 100 transmits a beacon including the extended CCA margin value to the information processing apparatus (STA) 200 under the control of the control unit 130 (303). The communication unit 210 of the information processing apparatus (STA) 200 outputs the substance of the received beacon to the control unit 230 (304).

Then, the control unit 230 of the information processing apparatus (STA) 200 changes the extended CCA threshold value on the basis of a reception strength of the received beacon and the extended CCA margin value included in the received beacon (305). Further, the control unit 230 of the information processing apparatus (STA) 200 sets an interlocking parameter on the basis of the correction amount for the extended CCA threshold value (305). Then, the control unit 230 of the information processing apparatus (STA) 200 outputs the substance of them to the communication unit 210 (306). The communication unit 210 of the information processing apparatus (STA) 200 performs a transmission process on the basis of the setting substance from the control unit 230.

Further, if the control unit 230 of the information processing apparatus (STA) 200 sets transmission power as an interlocking parameter, then it issues a notification to the communication unit 210 to include the interlocking parameter (transmission power information) into part of the transmission data (307 and 308).

Further, the communication unit 210 of the information processing apparatus (STA) 200 transmits data to the information processing apparatus (AP) 100 under the control of the control unit 230 (309). The communication unit 110 of the information processing apparatus (AP) 100 outputs the substance of the received data to the control unit 130 (310).

If transmission power information is included in the received data, then the control unit 130 of the information processing apparatus (AP) 100 causes an ACK to be transmitted to the communication unit 110 while controlling the transmission power of the ACK to the received data on the basis of the substance of the transmission power information (311 and 312). Further, the communication unit 110 of the information processing apparatus (AP) 100 transmits ACK under the control of the control unit 130 (313).

In this manner, when a wireless transmission parameter relating to transmission power is to be changed, the control unit 230 of the information processing apparatus (STA) 200 performs control for including information relating to the transmission power after changed into a frame to be transmitted to apparatus belonging to the same network.

Further, a case is assumed in which a frame transmitted from another apparatus belonging to the same network and destined for the own apparatus includes information relating to transmission power of the frame. In this case, the control unit 130 of the information processing apparatus (AP) 100 performs, on the basis of the information relating to the transmission power, control for transmitting a reception response (ACK) to the frame while changing the transmission power of the reception response.

Now, the individual processes are described.

[Extended CCA Margin Value Determination Process (Step S711 Depicted in FIG. 8)]

The control unit 130 of the information processing apparatus (AP) 100 determines, as one of changing rules, a margin value (extended CCA margin value) to be used when a subordinate apparatus (STA) connected determines an extended CCA threshold value. The first embodiment of the present technology deals with threshold value determined by the information processing apparatus (STA) 200 as the extended CCA threshold value. It is to be noted that, in the following description, the extended CCA threshold value is sometimes referred to as EXTCCA_TH.

The control unit 130 of the information processing apparatus (AP) 100 is capable of determining a margin value in accordance with various references. For example, the control unit 130 of the information processing apparatus (AP) 100 monitors the surroundings to measure an average strength of interference and can determine a margin value on the basis of an average strength of the measured interference. For example, the control unit 130 of the information processing apparatus (AP) 100 determines, where the average strength of interference is high with reference to a threshold value, a high value as the margin value but determines, where the average strength of interference is low with reference to the threshold value, a low value as the margin value.

Further, for example, the control unit 130 of the information processing apparatus (AP) 100 can determine a margin value in response to the number (or ratio) of HE apparatus and legacy apparatus. Here, the legacy apparatus are information processing apparatus that do not include a specific function (for example, a function for executing an extended CCA operation). For example, the control unit 130 of the information processing apparatus (AP) 100 can determine a margin value taking the number of HE apparatus that have a function for executing an extended CCA operation and the number of legacy apparatus that do not have the function from among the subordinate apparatus (STA) into account.

Also, for example, the control unit 130 of the information processing apparatus (AP) 100 may determine a margin value taking information of the number of HE apparatus and legacy apparatus belonging to another BSS (Basic Service Set) into account.

Also, for example, the control unit 130 of the information processing apparatus (AP) 100 may determine a margin value on the basis of a combination of the number of information processing apparatus and an average strength of interference. Also, the information processing apparatus (AP) 100 may adopt a predetermined value (for example, a fixed value) as the margin value.

[Interlocking Parameter Information Determination Process (Step S712 Depicted in FIG. 8)]

The control unit 130 of the information processing apparatus (AP) 100 determines, as one of the changing rules, interlocking parameter calculation information to be used when a subordinate apparatus (STA) connected is to determine a transmission parameter. In particular, the control unit 130 of the information processing apparatus (AP) 100 changes the transmission parameter from its default value.

The interlocking parameter is a parameter for causing a subordinate apparatus (STA) to change a transmission parameter to such a value that may have an influence in a reverse direction in regard to increase or decrease of a transmission opportunity by an extended CCA.

In particular, the interlocking parameter is an incidental parameter applied in order to moderate the unfairness as a system as a whole when the information processing apparatus (STA) 200 changes the extended CCA threshold value EXTCCA_TH. When the extended CCA threshold value EXTCCA_TH is to be increased, the interlocking parameter has a meaning as a penalty to be imposed in exchange of increase of a transmission opportunity. On the other hand, when the extended CCA threshold value EXTCCA_TH is to be decreased, the interlocking parameter has a meaning as a preferential treatment to be provided in exchange of decrease of a transmission opportunity.

Depending upon the interlocking parameter, a transmission parameter changed from a default transmission parameter in an interlocking relationship with a change of the extended CCA threshold value EXTCCA_TH is set.

Interlocking parameter calculation information can be made correspond in a one by one corresponding relationship, for example, to a margin value described above. In other words, it is possible to make the interlocking parameter calculation information correspond uniquely to a margin value. In this case, in the information processing apparatus (AP) 100, it is guaranteed that, if a margin value is same, then the interlocking parameter calculation information is same. Further, the combination of a margin value and interlocking parameter calculation information may be made common to that in other information processing apparatuses (AP). In this case, also it is guaranteed in the different information processing apparatus (AP) that, if a margin value is same, then also the interlocking parameter calculation information is same.

For example, the control unit 130 of the information processing apparatus (AP) 100 can store combinations of margin values and interlocking parameter calculation information into the storage unit 120 such that it can select a combination to be used from among the combinations. An example of the combinations is depicted in FIG. 10.

Here, as the selection criterion of a combination, a criterion similar to a determination criterion of a margin value can be used. Further, the control unit 130 of the information processing apparatus (AP) 100 may derive interlocking parameter calculation information using a formula that makes a margin value and interlocking parameter calculation information correspond in a one by one corresponding relationship to each other.

Here, the transmission parameter changed with the interlocking parameter calculation information may take various forms. For example, the interlocking parameter calculation information may include, as a parameter for changing the transmission power, transmission power changing coefficients $\alpha$ and $\beta$. By this, the transmission power can be changed in an interlocking relationship with a change of the extended CCA threshold value EXTCCA_TH.

Also, the interlocking parameter calculation information may include, as a parameter for changing transmission fixed waiting time, transmission fixed waiting time changing coefficients $\gamma$, $\kappa$ and $\tau$. Consequently, the transmission fixed waiting time can be changed in an interlocking relationship with a change of the extended CCA threshold value EXTCCA_TH.

Also, the interlocking parameter calculation information may include, as a parameter for changing the transmission fixed waiting time, carrier sense random waiting time changing coefficients $\delta$ and $\epsilon$. By this, the carrier sensor random waiting time can be changed in an interlocking relationship with a change of the extended CCA threshold value EXTCCA_TH.

Or else, the interlocking parameter calculation information may include, as a parameter for changing the proprietary time length of a wireless resource (for example, a frequency), maximum frame time length changing coefficients $\mu$ and $\nu$. By this, the proprietary time length of a wireless resource can be changed in an interlocking relationship with a change of the extended CCA threshold value EXTCCA_TH.

Further, for the same purpose, the parameters for changing a maximum transmission information amount in single time frame transmission, a maximum packet connection number in single time transmission and a maximum time length that can be used for continuous transmission of a plurality of frames (for example, TXOP limit) may be included in the interlocking parameter calculation information.

Also, the interlocking parameter calculation information may include, as a parameter for changing a usable channel bandwidth, a usable channel bandwidth changing coefficient $\lambda$. By this, a channel bandwidth that can be used can be changed in an interlocking relationship with a change of the extended CCA threshold value EXTCCA_TH.

Further, the interlocking parameter calculation information may include, as a parameter for restricting a usable channel frequency, at least one of a channel restriction operation decision coefficient $\omega$ or information that designates a usable channel group. By this, the usable channel frequency can be restricted in an interlocking relationship with a change of the extended CCA threshold value EXTC-CA_TH.

[Example of Combination of Margin Value and Interlocking Parameter Calculation Information]

FIG. 10 is a view depicting an example of combinations of a margin value and interlocking parameter calculation information stored in the storage unit 120 in the first embodiment of the present technology.

FIG. 10 depicts an example in which transmission power and transmission fixed waiting time (for example, AIFSN (Arbitration Inter Frame Space number)) are transmission parameters of a changing target. The information processing apparatus (AP) 100 can select one entry (row) from among the combinations. It is to be noted that the value of the interlocking parameter calculation information may be changed such that the changing amount (scale of the penalty or the preferential treatment) increases under the control of the information processing apparatus (AP) 100 (or the information processing apparatus (STA) 200).

[Notification Process (Step S713 Depicted in FIG. 8)]

The control unit 130 of the information processing apparatus (AP) 100 notifies the information processing apparatus (STA) 200 of information indicative of the generated changing rule. The first embodiment of the present technology indicates an example in which the information processing apparatus (AP) 100 places the margin value and the interlocking parameter calculation information for extended CCA threshold value calculation into a frame to be notified. The frame into which such information as described above is to be placed may be a beacon frame that is conveyed, for example, to all subordinate apparatus (STA) or may be another management frame that is conveyed individually to them. Here, as an example, an example of a format where such information as described above is placed into a beacon frame is indicated.

[Example of Format of Beacon]

Figure 11:
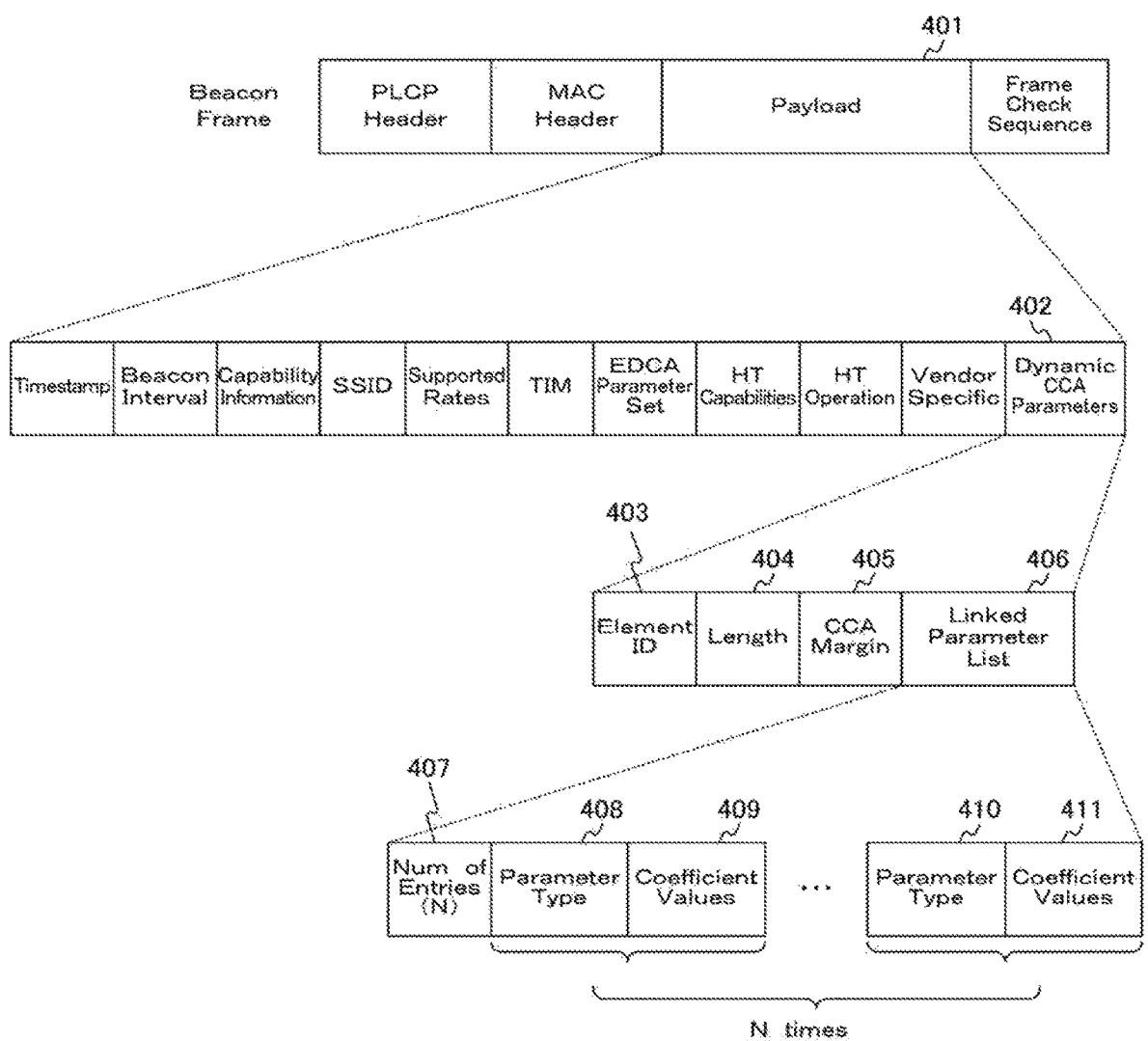
FIG. 11 is a view depicting an example of a format of a beacon frame exchanged between the different information processing apparatuses in the first embodiment of the present technology.

FIG. 11 is a view depicting an example of a format of a beacon frame exchanged between different information processing apparatus in the first embodiment of the present technology.

In the payload 401 of a beacon frame depicted in FIG. 11, Dynamic CCA Parameters 402 is placed. In the Dynamic CCA Parameters 402, information indicative of a changing rule is placed.

In particular, the Dynamic CCA Parameters 402 is configured from Element ID 403, Length 404, Margin 405 and Linked Parameter List 406.

In the Element ID 403, identification information is placed. In the Length 404, a field length is placed.

In the Margin 405, a margin value (margin value for interlocking parameter calculation) determined by such an extended CCA threshold value determination process (step S711 depicted in FIG. 8) described above is placed.

In the Linked Parameter List 406, interlocking parameter calculation information determined by the interlocking parameter information determination process described hereinabove (step S712 depicted in FIG. 8) is placed.

The Linked Parameter List 406 is configured from Num of Entries 407, Parameter Type 408 and 410, and Coefficient Values 409 and 411. Further, Parameter Type 408 and 410 and the Coefficient Values 409 and 411 are provided in N sets. Here, N is a value indicative of a number of pieces of interlocking parameter calculation information of a changing target.

In the Num of Entries 407, the number of pieces of interlocking parameter calculation information of a changing target is placed. In the Parameter Type 408 and 410, a type of an interlocking parameter of a changing target is placed. In the Coefficient Values 409 and 411, a changing coefficient value (interlocking parameter calculation information) is placed.

By placing margin values and interlocking parameter calculation information into a beacon frame for the notification in this manner, the rule described above that "a margin value and a piece of interlocking parameter calculation information correspond in a one by one corresponding relationship to each other" is observed. Further, by placing margin values and interlocking parameter calculation information into a beacon frame for the notification, even if the information processing apparatus (AP) 100 performs such incorrect setting that may degrade the quality of the system, the information processing apparatus (STA) 200 or some other apparatus can detect such incorrectness. Consequently, the testability can be secured.

In this manner, information indicative of a combination (namely, a changing rule) of a margin value and interlocking parameter calculation information is conveyed from the information processing apparatus (AP) 100 to the information processing apparatus (STA) 200.

In this manner, the first embodiment of the present technology indicates an example in which a margin value and interlocking parameter calculation information themselves are placed into a beacon frame and conveyed to an information processing apparatus (STA). However, information for specifying at least one of a margin value and interlocking parameter calculation information (for example, identification information for specifying the values) may be stored into and conveyed as a beacon frame into an information processing apparatus (STA).

[Extended CCA Threshold Value Determination Process (Step S714 Depicted in FIG. 8)]

The control unit 230 of the information processing apparatus (STA) 200 determines and sets an extended CCA threshold value on the basis of the notification from the information processing apparatus (AP) 100.

For example, the control unit 230 of the information processing apparatus (STA) 200 determines an extended CCA threshold value on the basis of a margin value conveyed thereto and a reception strength of a reference frame (for example, an RSSI). Here, the reference frame is a beacon frame in which, for example, information indicative of the changing rule described above is placed. Further, another frame is determined as the reference frame. In the following, an extended CCA threshold value determination process is described with reference to FIG. 12.

Figure 12:
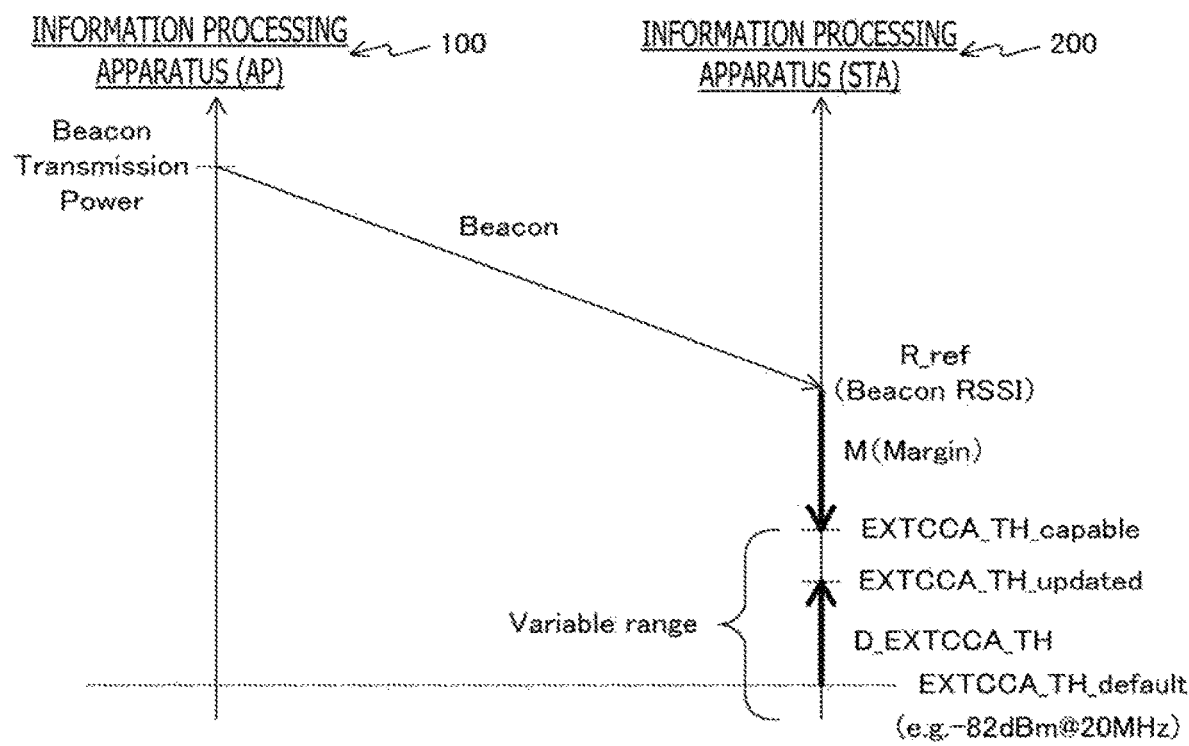
FIG. 12 is a view depicting an example of an extended CCA threshold value determination process by an information processing apparatus (STA) 200 in the first embodiment of the present technology.

FIG. 12 is a view depicting an example of an extended CCA threshold value determination process by the information processing apparatus (STA) 200 in the first embodiment of the present technology. In FIG. 12, an example of exchange between the information processing apparatus (AP) 100 and the information processing apparatus (STA) 200 is depicted.

First, the communication unit 210 of the information processing apparatus (STA) 200 receives a beacon frame transmitted from the information processing apparatus (AP) 100 of the connection destination.

Here, it is assumed that the reception strength (RSSI) of the latest reference frame (beacon frame) received from the information processing apparatus (AP) 100 of the connection destination at the information processing apparatus (STA) 200 is represented by R_ref (dBm). Meanwhile, the margin value conveyed from the information processing apparatus (AP) 100 in the notification process described above (margin value specified by the Margin 405 depicted in FIG. 11) is represented by M (dB). It is to be noted that, as R_ref, a value obtained by performing filtering such as averaging for measurement results over a plurality of reference frames may be used.

For example, the control unit 230 of the information processing apparatus (STA) 200 calculates a value obtained by subtracting the margin value M from the reception strength R_ref of the reference frame as an upper limit value EXTCCA_TH_capable of the extended CCA threshold value EXTCCA_TH that can be set. In particular, the upper limit value EXTCCA_TH_capable is calculated using the following expression 1. It is to be noted that the following expression 1 is a logarithmic expression.

$$EXTCCA\_TH\_capable = R\_ref - M \quad \text{Expression 1}$$

Then, the control unit 230 of the information processing apparatus (STA) 200 changes the extended CCA threshold value EXTCCA_TH within a range within which it does not exceed the upper limit value EXTCCA_TH_capable (namely, determines the extended CCA threshold value). Consequently, the possibility that a signal transmitted from the information processing apparatus (AP) 100 may be detected by the information processing apparatus (STA) 200 can be increased.

It is to be noted that the extended CCA threshold value EXTCCA_TH may be restricted in value by an upper limit value or a lower limit value based on some other factor.

Here, the default value of the extended CCA threshold value EXTCCA_TH is represented by EXTCCA_TH_default, and the value of the extended CCA threshold value EXTCCA_TH after changed is represented by EXTCCA_TH_updated. For example, EXTCCA_TH_default may be −82 dBm per 20 MHz bandwidth.

Further, the difference D_EXTCCA_TH between EXTCCA_TH_default and EXTCCA_TH_updated is calculated using an expression 2 given below. It is to be noted that also the following expression 2 is a logarithmic expression. Further, D_EXTCCA_TH in formulae indicated hereinbelow is all in a dB value.

$$D\_EXTCCA\_TH = EXTCCA\_TH\_updated - EXTCCA\_TH\_default \quad \text{Expression 2}$$

If the expression (1) given above is referred to, then in the information processing apparatus (STA) 200 having a higher RSSI, change to a higher extended CCA threshold value EXTCCA_TH is permitted. It is to be noted that the change of the extended CCA threshold value EXTCCA_TH has a freedom within the range, and there is no necessity for the information processing apparatus (STA) 200 to set the extended CCA threshold value EXTCCA_TH_updated to EXTCCA_TH_capable.

For example, the information processing apparatus (STA) 200 may not change the extended CCA threshold value EXTCCA_TH at all. In other words, the extended CCA threshold value EXTCCA_TH is variable under the control of the information processing apparatus (STA) 200. Consequently, such a situation that the information processing apparatus (STA) 200 that is poor in link state changes the extended CCA threshold value EXTCCA_TH to a high value and this increases unexpected transmission failures to degrade the performance of the entire system can be prevented.

[Interlocking Parameter Setting Process (Step S715 Depicted in FIG. 8)]

The control unit 230 of the information processing apparatus (STA) 200 determines and sets an interlocking parameter (transmission parameter).

For example, the control unit 230 of the information processing apparatus (STA) 200 can control the interlocking parameter on the basis of the difference between the extended CCA threshold value and the default threshold value determined by the extended CCA threshold value determination process described hereinabove (namely, based on D_EXTCCA_TH).

For example, the control unit 230 of the information processing apparatus (STA) 200 can increase the changing amount (scale of the penalty or the preferential treatment) in response to increase of the difference but can decrease the changing amount in response to decrease of the difference. Consequently, unfairness over an overall system arising in response to a rise width or a lower width of the extended CCA threshold value EXTCCA_TH can be moderated appropriately.

Further, the control unit 230 of the information processing apparatus (STA) 200 can set an interlocking parameter using interlocking parameter calculation information corresponding to a margin value. For example, it is assumed that the information processing apparatus (STA) 200 determines an interlocking parameter in compliance with the changing rule notified from the information processing apparatus (AP) 100 and does not deviate from the changing rule. In the following, an example of setting of various transmission parameters is described.

[Example of Setting of Transmission Power]

The control unit 230 of the information processing apparatus (STA) 200 can change the transmission power on the basis of D_EXTCCA_TH. For example, an example of transmission power change using the changing coefficients $\alpha$ and $\beta$ is indicated by an expression 3 given below. It is to be noted that the transmission power after changed is represented by P_updated and the transmission power to be made a reference is represented by P_default, and they are dB values. Further, it is assumed that the reference transmission power P_default is shared by the individual information processing apparatus (AP and subordinate apparatus) in the system by some method in advance. The following expression is a logarithmical expression.

$$P\_updated = P\_default - (D\_EXTCCA\_TH/\alpha) + \beta \quad \text{Expression 3}$$

For example, a case is assumed in which a has a positive value and the extended CCA threshold value EXTCCA_TH is higher than the default threshold value EXTCCA_TH_default. In this case, the transmission power decreases as D_EXTCCA_TH increases. In other words, the transmission power decreases as the extended CCA threshold value EXTCCA_TH_updated increases.

Further, a case is assumed in which a has a positive value and the extended CCA threshold value EXTCCA_TH_updated is lower than the default threshold value EXTCCA_TH_default. In this case, the transmission power increases as D_EXTCCA_TH decreases. In other words, the transmission power increases as the extended CCA threshold value EXTCCA_TH_updated decreases.

Further, a case is assumed in which a has a positive value and the extended CCA threshold value EXTCCA_TH_updated is higher than the default threshold value EXTCCA_TH_default. Even in such a case as just described, P_updated calculated in accordance with the expression 3 given hereinabove possibly becomes higher than P_default. It is assumed that, in this case, the control unit 230 of the information processing apparatus (STA) 200 uses P_default without changing the transmission power.

Similarly, a case is assumed in which a has a positive value and the extended CCA threshold value EXTCCA_

TH_updated is lower than the default threshold value EXTCCA_TH_default. Also in such a case as just described, P_updated calculated in accordance with the expression 3 given hereinabove possibly becomes lower than P_default. It is assumed that, in this case, the control unit 230 of the information processing apparatus (STA) 200 uses P_default without changing the transmission power.

Here, the control unit 230 of the information processing apparatus (STA) 200 is not restricted to use transmission power lower than calculated P_updated (namely, to use a different value in a direction in which the own apparatus becomes more disadvantageous). In this case, calculated P_updated is dealt with as an upper limit value that can be set by the control unit 230.

It is assumed that, where the penalty or the preferential treatment to be applied acts in the reverse direction in this manner, the control unit 230 of the information processing apparatus (STA) 200 uses the default transmission parameter. This similarly applies also to the other transmission parameters indicated hereinbelow.

[Example of Setting of Transmission Fixed Waiting Time]

The control unit 230 of the information processing apparatus (STA) 200 can change the transmission fixed waiting time on the basis of D_EXTCCA_TH.

Here, the transmission fixed waiting time corresponds, for example, to the AIFS (Arbitration Inter Frame Space) in the IEEE (Institute of Electrical and Electronic Engineers) 802.11 standard. Further, the AIFS corresponds to a time slot number (AIFSN (Arbitration Inter Frame Space number)) by which, when a transmission trial is performed, it must be waited.

In particular, the control unit 230 of the information processing apparatus (STA) 200 can change the AIFSN on the basis of D_EXTCCA_TH.

For example, an example in which the changing coefficient (transmission fixed waiting time changing coefficient) $\gamma$ is used to change the AIFSN is indicated by an expression 4 given below. Here, the AIFSN after changed is represented by AIFSN_updated and the default AIFSN is represented by AIFSN_default, and they have true values.

$$\text{AIFSN\_updated} = \text{AIFSN\_default} + (D\_EXTCCA\_TH/\gamma) \quad \text{Expression 4}$$

Here, the default AIFSN represents a value of the AIFSN informed by the information processing apparatus (AP) 100 using EDCA Parameter IE of a beacon frame. Change of this AIFSN is applied to all access categories.

For example, a case is assumed in which a has a positive value and the extended CCA threshold value EXTCCA_TH_updated is higher than the default threshold value EXTCCA_TH_default. In this case, the AIFSN (namely, the waiting slot number) increases as D_EXTCCA_TH increases.

Further, for example, a case is assumed in which a has a positive value and the extended CCA threshold value EXTCCA_TH_updated is lower than the default threshold value EXTCCA_TH_default. In this case, the AIFSN (namely, the waiting slot number) decreases as D_EXTCCA_TH decreases.

Further, an example in which the one slot time length T_slot is changed using, for example, the changing coefficient (transmission fixed waiting time changing coefficient) $\kappa$ is indicated by an expression 5 given below. Here, T_slot after changed is represented by T_slot_updated and default T_slot is represented by T_slot_default, and they have true values.

$$T\_\text{slot\_updated} = T\_\text{slot\_default} \times \kappa \quad \text{Expression 5}$$

Further, an example in which the SIFS (Short Inter Frame Space) length that is waiting time when AIFSN=0 is changed using, for example, the changing coefficient (transmission fixed waiting time changing coefficient) $\tau$ is indicated by an expression 6 given below. Here, the SIFS after changed is represented by SIFS_updated and the default SIFS is represented by SIFS_default, and they have true values.

$$\text{SIFS\_updated} = \text{SIFS\_default} \times \tau \quad \text{Expression 6}$$

Here, the control unit 230 of the information processing apparatus (STA) 200 is not restricted to use a set value higher than the calculated AIFSN_updated, T_slot_updated and SIFS_updated (namely, to use a different value in a direction in which the own apparatus becomes more disadvantageous).

[Example of Setting of Carrier Sense Random Waiting Time]

The carrier sense random waiting time corresponds, for example, to a CW (Contention Window) indicative of a range of random backoff in the IEEE802.11 standard. As the CW, CWmin and CWmax are available. In the following, as an example, an example of a case in which the control unit 230 of the information processing apparatus (STA) 200 changes CWmin on the basis of D_EXTCCA_TH is indicated.

An example in which CWmin is changed using the changing coefficients $\delta$ and $\varepsilon$ is indicated by an expression 7 given below. Here, CWmin after changed is represented by CW_updated and default CWmin is represented by CW_default, and they have true values.

$$CW\_\text{updated} = CW\_\text{default} \times (D\_EXTCCA\_TH/\delta) + (D\_EXTCCA\_TH/\varepsilon) \quad \text{Expression 7}$$

Here, it is assumed that the default CWmin designates a value of CWmin informed by the information processing apparatus (AP) 100 using EDCA Parameter IE of a beacon frame. A change of this CWmin is applied to all access categories. It is to be noted that, for $\delta$ and $\varepsilon$, different values may be allocated to different access categories.

Further, while CWmin is described here, a similar change may be applied also to CWmax.

For example, a case is assumed in which $\delta$ and $\varepsilon$ have positive values and the extended CCA threshold value EXTCCA_TH_updated is higher than the default threshold value EXTCCA_TH_default. In this case, as D_EXTCCA_TH increases (namely, as the extended CCA margin value increases), CWmin increases and the expected value of the random waiting time becomes high.

Meanwhile, a case is assumed in which $\delta$ and $\varepsilon$ have positive values and the extended CCA threshold value EXTCCA_TH_updated is lower than the default threshold value EXTCCA_TH_default. In this case, as D_EXTCCA_TH decreases (namely, as the extended CCA threshold value decreases), CWmin decreases and the expected value of the random waiting time becomes low.

Here, the control unit 230 of the information processing apparatus (STA) 200 is not restricted to use a set value longer than calculated CW_updated (namely, to use a different value in a direction in which the own apparatus becomes more disadvantageous).

[Example of Setting of Maximum Frame Time Length]

The control unit 230 of the information processing apparatus (STA) 200 can change the maximum frame time length on the basis of D_EXTCCA_TH. Here, the maximum frame time length corresponds, for example, to a PPDU (PLCP (Physical Layer Convergence Protocol) Protocol Data Unit) time length.

For example, the control unit 230 of the information processing apparatus (STA) 200 can provide an upper limit to the PPDU time length and determine the upper limit on the basis of D_EXTCCA_TH.

An example in which the upper limit to the PPDU time length is changed using the changing coefficients µ and v is indicated by an expression 8 given below. Here, the PPDU time length upper limit value after changed is represented by T_updated, and it is assumed that this is a true value.

$$T\_updated = \mu - v \times D\_EXTCCA\_TH \quad \text{Expression 8}$$

For example, a case is assumed in which v has a positive value and the extended CCA threshold value EXTCCA_TH_updated is higher than the default threshold value EXTCCA_TH_default. In this case, as D_EXTCCA_TH increases (namely, as the extended CCA threshold value increases), T_updated (namely, the time length of the PPDU) decreases.

Further, a case is assumed in which v has a positive value and the extended CCA threshold value EXTCCA_TH_updated is lower than the default threshold value EXTCCA_TH_default. In this case, as D_EXTCCA_TH decreases (namely, as the extended CCA threshold value decreases), T_updated (namely, the time length of the PPDU) increases.

Here, the control unit 230 of the information processing apparatus (STA) 200 is not restricted to use a set value shorter than calculated T_updated (namely, to use a different value in a direction in which the own apparatus becomes more disadvantageous).

It is to be noted that, as described hereinabove, from the purpose to change the exclusive time length of a wireless resource, similar calculation can be applied also in regard to a maximum transmission information amount in single time frame transmission, a maximum packet connection number in single time transmission, a maximum re-sending time number of the same packet and a maximum time length that can be used for continuous transmission of a plurality of frames.

[Example of Setting of Usable Channel Bandwidth]

The control unit 230 of the information processing apparatus (STA) 200 can change a channel bandwidth usable for transmission on the basis of D_EXTCCA_TH.

An example in which the usable channel bandwidth is changed using the changing coefficient λ is represented by an expression 9 given below. Here, the usable channel bandwidth after changed is represented by BW_updated and the default usable channel bandwidth is represented by BW_default while the minimum granularity is represented by BW_unit, and it is assumed that they are true values.

$$BW\_updated = BW\_default - \{(\lambda \times D\_EXTCCA\_TH)/BW\_unit\} \times BW\_unit \quad \text{Expression 9}$$

For example, a case is assumed in which λ has a positive value and the extended CCA threshold value EXTCCA_TH_updated is higher than the default threshold value EXTCCA_TH_default. In this case, as D_EXTCCA_TH increases (namely, as the extended CCA threshold value increases), BW_updated (namely, the usable channel bandwidth) decreases.

On the other hand, a case is assumed in which A has a positive value and the extended CCA threshold value EXTCCA_TH_updated is lower than the default threshold value EXTCCA_TH_default. In this case, as D_EXTCCA_TH decreases (namely, as the extended CCA threshold value decreases), BW_updated (namely, the usable channel bandwidth) increases.

Here, the control unit 230 of the information processing apparatus (STA) 200 is not restricted to use a set value shorter than calculated BW_updated (namely, to use a different value in a direction in which the own apparatus becomes more disadvantageous).

[Example of Setting of Usable Channel Frequency]

The control unit 230 of the information processing apparatus (STA) 200 can change a channel frequency usable for transmission on the basis of D_EXTCCA_TH.

For example, the control unit 230 of the information processing apparatus (STA) 200 uses, when D_EXTCCA_TH is higher than the channel restriction operation decision coefficient ω, a channel designated from the information processing apparatus (AP) 100.

It is to be noted that, in change of the transmission parameters described hereinabove, all of a plurality of changing coefficients may not necessarily be conveyed or used. For example, such a process that only a is used while β is not used or that only δ is used while ε is not used is permissible. This similarly applies also to the other embodiments.

[Transmission Process and Reception Response Process]

The control unit 230 of the information processing apparatus (STA) 200 performs change of an interlocking parameter (transmission parameter) on the basis of a notification from the information processing apparatus (AP) 100 as described hereinabove. Further, after the change, the control unit 230 of the information processing apparatus (STA) 200 performs an extended CCA operation and a transmission process. It is to be noted that the extended CCA operation is depicted in FIGS. 3 and 7.

Here, a case is assumed in which the information processing apparatus (STA) 200 changes transmission power as an interlocking parameter. In this case, the control unit 230 of the information processing apparatus (STA) 200 notifies the information processing apparatus (AP) 100 of the connection destination of information regarding the set transmission power (transmission power information). For example, the control unit 230 of the information processing apparatus (STA) 200 places and transmits information indicative of the transmission power P_updated after changed into and together with part of a frame. Consequently, the information processing apparatus (AP) 100 can perform transmission power control in accordance with the change of the transmission poser by the information processing apparatus (STA) 200 side. An example of a frame format for the notification of the transmission power after changed in this manner is depicted in FIG. 13.

[Example of Format of Frame Used for Transmission]

FIG. 13 is a view depicting examples of a format of a frame used for transmission by the information processing apparatus (STA) 200 in the first embodiment of the present technology.

In a of FIG. 13, an example of a frame format where transmission power information is placed in a PLCP header is depicted. In particular, an example in which transmission power information is placed in SIG 421 of a PLCP header.

In b of FIG. 13, an example of a frame format where transmission power information is placed in the MAC headers 422 and 423 is depicted.

In c of FIG. 13, an example of a frame format where transmission power information is placed in a payload part 424 of a management frame is depicted. It is to be noted that the payload part 424 is connected to part of a transmission frame by frame aggregation.

In d of FIG. 13, an example of a frame format where transmission power information is placed in a payload part 425 in which Ether Type of an LLC-SNAP header has a value different from an ordinary value. It is to be noted that the payload part 425 is connected to part of a transmission frame by frame aggregation.

Although the frame formats depicted in a and b of FIG. 13 have a small overhead, it is necessary for change an existing format. Therefore, a legacy apparatus cannot acquire data correctly from the signal, and there is the possibility that the legacy apparatus may perform an unexpected behavior.

The frame formats depicted in c and d of FIG. 13 have a greater overhead than that of the frame formats depicted in a and b of FIG. 13. However, a legacy apparatus can read off transmission power information placed in the frame formats and can ensure backward compatibility.

It is to be noted that FIG. 13 depicts an example of a frame format where a frame transmitted from the information processing apparatus (STA) 200 is a data frame and the data frame is an A-MPDU (aggregation MAC protocol data unit) in which a plurality of frames are connected to each other. However, the information processing apparatus (STA) 200 may place transmission power information into any arbitrary frame. For example, the information processing apparatus (STA) 200 may place transmission power information into a data frame, a management frame, a control frame or the like but not in an aggregation state and transmit the same separately.

[Example of Transmission Power Control]

The control unit 130 of the information processing apparatus (AP) 100 can perform transmission power control on the basis of information conveyed thereto from the information processing apparatus (STA) 200.

For example, the control unit 130 of the information processing apparatus (AP) 100 can set transmission power of a frame to be transmitted to the information processing apparatus (STA) 200 on the basis of transmission power information conveyed thereto from the information processing apparatus (STA) 200. For example, if the transmission power is set lower than the reference transmission power by the information processing apparatus (STA) 200, then the control unit 130 of the information processing apparatus (AP) 100 decreases the transmission power of a frame to be transmitted to the information processing apparatus (STA) 200 from the reference transmission power. Consequently, a penalty or a preferential treatment for ensuring the fairness as the overall system is applied. Further, if transmission power of the individual apparatus configuring the system decreases, then interference is reduced and the efficiency of the entire system can be improved.

Further, for example, the control unit 130 of the information processing apparatus (AP) 100 may send a reply frame of ACK/NACK (Negative ACKnowledgement) to a fame received from the information processing apparatus (STA) 200 using transmission power after transmission power control to the information processing apparatus (STA) 200.

Here, the information processing apparatus (STA) 200 determines an extended CCA threshold value on the basis of the reception strength of the reference frame. Therefore, the information processing apparatus (AP) 100 preferably maintains the transmission power of the reference frame to a predetermined value (reference transmission power).

In this manner, the control unit 230 of the information processing apparatus (STA) 200 can perform control for changing the extended CCA threshold value on the basis of information (for example, a margin value) included in a frame transmitted thereto from the information processing apparatus (AP) 100. For example, the control unit 230 of the information processing apparatus (STA) 200 can change the extended CCA threshold value on the basis of the margin value included in the frame and the reception strength of the frame. Further, the control unit 230 of the information processing apparatus (STA) 200 can change the extended CCA threshold value within a range determined on the basis of the margin value and the reception strength.

Further, the control unit 230 of the information processing apparatus (STA) 200 can determine a wireless transmission parameter on the basis of information included in a frame transmitted thereto from the information processing apparatus (AP) 100 and a variation amount of the extended CCA threshold value from the reference value. For example, the control unit 230 of the information processing apparatus (STA) 200 can determine at least one of transmission power, transmission fixed waiting time, carrier sense random waiting time, a maximum frame time length, a usable channel bandwidth and a usable channel frequency.

[Other Examples of Processing]

The control unit 130 of the information processing apparatus (AP) 100 may perform dynamic change of EXTC-CA_TH and a transmission parameter using a margin value and interlocking parameter calculation information determined by the own apparatus.

In this case, each subordinate apparatus of the information processing apparatus (AP) 100 (for example, an information processing apparatus (STA) 200) is requested to periodically transmit a reference frame to the information processing apparatus (AP) 100. It is to be noted that the transmission power of a reference frame can be maintained to a predetermined value even in a case in which the transmission power is changed by the process described hereinabove by the information processing apparatus (STA) 200.

The control unit 130 of the information processing apparatus (AP) 100 may deal with the lowest reception strength from among reception strengths of a reference frame from all subordinate apparatus (STA) as R_ref described hereinabove and perform an extended CCA threshold value determination process, an interlocking parameter setting process and so forth as described hereinabove. Here, the reception intensity dealt with as R_ref need not necessarily be the lowest reception strength but may be a reception strength selected in accordance with some other criterion. For example, the reception strength may be, for example, the highest reception strength, an average value/intermediate value obtained from a plurality of reception strength samples, a reception strength of a signal from a subordinate apparatus (STA) received last, a reception strength from a signal from a destination apparatus to which a signal is transmitted last from the own apparatus, the latest reception strength from a destination apparatus to which the own apparatus intends to perform transmission next or the like. It is to be noted that, even when the transmission power is changed by the information processing apparatus (AP) 100, preferably the transmission power of a reference frame maintains to a predetermined value.

[Example in which Combination of Margin Value and Interlocking Parameter Calculation Information are Shared]

The combinations of margin values and interlocking parameter calculation information depicted in FIG. 10 may be shared by the information processing apparatus (STA) 200. Where the combination is shared in this manner, the amount of information conveyed from the information processing apparatus (AP) 100 to the information processing apparatus (STA) 200 in the notification process (step S713 depicted in FIG. 8) can be reduced and the frame format for the notification can be simplified.

For example, identification information (for example, a mode number) for identifying each of combinations of margin values and interlocking parameter calculation information can be shared between the information processing apparatus (AP) 100 and the information processing apparatus (STA) 200. An example a relationship between mode numbers and combinations of margin values and interlocking parameter calculation information is depicted in FIG. 14.

FIG. 14 is a view depicting an example of combinations of margin values and interlocking parameter calculation information to be shared between the information processing apparatus (AP) 100 and the information processing apparatus (STA) 200 in the first embodiment of the present technology.

The control unit 130 of the information processing apparatus (AP) 100 issues a notification of a mode number as information indicative of a combination of a margin value and interlocking parameter calculation information in the notification process (step S713 depicted in FIG. 8). In this case, the control unit 230 of the information processing apparatus (STA) 200 can acquire the combination of the margin value and the interlocking parameter calculation information on the basis of the mode number notified by referring to the information depicted in FIG. 14. An example of a format where a mode number is placed into a beacon frame in order to notify of a mode number in this manner is depicted in FIG. 15.

[Example of Format of Beacon to be Used for Notification of Mode Number]

FIG. 15 is a view depicting an example of a format of a beacon frame exchanged between different information processing apparatus in the first embodiment of the present technology.

In the payload 431 of the beacon frame depicted in FIG. 15, Dynamic CCA Parameters 432 is placed. In the Dynamic CCA Parameters 432, information for notifying of a mode number is placed as information indicative of a changing rule.

In particular, the Dynamic CCA Parameters 432 is configured from Element ID 433, Length 434 and Mode Index 435.

In the Element ID 433, identification information is placed. In the Length 434, a field length is placed. In the Mode Index 435, information for specifying a mode number is placed.

In this manner, the control unit 130 of the information processing apparatus (AP) 100 performs control for transmitting information for specifying a set of first information to be used for determination of an extended CCA threshold value and a wireless transmission parameter interlocking with the first information to the information processing apparatus (STA) 200. Further, the information processing apparatus (AP) 100 and the information processing apparatus (STA) 200 can share information for specifying a set of first information and a wireless transmission parameter with another apparatus that belongs to the same network.

It is to be noted that this example indicates an example in which a combination of a margin value and interlocking parameter calculation information is shared between the information processing apparatus (AP) 100 and the information processing apparatus (STA) 200. However, a combination of a margin value and interlocking parameter calculation information may be shared with an information processing apparatus (AP) belonging to another network. In other words, the information processing apparatus (AP) 100 and the information processing apparatus (STA) 200 can share information for specifying the combination with at least one of other apparatus belonging to the same network and other apparatus belonging to a different network.

Here, since it is necessary for all information processing apparatus (STA) to be equal, a list that is advantageous to only part of them cannot be used. However, it is considered that the information processing apparatus (AP) may be permitted to be more advantageous than the information processing apparatus (STA). Therefore, the combination information held by the information processing apparatus (AP) 100 (candidate list for a combination of a margin value and interlocking parameter calculation information) may be made information more advantageous than the combination information held by the information processing apparatus (STA) 200 (different more advantageous list).

[Modification in which Explicit Permission is Required for Extended CCA Operation]

When an extended CCA operation is to be performed, an explicit permission from the information processing apparatus (AP) 100 may be required. In particular, the information processing apparatus (AP) 100 notifies the subordinate apparatus (STA) of permission/non-permission with information added in a beacon frame. Further, the subordinate apparatus (STA) in the BSS operate in accordance with the information included in the beacon. An example of a format of a beacon in this case is depicted in FIG. 16.

[Example of Format of Beacon]

Figure 16:
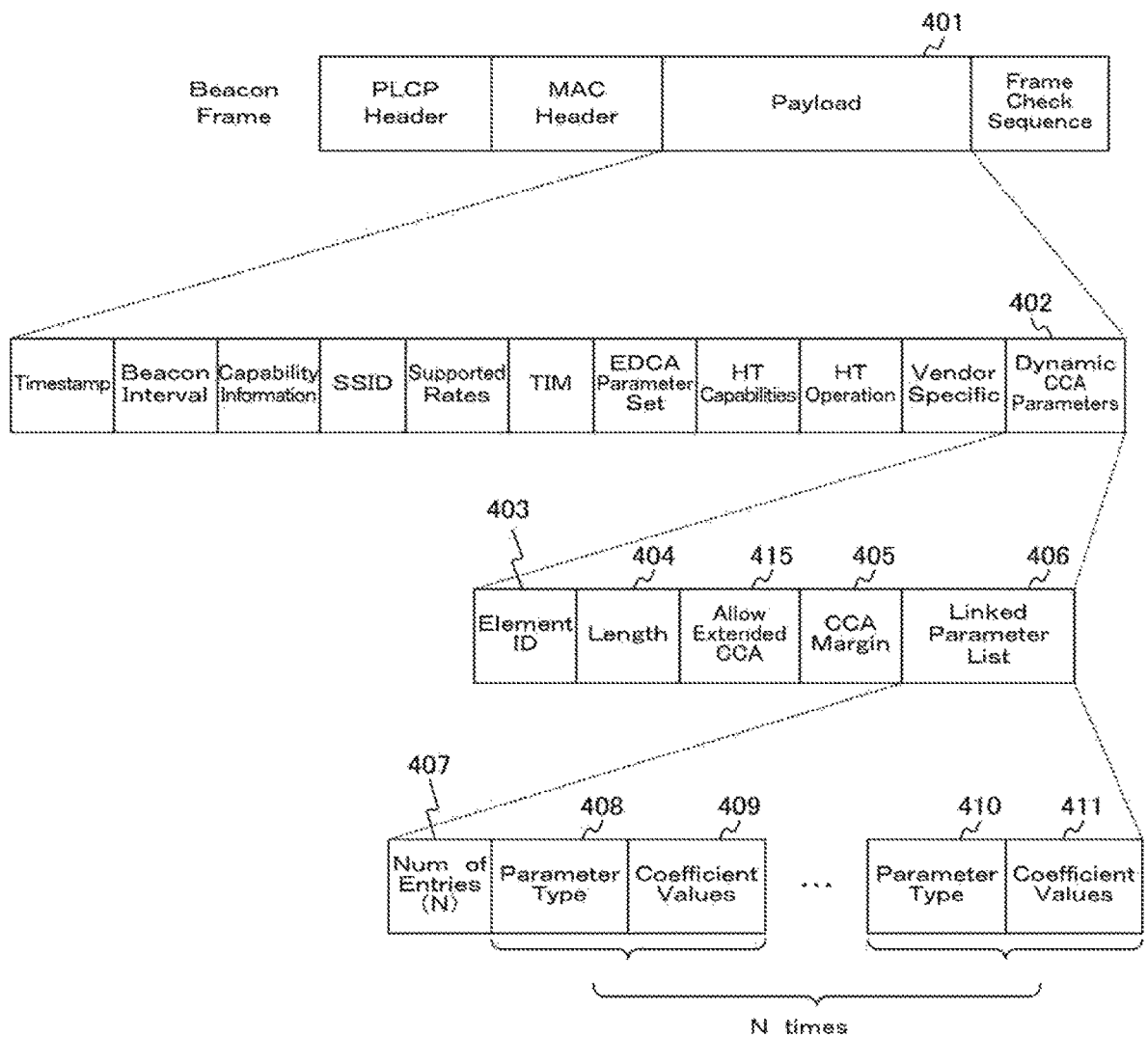
FIG. 16 is a view depicting another example of a format of a beacon frame exchanged between the different information processing apparatuses in the first embodiment of the present technology.

FIG. 16 is a view depicting an example of a format of a beacon frame exchanged between different information processing apparatus in the first embodiment of the present technology.

The example depicted in FIG. 16 is an example in which Allow Extended CCA 415 is added to the Dynamic CCA Parameters 402 depicted in FIG. 11. It is to be noted that any field having a same name as that in the example depicted in FIG. 11 corresponds to that in the example depicted in FIG. 11 and therefore, description of the same is omitted.

In the field of Allow Extended CCA 415, information indicative of whether each of the information processing apparatuses (STA and AP) in the BSS is to be permitted or not to be permitted to perform an extended CCA operation.

If the information processing apparatus (STA) receives a beacon frame, then it confirms on the basis of information placed in the Allow Extended CCA 415 in the beacon frame whether or not it is permitted to perform an extended CCA operation. Then, only when an extended CCA operation is permitted, the information processing apparatus (STA) performs an extended CCA operation. On the other hand, when an extended CCA operation is not permitted, even if the information processing apparatus (STA) is an HE apparatus ready for an extended CCA operation, it maintains an operation similar to that of a legacy apparatus. In this case, the substance in the field of the Margin 405 or the field of Linked Parameter List 406 is not used.

[Example in which Also Change of Other Carrier Sense Threshold Value is Used Together]

In addition to change of an extended CCA threshold value, change of an ordinary carrier sense detection threshold value may be used together. The ordinary carrier sensor detection threshold value particularly indicates a preamble detection threshold value, an energy detection threshold value and a CCA Mid Packet detection threshold value. For example, when the preamble detection threshold value is to be changed, it is possible to control the preamble detection threshold value to be a value equal to or lower than the determined extended CCA threshold value.

<2. Second Embodiment>

A second embodiment of the present technology indicates an example in which an upper limit level to the extended CCA threshold value, a lower limit level to transmission power and so forth are set.

It is to be noted that the configuration of the information processing apparatus in the second embodiment of the present technology is substantially same as that of the information processing apparatus (AP) 100 and the information processing apparatus (STA) 200 and 250 depicted in FIGS. 1, 2 and so forth. Therefore, common portions to those in the first embodiment of the present technology are denoted by like reference characters to those of the first embodiment of the present technology and part of description of them is omitted.

[General Processing]

Since general processing is similar to that of the first embodiment of the present technology, description of the same is omitted here.

[Extended CCA Margin Determination Process]

The extended CCA margin determination process is similar to that in the first embodiment of the present technology. However, in the second embodiment of the present technology, the information processing apparatus (AP) 100 determines a margin value and besides determines a parameter (transmission power lower limit level) to be used in the interlocking parameter setting process by the subordinate apparatus (STA) of the information processing apparatus (AP) 100. This transmission power lower limit value is preferably determined on the basis of the strength of interference. In the following, an example of determination of a transmission power lower limit level is described.

For example, the information processing apparatus (AP) 100 measures an average strength of interference though a monitor and sets the measurement value to I. Further, the information processing apparatus (AP) 100 sets a level with which a sufficient SINR can be ensured with respect to the I and noise power N as a lower limit level (transmission power lower limit level). This lower limit level is represented by LL. If the SINR with which a certain modulation and encoding method (MCS) can ensure a sufficient transmission characteristic is represented by SINR(m) where m is an index of the MCS, then the lower limit value LL(m) corresponding to each m is represented by an expression 10 given below. The expression 10 is a representation by true values.

$$LL(m)=\text{SINR}(m)\times\{I+N\} \quad \text{Expression 10}$$

Here, each LL(m) may have a value obtained by adding a predetermined offset to a value obtained in accordance with the expression 10. Further, the number of LL values may not be equal to the number of used SMCS values and may be represented, for example, by an LL value assuming a specific MCS value.

[Interlocking Parameter Information Determination Process]

The interlocking parameter information determination is similar to that in the first embodiment of the present technology. However, it is assumed that, in the second embodiment of the present technology, as the interlocking parameter, at least information regarding the transmission power is included.

[Notification Process]

The control unit 130 of the information processing apparatus (AP) 100 notifies the information processing apparatus (STA) 200 of information indicative of a created changing rule. In the second embodiment of the present technology, an example is described in which the information processing apparatus (AP) 100 places a margin value for extended CCA threshold value calculation and interlocking parameter calculation information (including at least a transmission power lower limit level) into a frame in order to notify of them. The frame into which such information is to be placed may be a beacon frame to be conveyed, for example, to all of the subordinate apparatus (STA) or may be another management frame to be conveyed individually. Here, as an example, an example of a format when such information as described above is placed into a beacon frame is described.

[Example of Format of Beacon]

Figure 17:
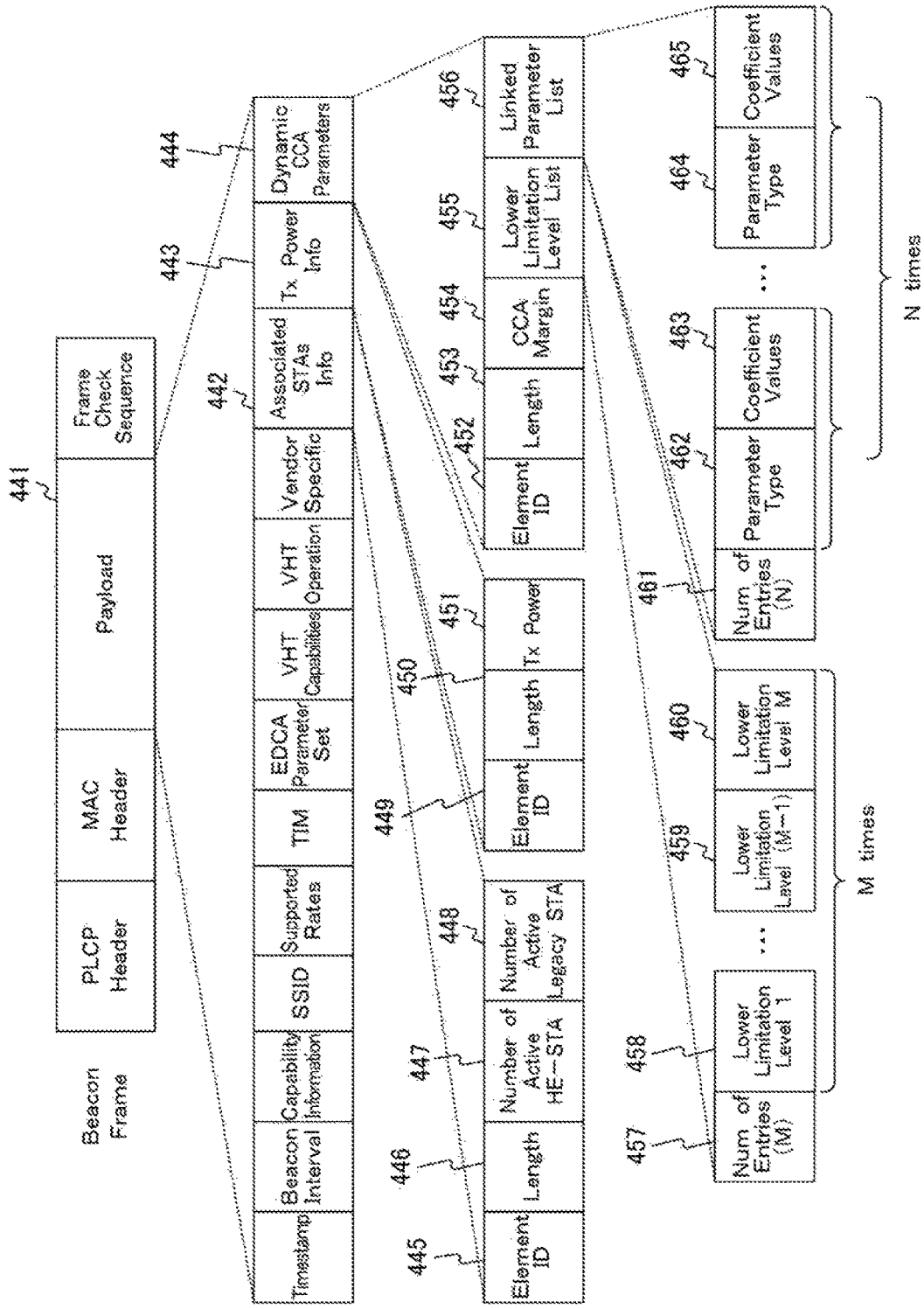
FIG. 17 is a view depicting a further example of a format of a beacon frame exchanged between different information processing apparatuses in a second embodiment of the present technology.

FIG. 17 is a view depicting an example of a format of a beacon frame exchanged between different information processing apparatus in the second embodiment of the present technology.

In the payload 441 of the beacon frame depicted in FIG. 17, Associated STAs Info 442, Tx Power Info 443 and Dynamic CCA Parameters 444 are disposed.

It is to be noted that the example depicted in FIG. 17 is an example in which, to the payload 401 depicted in FIG. 11, Associated STAs Info 442 and Tx Power Info 443 are added. Further, the example depicted in FIG. 17 is an example in which, to the Dynamic CCA Parameters 402 depicted in FIG. 11, Lower Limitation Level List 455 is added. Therefore, since any field having a name same as that depicted in FIG. 11 corresponds to that in the example depicted in FIG. 11, description here is omitted.

The Associated STAs Info 442 is configured from Element ID 445, Length 446, Number of Active HE-STA 447 and Number of Active Legacy STA 448.

In Element ID 445, identification information is placed. In Length 446, a field length is placed.

In Number of Active HE-STA 447, the number of apparatus (HE apparatus) that have a specific function from among subordinate apparatus (STA) to which the information processing apparatus (AP) 100 is connected is placed.

In Number of Active Legacy STA 448, the number of legacy apparatus from among the subordinate apparatus (STA) to which the information processing apparatus (AP) 100 is connected is placed.

Consequently, if the information processing apparatus (AP) 100 receives a beacon transmitted in this format from another information processing apparatus (AP), then it can grasp the number of HE apparatus and legacy apparatus belonging to another wireless network.

It is to be noted that, when the number of apparatus is to be stored, the number of apparatus in which the quantity of traffic per a certain period of time is taken into account is stored. For example, since an apparatus that is connected but does not communicate at all does not contribute at all as interference to communication to a different station, the contribution of the apparatus upon counting may be reduced or may be eliminated from a coefficient.

Tx Power Info 443 is configured from Element ID 449, Length 450 and Tx Power 451.

In Element ID 449, identification information is placed. In Length 450, a field length is placed.

In Tx Power 451, information for specifying transmission power (for example, reference transmission power) to be used in transmission of a reference frame (beacon) is placed.

Dynamic CCA Parameters 444 is configured from Element ID 452, Length 453, CCA Margin 454, Lower Limitation Level List 455, and List 456.

Lower Limitation Level List 455 is configured from Num of Entries 457, Lower Limitation Level 1 458, Lower Limitation Level (M-1) 459 and Lower Limitation Level M

460. In this manner, Lower Limitation Level is configured from M fields. Here, M indicates the number of values of the lower limit level.

In Num of Entries 457, a quantity of values of the transmission power lower limit level is placed.

In Lower Limitation Level 1 458, a value LL of the transmission power lower limit value determined by the extended CCA margin determined process (transmission power margin determination process) described hereinabove is placed. Further, where a plurality of LL values exist, they are successively placed. For example, they are placed into Lower Limitation Level (M-1) 459 and Lower Limitation Level M 460.

It is to be noted that the position and the layer in which the information of Associated STAS Info 442 and Lower Limitation Level List 455 are placed are not limited to those in the example of FIG. 17 and may be another different position and layer.

[Extended CCA Threshold Value Determination Process]

In the second embodiment of the present technology, the information processing apparatus (STA) 200 calculates an upper limit value EXTCCA_TH_capable using the expression 1 given hereinabove and performs an arithmetic operation for further providing an upper limit to the calculated EXTCCA_TH_capable.

Here, while EXTCCA_TH_capable is an upper limit value for setting EXTCCA_TH_updated, this arithmetic operation designates an upper limit to the value of EXTCCA_TH_capable.

For example, the information processing apparatus (STA) 200 can determine an upper limit value by inverse calculation from a change of transmission power set by the interlocking parameter setting process. In the following, the arithmetic operation method is described.

For example, the information processing apparatus (STA) 200 determines transmission power with which it is estimated that a signal transmitted from the own apparatus is received by the information processing apparatus (AP) 100 in a reception strength higher by a margin value than EXTCCA_TH of the information processing apparatus (AP) 100 as a lower limit value to the settable transmission power. In particular, the information processing apparatus (STA) 200 determines a value obtained by adding a default extended CCA threshold value and a default margin value of the information processing apparatus (AP) 100 to a value obtained by subtracting a reception strength from transmission power of a reference frame as a settable lower limit value TXPOWER_capable to the transmission power. In particular, the settable lower limit value TXPOWER_capable to the transmission power can be calculated using an expression 11 given below. Here, it is assumed that EXTCCA_TH_default that is a default extended CCA threshold value of the information processing apparatus (AP) 100 is a common value known to the individual information processing apparatus in the system. It is to be noted that the following expression 11 is a logarithmic expression.

$$\text{TXPOWER\_capable} = \text{TXPOWER\_ref} - R\_\text{ref} + \text{EXTCCA}\_TH\_\text{default} + M \quad \text{Expression 11}$$

Here, in the expression 11, R_ref (dBm) represents the reception strength (RSSI), by the information processing apparatus (STA) 200, of the latest reference frame (beacon frame) received from an information processing apparatus (AP) 100 of the connection destination. Further, M represents the margin value notified from the information processing apparatus (AP) 100 in the notification process described hereinabove, and TXPOWER_ref represents the transmission power of the reference frame notified from the information processing apparatus (AP) 100. It is to be noted that R_ref may be a value obtained by performing filtering such as averaging for measurement results over a plurality of reference frames. Further, M is the margin value. Further, TXPOWER_capable may be restricted in value to an upper limit value or a lower limit value based on some other factor.

Then, the information processing apparatus (STA) 200 performs a lower limit process for TXPOWER_capable using an expression 12 given below.

$$\text{TXPOWER\_capable} = \max(\text{TXPOWER\_capable}, \text{TXPOWER\_ref} - R\_\text{ref} + R\_LL) \quad \text{Expression 12}$$

Here, in the expression 12, the lower limit reception level R_LL is calculated on the basis of the lower limit level information LL(m) notified from the information processing apparatus (AP) 100 in the notification process. For example, from among the values of LL(m), a maximum value that does not exceed R_ref (for example, RSSI of the beacon) can be determined as R_LL. Further, when R_ref is lower than all values of LL(m), a minimum value among the values of LL(m) can be determined as R_LL. Also, the information processing apparatus (STA) 200 may determine R_LL after adding a predetermined offset shared with the information processing apparatus (AP) 100 in advance to LL(m).

Then, the information processing apparatus (STA) 200 can determine TXPOWER_updated within a range that is not less than the lower limit value TXPOWER_capable (namely, within a range within which it is not lower).

Then, the information processing apparatus (STA) 200 calculates an upper limit value EXTCCA_TH_UL to EXTCCA_TH using the value of TXPOWER_updated and the values of α and β relating to transmission power from within the interlocking parameter calculation information notified from the information processing apparatus (AP) 100. In particular, the information processing apparatus (AP) 100 calculates the upper limit value EXTCCA_TH_UL using an expression 13.

$$\text{EXTCCA}\_TH\_UL = \alpha(P\_\text{default} - \text{TXPOWER\_updated} + \beta) + \text{EXTCCA}\_TH\_\text{default} \quad \text{Expression 13}$$

Here, the expression 13 is obtained by transforming the expression 2 and the expression 3 given hereinabove in order to inversely calculate D_EXTECCA_TH by applying TXPOWER_updated described hereinabove to P_updated, and is basically same.

The information processing apparatus (STA) 200 updates EXTCCA_TH_capable using the upper limit value EXTCCA_TH_UL to EXTCCA_TH. In particular, the information processing apparatus (STA) 200 updates EXTCCA_TH_capable using an expression 14.

$$\text{EXTCCA}\_TH\_\text{capable} = \min(\text{EXTCCA}\_TH\_\text{capable}, \text{EXTCCA}\_TH\_UL) \quad \text{Expression 14}$$

Here, that the information processing apparatus (STA) 200 applies EXTCCA_TH_capable to determine EXTCCA_TH_updated within the range to TXTCCA_TH_default and calculates D_EXTCCA_TH is similar to that in the first embodiment of the present technology.

Here, the information processing apparatus (STA) 200 may determine EXTCCA_TH_updated taking information of Associated STAs Info 442 (depicted in FIG. 17) received from an information processing apparatus (AP) 100 connected thereto into account. For example, the information processing apparatus (STA) 200 can determine EXTCCA_TH_updated to a rather high value when the ratio of legacy apparatus to the number of all connection apparatus is high, but can determine EXTCCA_TH_updated to a rather low value when the ratio is low.

In this manner, the upper limit level to the extended CCA threshold value can be made correspond to the lower limit value to the transmission power penalty.

[Interlocking Parameter Setting Process]

The interlocking parameter setting process is basically similar to that in the first embodiment of the present technology, and the information processing apparatus (STA) 200 determines an interlocking parameter on the basis of the value of D_EXTCCA_TH. However, as regards the change value of the transmission power, the information processing apparatus (STA) 200 applies TXPOWER_updated calculated in the extended CCA threshold value determination process described hereinabove.

[Transmission Process and Reception Response process]

The transmission process and the reception response process are similar to those in the first embodiment of the present technology, and therefore, description of them is omitted here.

In this manner, in the second embodiment of the present technology, extension is performed for the first embodiment of the present technology. Consequently, such a situation can be prevented that, when the value of EXTCCA_TH is increased simply, the transmission power becomes excessively low in an interlocking relationship and the efficiency of the entire system is decreased thereby. Further, since it becomes possible simultaneously to maintain the correspondence between the increase of EXTCCA_TH and the transmission power, the fairness can be maintained.

It is to be noted that the second embodiment of the present technology indicates an example in which two factors for extension are applied including a lower limit mechanism of TXPOWER_capable described hereinabove and correction with information of the number of HE apparatus and legacy apparatus taken into account. However, they need not necessarily be utilized in combination, but one of the factors may be applied independently.

<3. Third Embodiment>

The first embodiment of the present technology indicates an example in which an information processing apparatus (STA) determines an extended CCA threshold value on the basis of a margin value notified from an information processing apparatus (AP) 100.

A third embodiment of the present technology indicates an example in which an information processing apparatus (AP) 100 notifies information processing apparatus (STA) of an extended CCA threshold value such that the information processing apparatus (STA) use the notified extended CCA threshold value. In particular, the third embodiment of the present technology indicates an example in which, in the notification process, the information processing apparatus (AP) 100 passes not a margin value but an extended CCA threshold value to be applied by an information processing apparatus (STA) directly in the immediate.

It is to be noted that the configuration of the information processing apparatus in the third embodiment of the present technology is substantially same as that of the information processing apparatus (AP) 100 and the information processing apparatus (STA) 200 depicted in FIGS. 1, 2 and so forth. Therefore, common portions to those in the first embodiment of the present technology are denoted by like reference characters to those of the first embodiment of the present technology and part of description of them is omitted.

[Example of General Processing]

Figure 18:
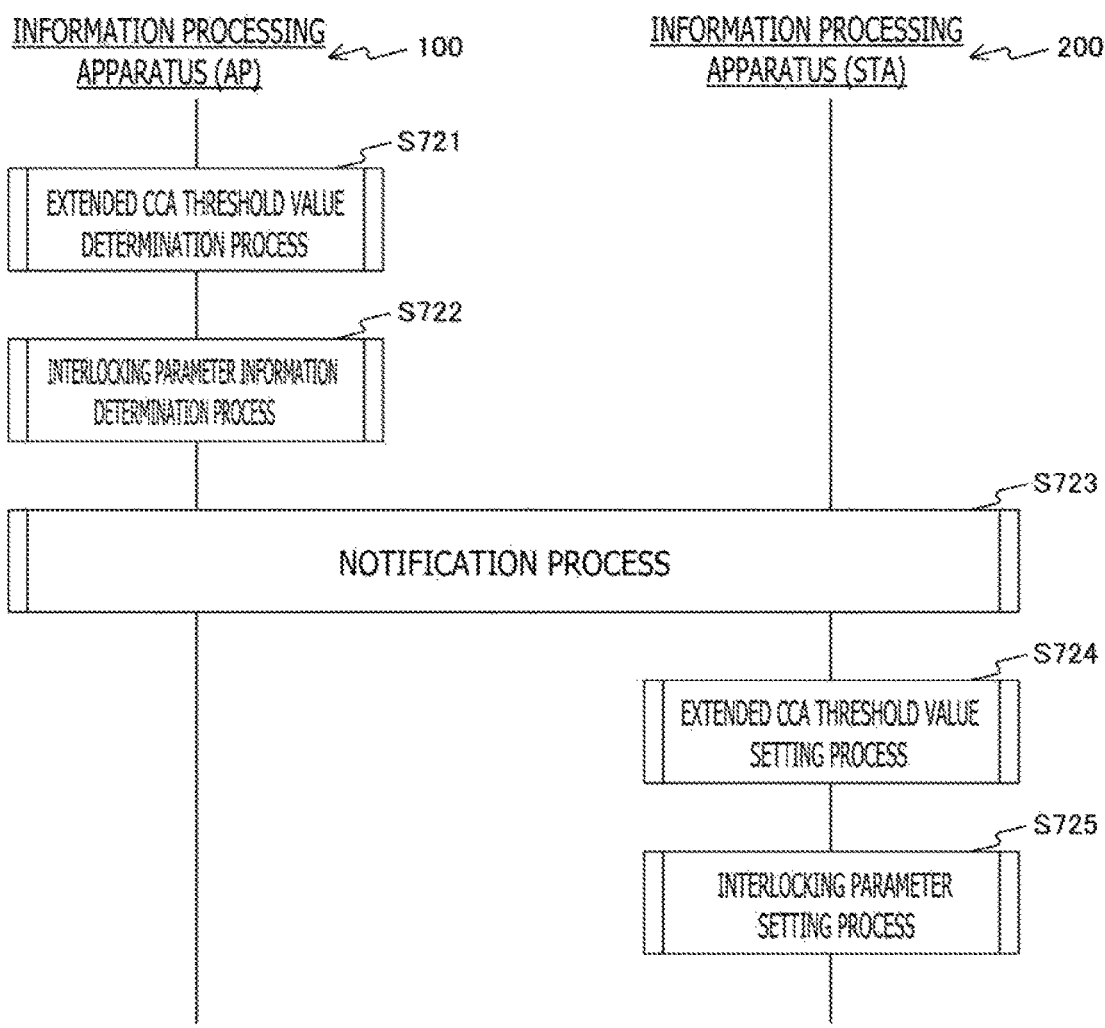
FIG. 18 is a sequence chart depicting an example of a flow of entire processes executed by different information processing apparatuses configuring a communication system 10 in a third embodiment of the present technology.

FIG. 18 is a sequence chart depicting an example of a flow of general processing executed by the informant processing apparatus configuring the communication system 10 in the third embodiment of the present technology. FIG. 18 depicts a flow of general processing relating to an information processing apparatus (AP) 100 and an information processing apparatus (STA) 200 as the information processing apparatus configuring the communication system 10.

First, the information processing apparatus (AP) 100 performs an extended CCA threshold value determination process (step S721). Then, the information processing apparatus (AP) 100 performs an interlocking parameter information determination process (step S722). Then, the information processing apparatus (AP) 100 performs a notification process to the information processing apparatus (STA) 200 (step S723).

Then, the information processing apparatus (STA) 200 performs an extended CCA threshold value setting process (step S724). Then, the information processing apparatus (STA) 200 performs an interlocking parameter setting process (step S725).

[Extended CCA Threshold Value Determination Process (Step S721 Depicted in FIG. 18)]

As described hereinabove, in the third embodiment of the present technology, the information processing apparatus (AP) 100 notifies the information processing apparatus (STA) of an extended CCA threshold value. Then, the information processing apparatus (STA) uses the notified extended CCA threshold value. Therefore, in the third embodiment of the present technology, the information processing apparatus (AP) 100 determines not a margin value but an extended CCA operation to be applied by the information processing apparatus (STA).

First, the control unit 130 of the information processing apparatus (AP) 100 estimates propagation attenuation to its subordinate apparatus (STA). For example, the control unit 130 of the information processing apparatus (AP) 100 can estimate propagation attenuation to each subordinate apparatus (STA) on the basis of information acquired from the subordinate apparatus (STA). As this information, for example, information notified from the subordinate apparatus (STA) in advance (transmission power P_ref of a reference frame, reception strength R_ref of a reference frame from the subordinate apparatus (STA)) can be used.

Then, the control unit 130 of the information processing apparatus (AP) 100 determines a value in which a propagation attenuation amount, transmission power P_self of the own apparatus and an extended CCA margin value M held in the inside are taken into account as an extended CCA threshold value EXTCCA_TH of the subordinate apparatus (STA). In particular, the extended CCA threshold value EXTCCA_TH can be determined using an expression 15 given below. The following expression is a logarithmic representation.

$$\text{EXTCCA\_}TH\_\text{capable}=P\_\text{self}-P\_\text{ref}+R\_\text{ref}+M \qquad \text{Expression 15}$$

In this manner, the control unit 130 of the information processing apparatus (AP) 100 successively determines the extended CCA threshold value EXTCCA_TH for the individual subordinate apparatus.

[Interlocking Parameter Information Determination Process (Step S722 Depicted in FIG. 18)]

The interlocking parameter information determination process is similar to that in the first embodiment of the present technology, and therefore, description of the same is omitted here.

[Notification Process (Step S723 Depicted in FIG. 18)]

The control unit 130 of the information processing apparatus (AP) 100 notifies the information processing apparatus (STA) 200 of information indicative of a created changing rule. The third embodiment of the present technology indicates an example in which the information processing apparatus (AP) 100 places an extended CCA threshold value in place of a margin value for the extended CCA threshold value calculation into a frame to notify of the same. The frame into which such information is placed may be a beacon frame to be conveyed, for example, to all subordinate apparatus (STA) or may be some other management frame to be conveyed individually. Here, as an example, an example of a format where such information is placed into a beacon frame is described.

[Example of Format of Beacon]

Figure 19:
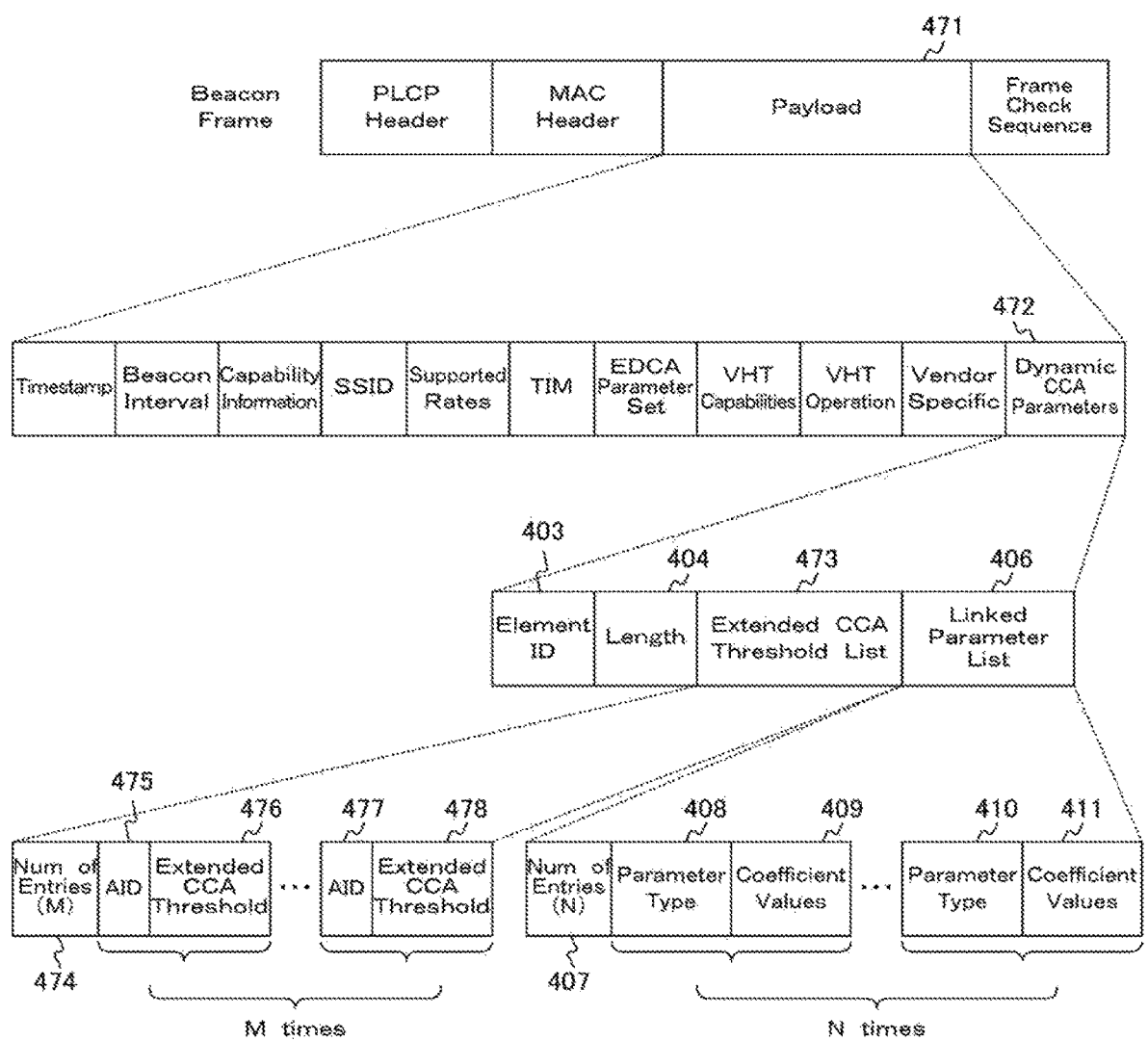
FIG. 19 is a view depicting an example of a format of a beacon frame exchanged between the different information processing apparatuses in the third embodiment of the present technology.

FIG. 19 is a view depicting an example of a format of a beacon frame exchanged between different information processing apparatus in the third embodiment of the present technology.

In the payload 471 depicted in FIG. 19, Dynamic CCA Parameters 472 is disposed.

It is to be noted that the example depicted in FIG. 19 is different from the example depicted in FIG. 11 in that, in the Dynamic CCA Parameters 402 depicted in FIG. 11, Extended CCA Threshold List 473 is disposed in place of CCA Margin 405. Further, in the Extended CCA Threshold List 473, an extended CCA threshold value for each subordinate apparatus (STA) is placed for each subordinate apparatus (STA). Therefore, portions common to those in the example depicted in FIG. 11 are denoted by like reference characters, and description of them is omitted.

Extended CCA Threshold List 473 is configured from Num of Entries (M) 474, AID 475 and 477, and Extended CCA Threshold 476 and 478.

In Num of Entries (M) 474, the number of subordinate apparatus (STA) to which the information processing apparatus (AP) 100 is connected (number of subordinate apparatus (STA) to which an extended CCA threshold value is to be conveyed) is placed.

In AID 475 and 477, information that can specify for which subordinate apparatus (STA) each extended CCA threshold value is is placed. FIG. 19 depicts an example in which an AID (Association ID) is used as the information.

An extended CCA threshold value is placed in each Extended CCA Threshold 476 and 478. Further, a number of combinations of AID 475 and 477 and Extended CCA Threshold 476 and 478 equal to the number of subordinate apparatus (STA) to which an extended CCA threshold value is to be conveyed are stored.

[Extended CCA Threshold Value Setting Process (Step S724 Depicted in FIG. 18)]

In the notification process described above, an extended CCA operation is conveyed from the information processing apparatus (AP) 100 to the subordinate apparatus (STA). Therefore, each information processing apparatus (STA) 200 applies the extended CCA threshold value conveyed thereto in the notification process (extended CCA threshold value to be applied by the own apparatus).

It is to be noted that the information processing apparatus (STA) 200 may set, using the extended CCA threshold value conveyed thereto as an upper limit, a different extended CCA threshold value within a range lower than the extended CCA threshold value.

[Interlocking Parameter Setting Process]

Since the interlocking parameter setting process is similar to that of the first embodiment of the present technology, description is omitted here.

[Transmission Process and Reception Response Process]

Since the transmission process and reception response process are similar to those of the first embodiment of the present technology, description is omitted here.

In this manner, the control unit 130 of the information processing apparatus (AP) 100 can transmit one of information for specifying an extended CCA threshold value (for example, an extended CCA threshold value) and information (for example, a margin value) for designating a range within which the extended CCA threshold value is to be changed by another different apparatus that receives a reference frame on the basis of a ratio to the reception strength of the reference frame.

It is to be noted that the third embodiment of the present technology indicates an example in which the control unit 130 of the information processing apparatus (AP) 100 calculates and conveys only an extended CCA threshold value while calculation of an interlocking parameter (for example, transmission power) to be used by a subordinate apparatus (STA) is performed by the control unit 230 of the information processing apparatus (STA) 200. However, also calculation of an interlocking parameter (for example, transmission power) may be performed by the control unit 130 of the information processing apparatus (AP) 100 such that the interlocking parameter is conveyed to the subordinate apparatus (STA). In this case, the information processing apparatus (STA) 200 can apply the extended CCA threshold value and the value of the interlocking parameter (for example, transmission power) conveyed thereto as they are.

Further, the control unit 230 of the information processing apparatus (STA) 200 is not restricted to use a different set value lower than the transmission power conveyed thereto.

Although the transmission power is used here as an example of the interlocking parameter, this similarly applies also to the other interlocking parameters such as AIFSN. Also in any other interlocking parameter, the control unit 230 of the information processing apparatus (STA) 200 is not restricted to use a different set value with which it becomes more disadvantageous in comparison with the parameter set value conveyed thereto.

[Example that Utilizes Also Change of Other Carrier Sense Threshold Value]

In addition to change of an extended CCA threshold value, change of a detection threshold value for ordinary carrier sense may be used together. The detection threshold value for ordinary carrier sense particularly indicates a preamble detection threshold value, an energy detection threshold value and a CCA Mid Packet detection threshold value. For example, when the preamble detection threshold value is to be changed, it is possible to control the preamble detection threshold value to be a value equal to or lower than the determined extended CCA threshold value.

<4. Fourth Embodiment>

A fourth embodiment of the present technology indicates an example in which a desired detection level (desired reception level) is conveyed to the communication partner. In particular, the fourth embodiment of the present technology is different from the first to third embodiments of the present technology in the method for acquiring an extended CCA threshold value to be used when an extended CCA operation is to be performed.

It is to be noted that the configuration of the information processing apparatus in the fourth embodiment of the present technology is substantially same as that of the information processing apparatus (AP) 100 and the information processing apparatus (STA) 200 depicted in FIGS. 1, 2 and so forth. Therefore, common portions to those in the first embodiment of the present technology are denoted by like reference characters to those of the first embodiment of the present technology and part of description of them is omitted.

[Example of Extended CCA Operation]

First, a contrivance of an extended CCA operation in the fourth embodiment of the present technology is described.

An information processing apparatus (AP and STA) that performs an extended CCA operation adds, to a packet to be transmitted from the own apparatus, information for specifying a desired detection level and transmits the packet. Here, as a field to which information for specifying a desired detection level is added, for example, part of a field in a PLCP header is applicable. An example in which information for specifying a desired detection level into part of a field in an PLCP header is depicted in FIG. 20.

[Example of Format of PLCP Header]

FIG. 20 is a view depicting an example of a format of a PLCP header exchanged between different apparatus configuring the communication system 10 in the fourth embodiment of the present technology. FIG. 20 takes a format of a PPDU (Presentation-layer Protocol Data Unit) as an example for description.

The PPDU is configured from Preamble 481, Signal 482, Extension 483, Service 484, MPDU (MAC Protocol Data Unit) 485 and Tail & Pad 486.

Preamble 481 indicates a portion corresponding to IEEE802.11 L-STF (Legacy Short Training Field) or L-LTF (Legacy Long Training Field) depicted in b of FIG. 20. Further, the Preamble 481 has a format compatible with them.

SIGNAL 482 is a field in which information necessary to decode a subsequent signal is described. As an example, IEEE802.11 L-SG (Legacy SIGNAL) or VHT-SIG-A (Very High Throughput SIGNAL-A) depicted in b of FIG. 20 corresponds to this.

It is to be noted that, depending upon the format, an additional field (VHT-STF, VHT-LTF or VHT-SIG-B) is sometimes added further subsequently to the SIGNAL 482.

Here, in the fourth embodiment of the present technology, a field for placing a desired detection level (Requested Detection Level) and a BSS identifier (COLOR information) is prepared newly at part of a field of the SIGNAL 482 that is the PLCP header within a physical header. In particular, a field for placing a desired detection level and a BSS identifier is provided newly at a portion dealt with as Reserved in SIGNAL 482 of the PLCP header part. In addition, each of the information processing apparatuses (except the legacy apparatus) calculates, after an attenuation amount to the communication partner upon transmission, a desired detection level on the basis of the attenuation amount and places the desired detection level into SIGNAL 482. Further, each information processing apparatus (except the legacy apparatus) places also an BSS identifier into SIGNAL 482 to transmit the BSS identifier.

It is to be noted that, in the fourth embodiment of the present technology, a desired detection level and a BSS identifier are provided at a portion dealt with as Reserved in SIGNAL 482. Consequently, a specification function in the fourth embodiment of the present technology can be implemented without disturbing reception of a legacy apparatus.

An information processing apparatus (other than a legacy apparatus) receiving a packet in which a desired detection level and a BSS identifier are placed acquires and uses the desired detection level and the BSS identifier in an extended CCA operation.

Further, in the fourth embodiment of the present technology, when information for specifying a desired detection level is placed into part of a field in a PLCP header, also COLOR information is placed into the PLCP header together.

[Example of Setting of Desired Detection Level]

Figure 21:
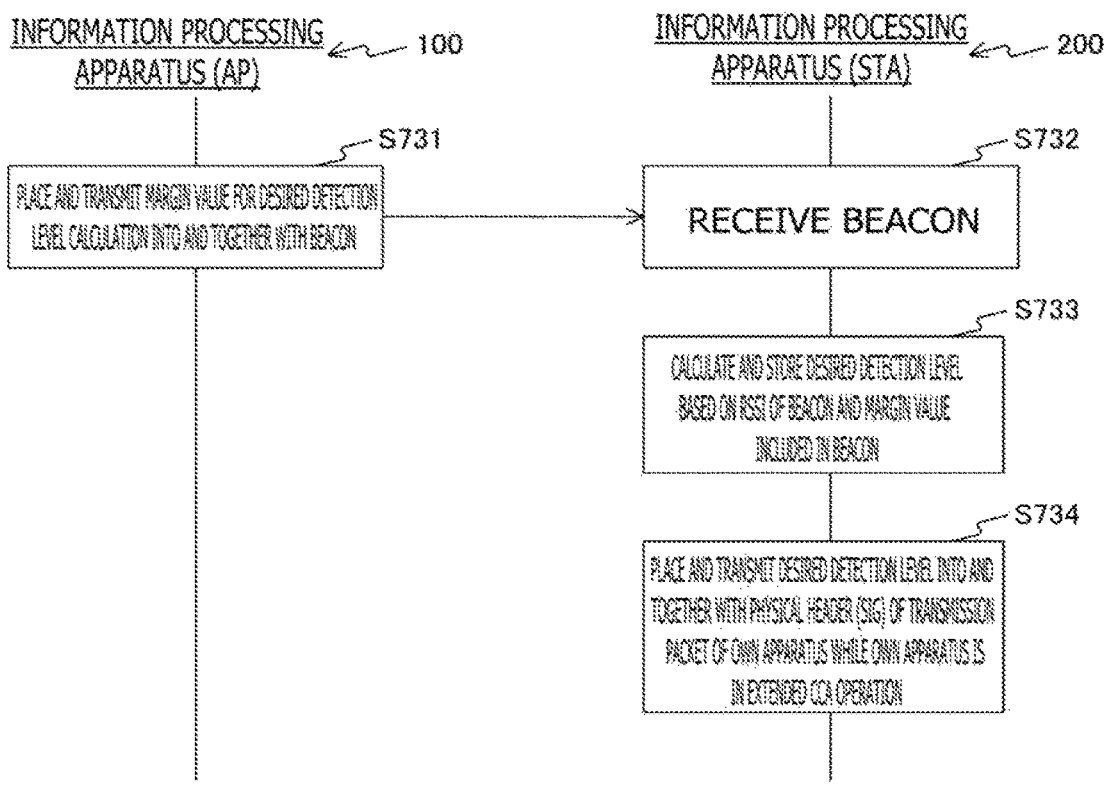
FIG. 21 is a sequence chart depicting an example of setting of a desired detection level by an information processing apparatus (STA) 200 in the fourth embodiment of the present technology.

FIG. 21 is a sequence chart depicting an example of setting of a desired detection level by the information processing apparatus (STA) 200 in the fourth embodiment of the present technology. In FIG. 21, a flow of general processing relating to the information processing apparatus (AP) 100 and the information processing apparatus (STA) 200 as the information processing apparatus configuring the communication system 10 is depicted. Further, FIG. 21 depicts an example in which the information processing apparatus (STA) 200 side performs an extended CCA operation determining the destination of a packet to the information processing apparatus (AP) 100.

First, the information processing apparatus (AP) 100 calculates a desired detection level calculation margin value. The calculation method can be similar to that of the extended CCA margin determination process (step S721 depicted in FIG. 18) in the first embodiment of the present technology. Then, the information processing apparatus (AP) 100 places the calculated desired detection level calculation margin value into a beacon and transmits the beacon (step S731).

The information processing apparatus (STA) 200 receives the beacon (step S732). Then, the information processing apparatus (STA) 200 calculates a desired detection level EXTCCA_TH_REQ.

For example, the control unit 230 of the information processing apparatus (STA) 200 estimates a propagation attenuation amount between the own apparatus (STA) and the destination of the packet (information processing apparatus (AP) 100). For example, the control unit 230 of the information processing apparatus (STA) 200 can estimate propagation attenuation to the information processing apparatus (AP) 100 on the basis of the information acquired from the information processing apparatus (AP) 100. As this information, for example, information conveyed from the information processing apparatus (AP) 100 in advance (transmission power P_ref of a reference frame and reception strength R_ref of a reference frame from the information processing apparatus (AP) 100) can be used. In this example, an example in which the destination is the information processing apparatus (AP) 100 and the reference frame is a beacon frame is described. An example of a format of the beacon frame in this case is depicted in FIG. 22.

[Example of Format of Beacon]

Figure 22:
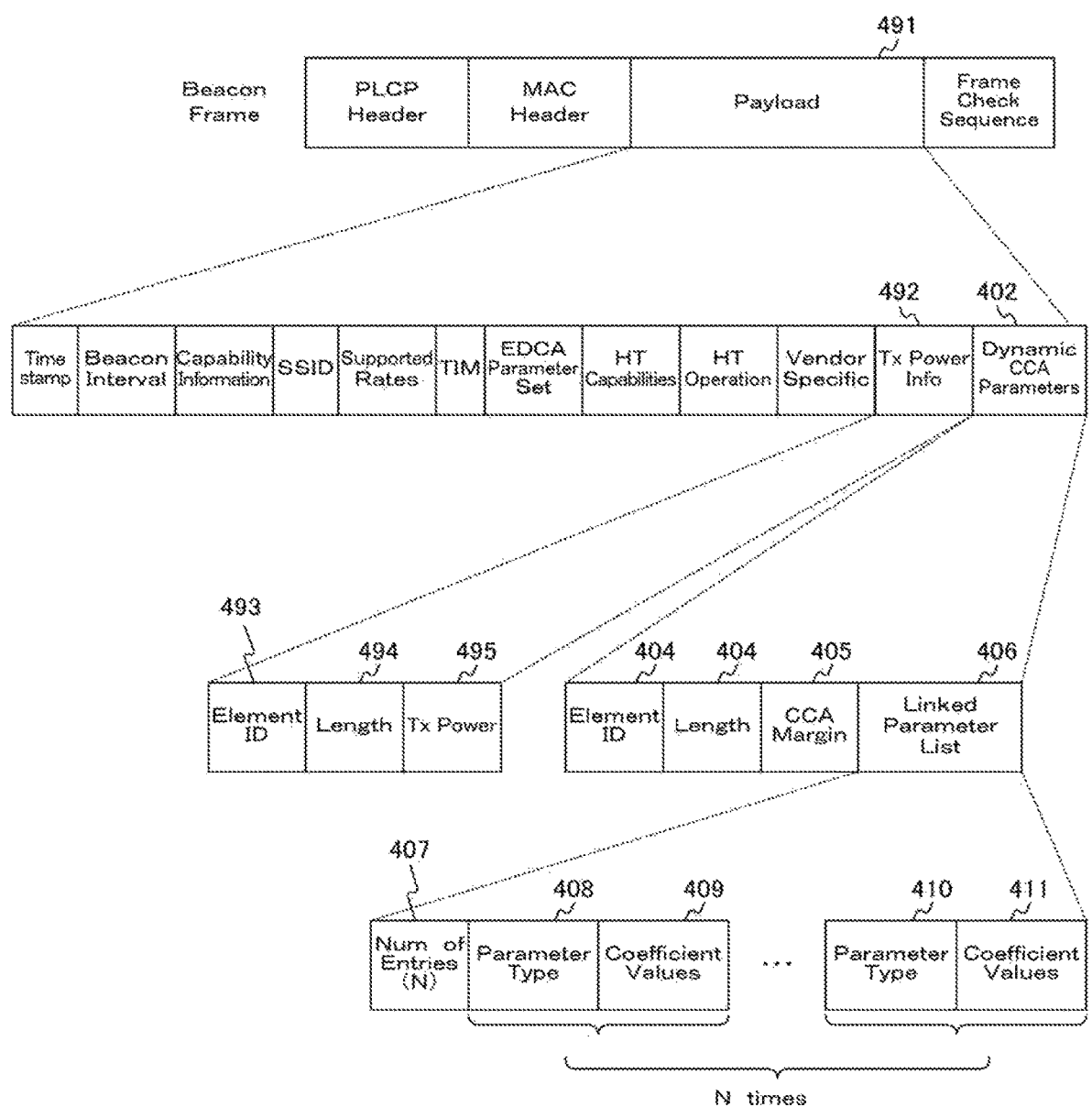
FIG. 22 is a view depicting an example of a format of a beacon frame exchanged between different information processing apparatuses in the fourth embodiment of the present technology.

FIG. 22 is a view depicting an example of a format of a beacon frame exchanged between information processing apparatus in the fourth embodiment of the present technology.

In the payload 491 of the beacon frame depicted in FIG. 22, Tx info 492 and Dynamic CCA Parameters 402 are disposed. It is to be noted that the example depicted in FIG. 22 is an example in which Tx info 492 is added in the payload 401 depicted in FIG. 11. Therefore, portions common to those of the example depicted in FIG. 11 are denoted by like reference characters, and description of them is omitted.

Tx info 492 is configured from Element ID 493, Length 494 and Tx Power 495. It is to be noted that they correspond to the portions of the same names depicted in FIG. 17.

As depicted in FIG. 22, in the beacon frame, transmission power P_ref of a reference frame is placed in Tx Power 495. Meanwhile, a margin value M necessary for desired detection level calculation is placed in Margin 405. Further, the RSSI of the beacon frame becomes the reception strength R_ref of the reference frame.

For example, the control unit 230 of the information processing apparatus (STA) 200 can determine a value in which a propagation attenuation amount, transmission power P_self of the own apparatus and a desired detection level calculation margin value M are taken into account as a desired detection level EXTCCA_TH_REQ. In particular, the desired detection level EXTCCA_TH_REQ can be determined using an expression 16 given below (step S733)

$$EXTCCA\_TH\_REQ=P\_self-P\_ref+R\_ref+M \quad \text{Expression 16}$$

Here, M described above has a meaning of a margin amount for channel variation. For example, M can be set to approximately 10 to 20 dB.

Then, the information processing apparatus (STA) 200 retains the calculated desired detection level EXTCCA_TH_REQ into the inside thereof (step S733).

Then, the information processing apparatus (STA) 200 places, when it performs transmission to the information processing apparatus (AP) 100, the retained desired detection level EXTCCA_TH_REQ and the COLOR information into the PLCP header and transmits them (step S734). For example, the value of EXTCCA_TH_REQ can be written, after fixed quantization is applied thereto, into a Request Detection Level field of the SIGNAL 482 depicted in FIG. 20.

It is to be noted that, while this example indicates an example of desired detection level calculation by the information processing apparatus (STA) 200 side, also the information processing apparatus (AP) 100 side may calculate and use a desired detection level similarly. For example, the information processing apparatus (AP) 100 can calculate a desired detection level by acquiring a reference frame and transmission power information from a subordinate apparatus (STA). Here, in the case of the information processing apparatus (AP) 100, it is considered that a plurality of subordinate apparatus (STA) that become a destination exist. Therefore, the information processing apparatus (AP) 100 calculates and retains the desired detection level EXTCCA_TH_REQ for each destination. Then, when the information processing apparatus (AP) 100 transmits a packet, it describes, for each destination, corresponding EXTCCA_TH_REQ and transmits the packet.

Further, while this example indicates an example in which information placed in a beacon frame is used as a margin value for desired detection threshold value calculation, a known value determined in advance may be held in the inside and used.

The extended CCA operation in the fourth embodiment of the present technology is basically similar to that in FIG. 7. In this case, upon decoding of the PLCP header field, also a value of the desired detection level described in the PLCP header is read out simultaneously. Then, the read out value of the desired detection level is used as an extended CCA threshold value. In particular, the read out extended CCA threshold value is used when a process is decided based on the process classification table depicted in FIG. 6.

Consequently, in such a case that a packet from another wireless network in which the desired detection level is set to a high value arrives at a low reception level, the carrier sense can be dealt with as idle and simultaneous transmission can be performed.

In this manner, in the fourth embodiment of the present technology, since an extended CCA threshold value to be applied is finally determined when each apparatus detects the packet, signaling in advance for determining a threshold value can be omitted.

Further, in the fourth embodiment of the present technology, interlocking parameter calculation information basically according to ON/OFF of the extended CCA function is provided.

[Example of General Configuration]

Figure 23:
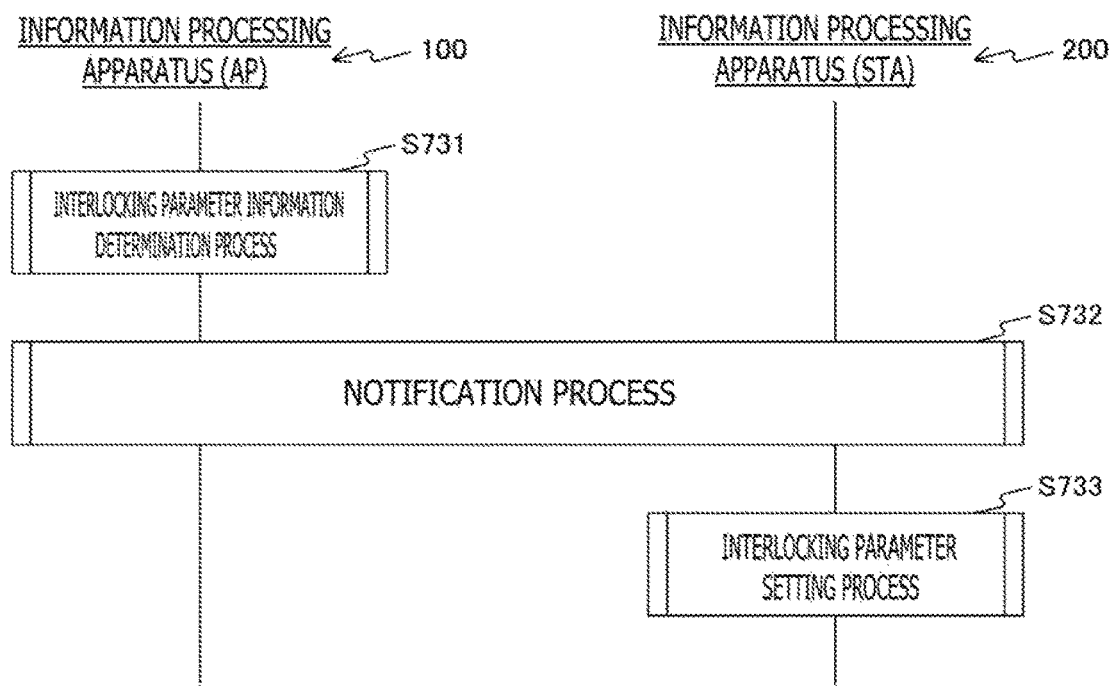
FIG. 23 is a sequence chart depicting an example of a flow of entire processes executed by the different information processing apparatuses configuring the communication system 10 in the fourth embodiment of the present technology.

FIG. 23 is a sequence chart depicting an example of a flow of general processing executed by the information processing apparatus configuring the communication system 10 according to the fourth embodiment of the present technology. FIG. 23 depicts a flow of general processing relating to an information processing apparatus (AP) 100 and an information processing apparatus (STA) 200 as information processing apparatus configuring the communication system 10.

First, the information processing apparatus (AP) 100 performs an interlocking parameter information determination process (step S731). Then, the information processing apparatus (AP) 100 performs a notification process to the information processing apparatus (STA) 200 (step S732).

Then, the information processing apparatus (STA) 200 performs an interlocking parameter setting process (step S733). Such processes as described above are described below.

[Interlocking Parameter Information Determination Process (Step S731 Depicted in FIG. 23)]

As described above, in the fourth embodiment of the present technology, different from the first embodiment of the present technology, as the extended CCA threshold value, a value placed in the received packet is used every time. Therefore, the interlocking parameter does not rely upon the extended CCA threshold value. Therefore, in the interlocking parameter information determination process, interlocking parameter calculation information according to ON/OFF of the extended CCA function is determined.

[Example of Determination of Interlocking Parameter Calculation Information]

For example, the information processing apparatus (AP and STA) store interlocking parameter calculation information to be applied when an extended CCA operation is ON into a storage unit thereof in advance. Then, when the extended CCA operation is ON, the information processing apparatus (AP and STA) read out and use the interlocking parameter calculation information stored in the storage unit.

Here, the interlocking parameter calculation information itself preferably has such a value that cancels degradation from which other apparatuses may suffer by activation of the extended CCA function.

Further, as a variation of the interlocking parameter calculation information, a plurality of kinds of parameters may be designated. Therefore, in the following, examples of them are described.

For example, the interlocking parameter calculation information may include, as a parameter for changing the transmission power in an interlocking relationship, transmission power correction coefficients $\alpha$ and $\beta$.

Also, for example, the interlocking parameter calculation information may include, as a parameter for changing the transmission fixed waiting type in an interlocking relationship, transmission fixed waiting time correction coefficients $\gamma$, $\kappa$ and $\tau$.

Also, for example, the interlocking parameter calculation information may include, as a parameter for changing the carrier sense random waiting time in an interlocking relationship, carrier sense random waiting time correction coefficients δ and ε.

Also, for example, the interlocking parameter calculation information main include, as a parameter for changing the maximum frame time length in an interlocking relationship, maximum frame time length correction coefficients μ and ν. It is to be noted that a similar way of thinking can be applied even if they are rewritten to a maximum transmission information amount in one time of frame transmission, a maximum packet connection number in one time of transmission, a maximum re-sending time number of the same packet or a maximum time length that can be applied in successive transmission of a plurality of frames.

Further, for example, the interlocking parameter calculation information may include, as a parameter for changing the usable channel bandwidth in an interlocking relationship, the usable channel bandwidth correction coefficient λ.

Further, for example, the interlocking parameter calculation information may include, as the parameter for restricting the usable channel frequency, a usable channel group.

[Notification Process (Step S732 Depicted in FIG. 23)]

As a notification frame, the beacon depicted in FIG. 22 can be used.

[Interlocking Parameter Setting Process (Step S733 Depicted in FIG. 23)]

In the fourth embodiment of the present technology, the information processing apparatus (STA) that performs an extended CCA operation observes interlocking parameter calculation information conveyed from the information processing apparatus (AP). The interlocking parameter calculation information determined by the interlocking parameter information determination process (step S731 depicted in FIG. 23) is utilized in the following manner in response to the type thereof.

It is to be noted that, where a plurality of kinds of interlocking parameter calculation information are designated, all of them must be observed.

Further, in the fourth embodiment of the present technology, as described hereinabove, the information processing apparatus (AP and STA) that perform an extended CCA operation place information of a desired reception level into a packet to be transmitted by the own apparatus.

Here, also a case is assumed in which, depending upon a performance of a device, a communication situation (for example, where it is desired to use high modulation) or the like, each information processing apparatus (STA) is not willing to set an interlocking parameter. Therefore, each information processing apparatus (STA) may be configured so as to determine that it does not perform an extended CCA operation on the basis of a performance of a device, a communication situation and so forth.

In the following, an example of setting of interlocking parameters is described.

[Example in which Transmission Power is Changed in Interlocking Relationship]

The transmission power can be changed using the correction coefficients α and β obtained from the information processing apparatus (AP) in the notification process. For example, an example of transmission power change is indicated by an expression given below. Here, the transmission power after changed is represented by P_updated and the default transmission power is represented by P_default. The following expression is a logical representation.

$$P\_updated=(P\_default/\alpha)+\beta \qquad \text{Expression 17}$$

[Example in which Transmission Fixed Waiting Time is Changed in Interlocking Relationship]

The transmission fixed waiting time corresponds, for example, to the AIFS in the IEEE802.11 standard. Further, the transmission fixed waiting time corresponds to a time slot number (AIFSN) for which it must be waited when a transmission trial is performed. It is possible to change The transmission fixed waiting time. For example, an example of an AIFSN change where the correction coefficient γ is used is indicated by an expression 18 given below. Here, the AIFSN after changed is represented by AIFSN_updated, and the default AIFSN is represented by AIFSN_default. The following expression is a representation by true values.

$$AIFSN\_updated=AIFSN\_default+\gamma \qquad \text{Expression 18}$$

Here, the default AIFSN indicates a value of AIFSN of which the information processing apparatus (AP) 100 informs in EDCA Parameter IE of a beacon. The correction of AIFSN is applied to all categories.

[Example in which Carrier Sense Random Waiting Time is Changed in Interlocking Relationship]

The carrier sense random waiting time corresponds, for example, to the CW (Contention Window) indicative of a random backoff range in the IEEE802.11 standard. While the CW includes CWmin and CWmax, an example in which CWmin is changed is described here. For example, an example of CWmin change using the correction coefficients δ and ε is indicated by an expression 19 given below. Here, CWmin after changed is represented by CW_updated, and default CWmin is represented by CW_default. The following expression is a representation in true values.

$$CW\_updated=CW\_default\times\delta+\varepsilon \qquad \text{Expression 19}$$

Here, the default CWmin indicates the value of CWmin of which the information processing apparatus (AP) 100 informs in EDCA Parameter IE of a beacon. This correction of CWmin is performed individually for all access categories. As δ and ε, for example, different values may be applied to different access categories. Further, similar correction may be performed also for CWmax.

[Example in which Maximum Frame Time Length is Changed in Interlocking Relationship]

Here, an example in which the maximum frame time length is changed is described. For example, the PPDU time length corresponds to this. An upper limit is provided to this. For example, an example of calculation of a PPDU time length control value in which the correction coefficients μ and ν are used is indicated by an expression 20 given below. Here, the PPDU time length restriction value after changed is represented by T_updated and the default PPDU time length restriction value is represented by T_default. The following expression is a representation in true values.

$$T\_updated=T\_default\times\mu\times\nu \qquad \text{Expression 20}$$

It is to be noted that a similar way of thinking can be applied even if they are rewritten to a maximum time length that can be used in a maximum transmission information amount in one time of frame transmission, a maximum packet connection number in one time of transmission, a maximum re-sending time number of the same packet or a maximum time length that can be used in successive transmission of a plurality of frames as described hereinabove.

[Example in which Usable Channel Bandwidth is Changed in Interlocking Relationship]

Here, an example in which the channel bandwidth that can be used for transmission is varied is described. For example, an example of calculation of a usable channel bandwidth restriction value in which the correction coefficient λ is used is indicated by an expression 21 given below. Here, the usable channel bandwidth after changed is represented by BW_updated and the default usable channel bandwidth is represented by BW_default, and the minimum granularity of the channel bandwidth is represented by BW_unit. The following expression is a representation in true values.

$$BW\_updated=BW\_default-\lambda \times BW\_unit \qquad \text{Expression 21}$$

[Example in which Usable Channel Frequency is Limited]

For example, where there is a channel designated from the information processing apparatus (AP) 100, only the designated channel can be used.

[Transmission Process and Reception Response Process]

The transmission process and the reception response process are similar to those in the first embodiment of the present technology except that an extended CCA threshold value that is used when an extended CCA operation is to be performed is acquired and used every time. Therefore, description of them is omitted here.

The fourth embodiment of the present technology indicates an example in which the control unit 130 of the information processing apparatus (AP) 100 determines interlocking parameter calculation information and notifies the subordinate apparatus (STA) of the interlocking parameter calculation information. However, as indicated by the third embodiment of the present technology, not interlocking parameter calculation information but an interlocking parameter itself (for example, a set value of transmission power) is determined by the control unit 130 of the information processing apparatus (AP) 100 and conveyed to the subordinate apparatus (STA). In this case, the control unit 230 of the subordinate apparatus (STA) 200 is not restricted to use a different set value with which it becomes more disadvantageous in comparison with the parameter set value conveyed thereto.

<5. Fifth Embodiment>

A first embodiment of the present technology indicates an example in which an information processing apparatus (STA) performs transmission power control (TPC) taking execution of an extended CCA operation as a premise.

The fifth embodiment of the present technology indicates an example in which an information processing apparatus (STA) performs transmission power control (TPC) taking execution of transmission power control as a premise. It is to be noted that the fifth embodiment of the present technology permits also a case in which EXTCCA_TH is not changed (namely, an extended CCA operation is not performed) by the information processing apparatus (STA). Further, the transmission power changed by transmission power control is referred to also as TPC transmission power. Further, transmission power that is made a reference for correction amount calculation by transmission power control is referred to also as reference transmission power. Further, a transmission parameter that is changed in an interlocking relationship with transmission power control is referred to also as TPC transmission parameter.

It is to be noted that the configuration of the information processing apparatus in the fifth embodiment of the present technology is substantially same as that of the information processing apparatus (AP) 100 and the information processing apparatus (STA) 200 depicted in FIGS. 1, 2 and so forth. Therefore, common portions to those in the first embodiment of the present technology are denoted by like reference characters to those of the first embodiment of the present technology and part of description of them is omitted.

[Example of General Processing]

Figure 24:
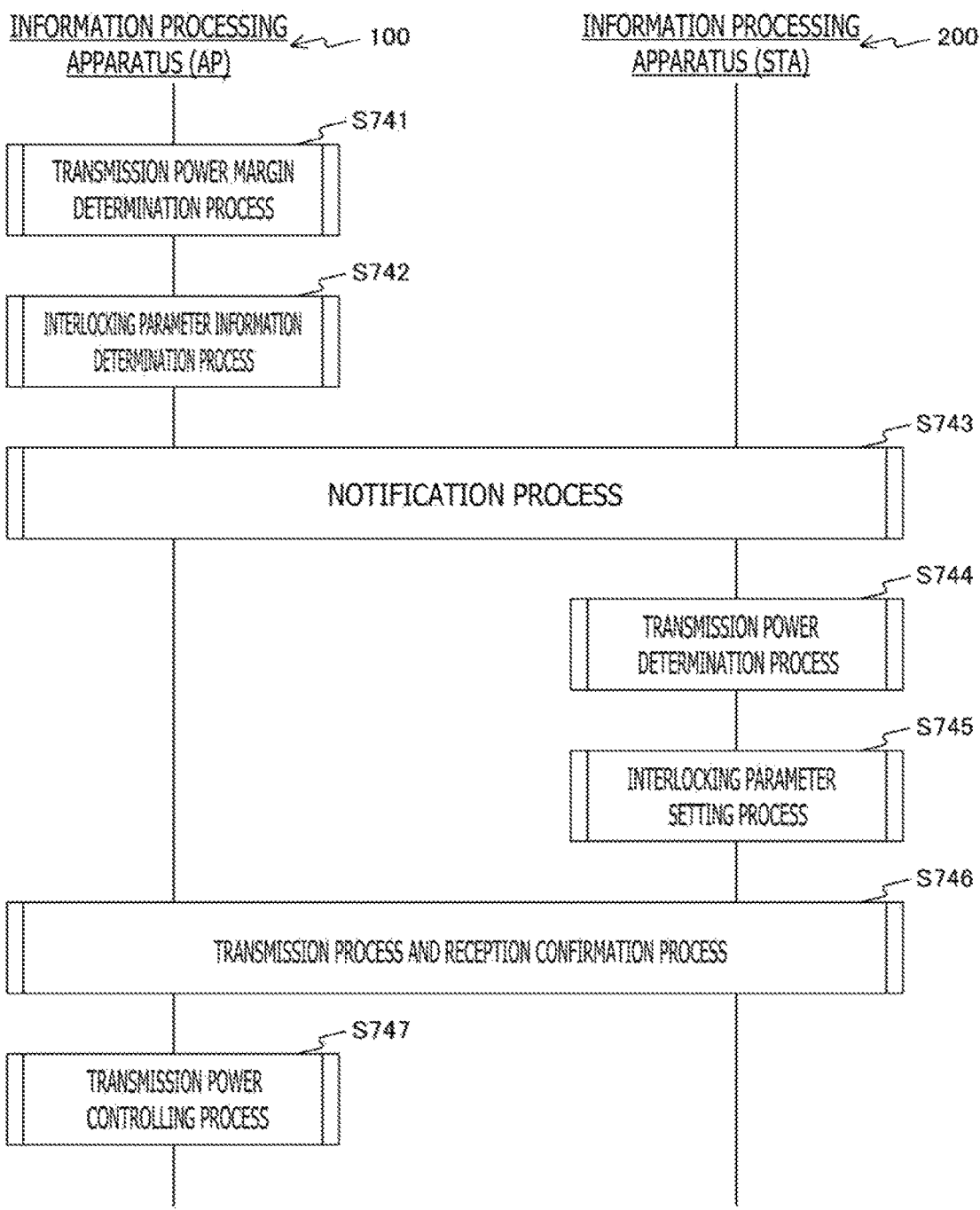
FIG. 24 is a sequence chart depicting an example of a flow of entire processes executed by different information processing apparatuses configuring a communication system 10 in a fifth embodiment of the present technology.

FIG. 24 is a sequence chart depicting an example of a flow of general processing executed by the information processing apparatus configuring the communication system 10 according to the fifth embodiment of the present technology. FIG. 24 depicts a flow of general processing relating to an information processing apparatus (AP) 100 and an information processing apparatus (STA) 200 as information processing apparatus configuring the communication system 10.

First, the information processing apparatus (AP) 100 performs a transmission power margin determination process (step S741). Then, the information processing apparatus (AP) 100 performs an interlocking parameter information determination process (step S742). Then, the information processing apparatus (AP) 100 performs a notification process to the information processing apparatus (STA) 200 (step S743).

Then, the information processing apparatus (STA) 200 performs a transmission power determination process (step S744). Then, the information processing apparatus (STA) 200 performs an interlocking parameter setting process (step S745).

Then, a transmission process and a reception confirmation process are performed between the information processing apparatus (AP) 100 and the information processing apparatus (STA) 200 (step S746).

Then, the information processing apparatus (AP) 100 performs a transmission power controlling process (step S747). The processes mentioned are described below.

[Transmission Power Margin Determination Process (Step S741 Depicted in FIG. 24)]

The control unit 130 of the information processing apparatus (AP) 100 determines, as one of changing rules, a margin value to be used when a subordinate apparatus (STA) connected determines transmission power (TPC transmission power).

The information processing apparatus (AP) 100 can determine a margin value on the basis of various references. For example, the control unit 130 of the information processing apparatus (AP) 100 can monitor the surroundings to measure an average strength of interference and determine a margin value on the basis of the measure average strength of interference. For example, the control unit 130 of the information processing apparatus (AP) 100 can determine a high value when the average strength of interference is high with reference to a threshold value, but can determine a low value when the average strength of interference is low with reference to the threshold value.

However, another determination method may be used. For example, the control unit 130 of the information processing apparatus (AP) 100 may determine a margin value on the basis of the number (or ratio) of HE apparatus and legacy apparatus among the subordinate apparatus (STA). Also, for example, the control unit 130 of the information processing apparatus (AP) 100 may determine a margin value taking information of the number (or ratio) of HE apparatus and legacy apparatus of another BSS into account. Further, for example, the control unit 130 of the information processing apparatus (AP) 100 may determine a margin value taking details of the number of apparatus ready for an extended CCA operation and the number of legacy apparatus that do not have the function into account.

Also, the control unit 130 of the information processing apparatus (AP) 100 may determine a margin value on the basis of a combination of the number of information processing apparatus (STA) and an average strength of interference described hereinabove. Also, the control unit 130 of the information processing apparatus (AP) 100 may adopt a predetermine value as a margin value.

[Interlocking Parameter Information Determination Process (Step S742 Depicted in FIG. 24)]

The control unit 130 of the information processing apparatus (AP) 100 determines, as one of changing rules, an interlocking parameter to be used when a subordinate apparatus (STA) connected determines a transmission parameter. In particular, the control unit 130 of the information processing apparatus (AP) 100 changes the transmission parameter from its default.

Here, the interlocking parameter is a parameter that causes an information processing apparatus (STA) to change the transmission parameter to such a value that has an inverse effect in increase/decrease of the transmission success rate by a change of the transmission power with respect to the reference transmission power. In other words, the interlocking parameter is an incidental parameter that is applied in order to moderate the unfairness in the entire system when the information processing apparatus (STA) changes the transmission power. For example, the interlocking parameter has a meaning as a penalty to be imposed, when the transmission power is to be increased, in exchange of increase of the transmission success rate. On the other hand, when the transmission power is to be decreased, the interlocking parameter has a meaning as a preferential treatment to be provided in exchange of decrease of the transmission success rate. By this interlocking parameter, a transmission parameter changed from the default transmission parameter is set in an interlocking relationship with a change of the transmission power.

It is assumed that interlocking parameters correspond in a one by one corresponding relationship to margin values described hereinabove. In other words, an interlocking parameter corresponds uniquely to a margin value. Therefore, in the information processing apparatus (AP) 100, it is guaranteed that, if a margin value is same, then the changing parameter is same. Combinations of margin values and interlocking parameters may be common with other information processing apparatuses (AP). Where the combinations are common in this manner, it is guaranteed that, even in different information processing apparatus (AP), if a margin value is same, then also the changing parameter is same.

For example, the control unit 130 of the information processing apparatus (AP) 100 can store combinations of margin values and interlocking parameters into the storage unit 120 in advance such that it can select a combination to be used from among the stored combinations. Here, the selection criterion is such as described hereinabove in regard to a criterion for a margin value. Also, a combination may be derived using a calculation formula that makes a margin value and an interlocking parameter correspond in a one by one corresponding relationship to each other.

Here, the transmission parameter changed with an interlocking parameter is available in various manners.

For example, the interlocking parameter may include, as a parameter for changing EXTCCA_TH, EXTCCA_TH changing coefficients α and β. By this, EXTCCA_TH is changed in an interlocking relationship with a change of the transmission power.

Further, the interlocking parameter may include, as a parameter for changing the transmission fixed waiting time, transmission fixed waiting time changing coefficients γ, κ and τ. By this, the transmission fixed waiting time is changed in an interlocking relationship with a change of the transmission power.

Further, the interlocking parameter may include, as a parameter for changing the carrier sense random waiting time, carrier sense random waiting time changing coefficients δ and ε. By this, the carrier sense random waiting time is changed in an interlocking relationship with a change of the transmission power.

Further, the interlocking parameter may include, as a parameter for changing the exclusive time length of a wireless resource (for example, a frequency), maximum frame time length changing coefficients μ and ν. By this, the exclusive time length of the wireless resource is changed in an interlocking relationship with a change of the transmission power. It is to be noted that, for the same purpose, a parameter for changing the maximum transmission information amount in one time of frame transmission, maximum packet connection number in one time of transmission, maximum re-sending time number of the same packet or maximum time length that can be used in successive transmission of a plurality of frames may be included in the interlocking parameters.

Further, the interlocking parameter may include, as a parameter for changing the usable channel bandwidth, a usable channel bandwidth changing coefficient λ. By this, the usable channel bandwidth is changed in an interlocking relationship with a change of the transmission power.

Further, the interlocking parameter may include, as a parameter for restricting the usable channel frequency, at least one of a channel restriction operation decision coefficient ω and information that designates a usable channel group. By this, the usable channel frequency is changed in an interlocking relationship with a change of the transmission power.

[Notification Process (Step S743 Depicted in FIG. 24)]

The communication unit 110 and the control unit 130 of the information processing apparatus (AP) 100 notify the information processing apparatus (STA) 200 of information indicative of the created changing rule.

In the fifth embodiment of the present technology, the information processing apparatus (AP) 100 places a margin value and an interlocking parameter into a frame for later notification. Here, the frame of the placement destination may be a beacon frame that is conveyed to all subordinate apparatus (STA) or may be some other frames (for example, management frames) that are conveyed individually. Here, an example of a format in the case in which a beacon frame is used for placement is depicted in FIG. 25.

[Example of Format of Beacon]

Figure 25:
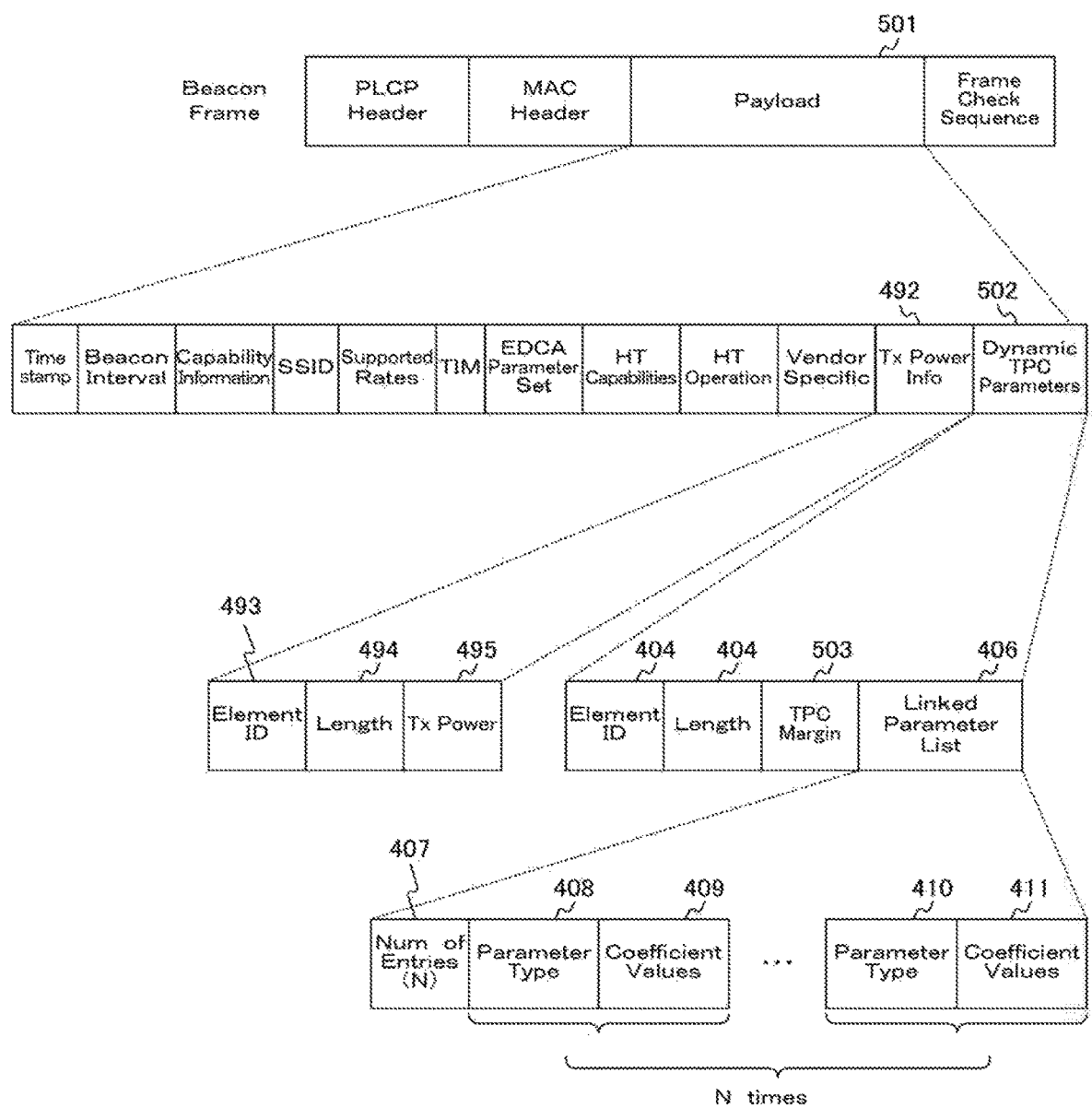
FIG. 25 is a view depicting an example of a format of a beacon frame exchanged between the different information processing apparatuses in the fifth embodiment of the present technology.

FIG. 25 is a view depicting an example of a format of a beacon frame exchanged between different information processing apparatus in the fifth embodiment of the present technology.

In the payload 501 of the beacon frame depicted in FIG. 25, Tx info 492 and Dynamic TPC Parameters 502 are disposed. It is to be noted that the example depicted in FIG. 25 is an example in which, in the payload 491 depicted in FIG. 22, the Dynamic TPC Parameters 502 is disposed in place of the Dynamic CCA Parameters 402. Further, the example depicted in FIG. 25 is an example in which, in the Dynamic CCA Parameters 402 depicted in FIG. 22, TPC margin 503 is disposed in place of CCA Margin 405. Therefore, portions common to those of the example depicted in FIG. 22 are denoted by like reference characters, and description of them is omitted.

In the TPC margin 503, a margin value determined by the transmission power margin determination process described hereinabove (step S741 depicted in FIG. 24) (margin value for determining transmission power) is placed.

As depicted in FIG. 25, in the beacon frame, transmission power P_ref of a reference frame is placed in Tx Power 495. Further, a margin value M for determining transmission power is placed in TPC margin 503.

In this manner, information indicative of a margin value and an interlocking parameter (namely, a changing rule) is conveyed from the information processing apparatus (AP) 100 to the information processing apparatus (STA) 200 as described hereinabove. It is to be noted that, similarly as in the first embodiment of the present technology, in place of transmission of a margin value and an interlocking parameter, a mode number for specifying them may be conveyed to the information processing apparatus (STA) 200.

[Transmission Power Determination Process (Step S744 Depicted in FIG. 24)]

The control unit 230 of the information processing apparatus (STA) 200 determines and sets transmission power (TPC transmission power) on the basis of a notification from the information processing apparatus (AP) 100.

For example, the control unit 230 of the information processing apparatus (STA) 200 determines transmission power on the basis of the margin value conveyed thereto and a reception strength of the reference frame (RSSI). Here, the reference frame may be a beacon frame in which information indicative of the changing rule described above is placed.

Figure 26:
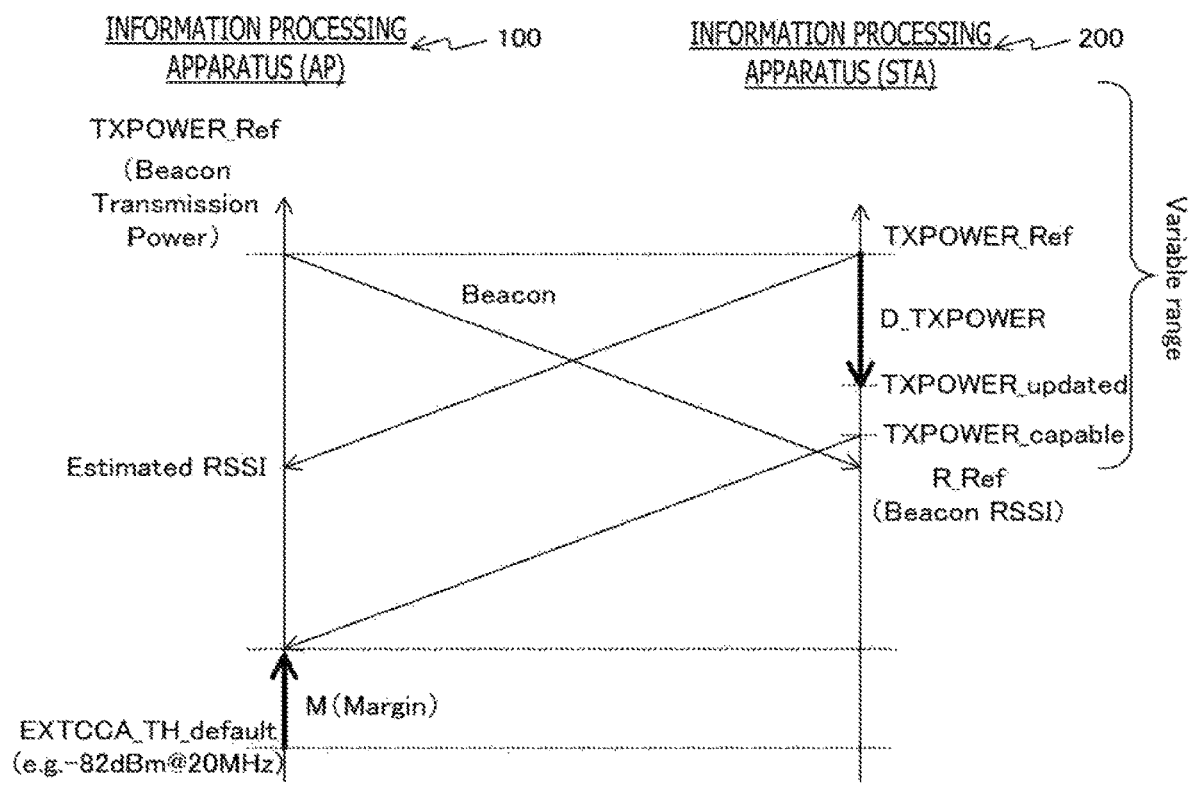
FIG. 26 is a view depicting an example of a transmission power determination process (TPC transmission power determination process) by an information processing apparatus (STA) 200 in the fifth embodiment of the present technology.

FIG. 26 is a view depicting an example of a transmission power determination process (TPC transmission power determination process) by the information processing apparatus (STA) 200 in the fifth embodiment of the present technology. FIG. 26 depicts an example of exchange between an information processing apparatus (AP) 100 and an information processing apparatus (STA) 200.

First, the communication unit 210 of the information processing apparatus (STA) 200 receives a beacon frame transmitted from an information processing apparatus (AP) 100 of the connection destination.

For example, the information processing apparatus (STA) 200 determines transmission power, with which a signal transmitted from the own apparatus is estimated to be received by the information processing apparatus (AP) 100 with a reception strength higher by an amount equal to the margin value M than EXTCCA_TH at the information processing apparatus (AP) 100 side, as a lower limit value to the settable transmission power.

In particular, the control unit 230 of the information processing apparatus (STA) 200 determines a value obtained by adding the default extended CCA threshold value and the margin value of the information processing apparatus (AP) 100 to a value obtained by subtracting the reception strength from the transmission power of the reference frame as a lower limit value TXPOWER_capable of the settable transmission power and calculates the lower limit value TXPOWER_capable of the settable transmission power using an expression 22 given below. Here, the default extended CCA threshold value EXTCCA_TH_default of the information processing apparatus (AP) 100 is a known value common to the information processing apparatus (AP and STA) in the system. It is to be noted that the following expression 22 is a logarithmic representation.

$$\text{TXPOWER\_capable} = \text{TXPOWER\_ref} - R\_\text{ref} + \text{EXTCCA\_TH\_default} + M \quad \text{Expression 22}$$

Here, in the expression 22, R_ref (dBm) represents the reception strength (RSSI), at the information processing apparatus (STA) 200, of the latest reference frame (beacon frame) received from the information processing apparatus (AP) 100 of the connection destination. Further, M (dB) represents the margin value conveyed from the information processing apparatus (AP) 100 in the notification process described hereinabove, and TXPOWER_ref represents the transmission power of the reference frame conveyed from the information processing apparatus (AP) 100. It is to be noted that R_ref may have a value obtained by performing filtering such as averaging for measurement results over a plurality of reference frames. Further, M is a margin value. Further, the value of TXPOWER_capable may be limited by an upper limit value or a lower limit value based on some other factor.

Then, the control unit 230 of the information processing apparatus (STA) 200 changes the transmission power (namely, determines TPC transmission power) within a range that does not become less than the lower limit value TXPOWER_capable (namely, within a range within which it is not lower). By this, the possibility that a signal transmitted from the information processing apparatus (STA) 200 may be able to be detected by the information processing apparatus (AP) 100 can be increased.

Further, the value of the reference transmission power is represented by TXPOWER_ref, and the transmission power after changed (namely, TPC transmission power) is represented by TXPOWER_updated. In this case, the difference D_TXPOWER between TXPOWER_ref and TXPOWER_updated is calculated using an expression 23 given below. It is to be noted that also the following expression 23 is a logarithmic representation.

$$D\_\text{TXPOWER} = \text{TXPOWER\_ref} - \text{TXPOWER\_updated} \quad \text{Expression 23}$$

Here, in the expression 23, the value of the reference transmission power need not necessarily be a value coincident with TXPOWER_ref if it is known and common to the information processing apparatus (AP and STA) in the system. Further, if the expression 22 given hereinabove is referred to, then a change to lower transmission power is permitted to an information processing apparatus (STA) 200 having a higher RSSI. It is to be noted that the change of transmission power has a degree of freedom within a range, and the information processing apparatus (STA) 200 need not necessarily set TXPOWER_updated to TXPOWER_capable. For example, the information processing apparatus (STA) 200 may not change the transmission power at all. In other words, D_TXPOWER can vary under the control of the information processing apparatus (STA) 200. Consequently, such a situation that an information processing apparatus (STA) 200 that is not good in the link state changes to a low transmission power state thereby to increase an unintended transmission failure to degrade the performance of the entire system can be prevented. Further, the information processing apparatus (STA) 200 may set transmission power within the range in response to a modulation method and an error correction coding method to be used thereby.

[Interlocking Parameter Setting Process (Step S745 Depicted in FIG. 24)]

The control unit 230 of the information processing apparatus (STA) 200 determines and sets an interlocking parameter (TPC transmission parameter).

For example, the control unit 230 of the information processing apparatus (STA) 200 can control a transmission parameter on the basis of the difference (namely, D_TXPOWER) between the transmission power (TPC transmission power) determined in the transmission power transmission process described hereinabove and the reference transmission power.

For example, the control unit 230 of the information processing apparatus (STA) 200 can increase the changing amount (scale of a penalty or a preferential treatment) in response to increase of the difference and can decrease the changing amount in response to decrease of the difference. By this, unfairness of the entire system that occurs in response to a raise width or a lower width of the transmission power can be moderated.

Further, the control unit 230 of the information processing apparatus (STA) 200 can set a transmission parameter (TPC transmission parameter) using an interlocking parameter corresponding to a margin value. It is assumed that the information processing apparatus (STA) 200 observes a changing rule conveyed from the information processing apparatus (AP) 100 to determine a transmission parameter and does not deviate from this. In the following, a determination method of a transmission parameter based on a conveyed interlocking parameter is described.

The control unit 230 of the information processing apparatus (STA) 200 can change the extended CCA threshold value EXTCCA_TH of the own apparatus in response to D_TXPOWER. An example of a case in which the extended CCA threshold value EXTCCA_TH is changed using the changing coefficients $\alpha$ and $\beta$ is indicated by an expression 24 given below. It is to be noted that EXTCCA_TH after changed is represented by EXTCCA_TH_updated, and default EXTCCA_TH is represented by EXTCCA_TH_default, and it is assumed that they are dB values. The following expression is a logarithmic representation.

EXTCCA_$TH$_updated=EXTCCA_$TH$_default +($D$_TXPOWER/$\alpha$)+$\beta$   Expression 24

Here, when $\alpha$ has a positive value and the transmission power is lower than the reference transmission power, EXTCCA_TH increases as D_TXPOWER increases (namely, as the transmission power decreases). On the other hand, when $\alpha$ has a positive value but the transmission power is higher than the reference transmission power, EXTCCA_TH decreases as D_TXPOWER decreases (namely, as the transmission power increases).

On the other hand, even when $\alpha$ has a positive value and the transmission power is lower than the reference transmission power, a case in which EXTCCA_TH_updated calculated in accordance with the expression 24 given above is lower than EXTCCA_TH_default possibly occurs. In this case, the control unit 230 uses EXTCCA_TH_default without changing EXTCCA_TH. In this manner, where the penalty or preferential treatment to be imposed acts in the reverse direction, the information processing apparatus (STA) 200 uses the default transmission parameter.

Similarly, even when $\alpha$ has a positive value and the transmission power is higher than the reference transmission power, a case in which EXTCCA_TH_updated calculated in accordance with the expression 24 given above is higher than EXTCCA_TH_default possibly occurs. In this case, the control unit 230 uses EXTCCA_TH_default without changing EXTCCA_TH. In this manner, where the penalty or preferential treatment to be imposed acts in the reverse direction, the information processing apparatus (STA) 200 uses the default transmission parameter. This similarly applies also to the other transmission parameters that are hereinafter described.

[Example of Setting of Transmission Fixed Waiting Time]

The control unit 230 of the information processing apparatus (STA) 200 can change the transmission fixed waiting time in response to D_TXPOWER. For example, the control unit 230 of the information processing apparatus (STA) 200 can change the AIFSN in response to D_TXPOWER.

An example of a case in which the AIFSN is changed using the changing coefficient $\gamma$ is indicated by an expression 25 given below. Here, the AIFSN after changed is represented by AIFSN_updated and the default AIFSN is represented by AIFSN_default, and it is assumed that they are true values.

AIFSN_updated=AIFSN_default −($D$_TXPOWER/$\gamma$)   Expression 25

Here, it is assumed that the default AIFSN indicates the value of the AIFSN of which the information processing apparatus (AP) 100 informs using EDCA parameter IE of a beacon frame. This change of the AIFSN is applied to all access categories.

For example, when $\gamma$ has a positive value and the transmission power is lower than the reference transmission power, the AIFSN (namely, the waiting slot number) decreases as D_TXPOWER increases (namely, as the transmission power decreases). On the other hand, when $\gamma$ has a positive value but the transmission power is higher than the reference transmission power, the AIFSN (namely, the waiting slot number) increases as D_TXPOWER decreases (namely, as the transmission power increases).

Meanwhile, one slot time length T_slot can be changed using an expression 26 given below. The following expression is a representation in true values.

$T$_slot_updated=$T$_slot_default×$\kappa$   Expression 26

Further, the SIFS length that is the waiting time when AIFSN=0 can be changed using an expression 27 given below. The following expression is a representation in true values.

SIFS_updated=SIFS_default×$\tau$   Expression 27

[Example of Setting of Carrier Sense Random Waiting Time]

The control unit 230 of the information processing apparatus (STA) 200 can change the carrier sense random waiting time in response to D_TXPOWER. For example, the control unit 230 of the information processing apparatus (STA) 200 can change CWmin in response to D_TXPOWER.

An example of a CWmin change using the changing coefficients $\delta$ and $\varepsilon$ is indicated by an expression 28 given below. Here, CWmin after changed is represented by CW_updated and default SWmin is represented by CW_default, and it is assumed that they are true values.

$CW$_updated=$CW$_default/($D$_TXPOWER/$\delta$) −($D$_TXPOWER/$\varepsilon$)   Expression 28

Here, the default CWmin indicates the value of CWmin of which the information processing apparatus (AP) 100 informs using EDCA parameter IE of a beacon frame. This change of CWmin is applied to all access categories. It is to be noted that $\delta$ and $\varepsilon$ may be allocated in different values to the individual access categories.

Further, while CWmin is described in the foregoing description, also CWmin may be changed similarly.

For example, when $\delta$ and $\varepsilon$ have positive values and the transmission power is lower than the reference transmission power, CWmin decreases and the expected value of the random waiting time decreases in response to increase of D_TXPOWER (namely, as the transmission power decreases). On the other hand, when $\delta$ and $\varepsilon$ have positive values and the transmission power is higher than the reference transmission power, CWmin increases and the expected value of the random waiting time increases in response to decrease of D_TXPOWER (namely, as the transmission power increases).

[Example of setting of maximum frame time length] The control unit 230 of the information processing apparatus (STA) 200 can change the maximum frame time length in response to D_TXPOWER. For example, the control unit 230 of the information processing apparatus (STA) 200 can provide an upper limit to the PPDU time length and determine the upper limit in response to D_TXPOWER.

An example of a case in which an upper limit value to the PPDU time length is changed using the changing coefficients $\mu$ and $\nu$ is indicated by an expression 29 given below. Here, the upper limit to the PPDU time length after changed is represented by T_updated, and it is assumed that this is a true value.

$$T\_updated = \mu + \nu \times D\_TXPOWER \quad \text{Expression 29}$$

For example, when $\nu$ has a positive value and the transmission power is lower than the reference transmission power, T_updated (namely, the time length of the PPDU) increases as D_TXPOWER increases (namely, as the transmission power decreases). On the other hand, when $\nu$ has a positive value but the transmission power is higher than the reference transmission power, T_updated (namely, the time length of the PPDU) decreases as D_TXPOWER decreases (namely, as the transmission power increases).

It is to be noted that, as described hereinabove, from the purpose to change the exclusive time length of a wireless resource, similar calculation can be applied also in regard to a maximum transmission information amount in single time frame transmission, a maximum packet connection number in single time transmission, a maximum re-sending time number of the same packet and a maximum time length that can be used for continuous transmission of a plurality of frames.

[Example of Setting of Usable Channel Bandwidth]

The control unit 230 of the information processing apparatus (STA) 200 can change the channel bandwidth that can be used for transmission in response to D_TXPOWER. For example, an example of a case in which the usable channel bandwidth is changed using the changing coefficient $\lambda$ is indicated by an expression 30 given below. Here, the usable channel bandwidth after changed is represented by BW_updated, the default usable channel bandwidth is represented by BW_default and the minimum granularity of the channel bandwidth is represented by BW_unit, and it is assumed that they are true values.

$$BW\_updated = BW\_default + ((\lambda + D\_TXPOWER)/BW\_unit) \times BW\_unit \quad \text{Expression 30}$$

For example, when $\lambda$ has a positive value and the transmission power is lower than the reference transmission power, BW_updated (namely, the usable channel bandwidth) increases as D_TXPOWER increases (namely, as the transmission power decreases). On the other hand, when $\alpha$ has a positive value but the transmission power is higher than the reference transmission power, BW_updated (namely, the usable channel bandwidth) decreases as D_TXPOWER decreases (namely, as the transmission power increases).

[Example of Setting of Usable Channel Frequency]

The control unit 230 of the information processing apparatus (STA) 200 can change the channel frequency usable for transmission in response to D_TXPOWER. For example, where the usable channel is restricted by the information processing apparatus (AP) 100, the control unit 230 of the information processing apparatus (STA) 200 can remove the restriction when D_TXPOWER is higher than the channel restriction operation decision coefficient $\omega$. By this, the information processing apparatus (AP) 100 can perform transmission using the corresponding channel.

[Transmission Process and Reception Response Process (Step S746 Depicted in FIG. 24)]

The transmission process and the reception response process are similar to those in the first embodiment of the present technology, and therefore, description of them is omitted here. It is to be noted that the information processing apparatus (STA) 200 notifies the information processing apparatus (AP) 100 of the connection destination of information indicative of the set transmission power.

[Transmission Power Controlling Process (Step S747 Depicted in FIG. 24)]

The transmission power controlling process is similar to that in the first embodiment of the present technology, and therefore, description of the same is omitted here. It is to be noted that the information processing apparatus (AP) 100 sets, on the basis of information indicative of transmission power set by the information processing apparatus (STA) 200, transmission power for a frame to be transmitted to the information processing apparatus (STA) 200. However, the information processing apparatus (AP) 100 keeps the transmission power of the reference frame to a predetermined value (default transmission power).

[Other Examples of Processing]

The control unit 130 of the information processing apparatus (AP) 100 may perform dynamic transmission power and a transmission parameter using a margin value and an interlocking parameter determined by the own apparatus.

In this case, it is necessary for subordinate apparatus (for example, information processing apparatus (STA) 200) of the information processing apparatus (AP) 100 to periodically transmit a reference frame to the information processing apparatus (AP) 100. In this case, it is assumed that, even when transmission power is changed by the process described hereinabove in the information processing apparatus (STA) 200, the transmission power of the reference frame is kept to a predetermined value. Further, into this reference frame, information indicative of transmission power to be used for transmission of the reference frame is placed.

The control unit 130 of the information processing apparatus (AP) 100 can measure the reception strength R_ref of the reference frame from each of the subordinate apparatuses (STA) and perform change of the transmission power on the basis of R_ref for each subordinate apparatus (STA). Further, the control unit 130 of the information processing apparatus (AP) 100 can change a transmission parameter on the basis of D_TXPOWER for each subordinate apparatus (STA). Here, without setting a value individually for each subordinate apparatus (STA), D_TXPOWER selected in accordance with some reference from among D_TXPOWER for the individual subordinate apparatus (STA) may be determined as a representative value to determine an interlocking transmission parameter. For example, D_TXPOWER may be, for example, lowest D_TXPOWER, highest D_TXPOWER, an average value/intermediate value obtained from a plurality of D_TXPOWER samples to a plurality of certain destinations, D_TXPOWER for a destination apparatus to which the own apparatus has transmitted last, D_TXPOWER to a transmission source apparatus from which a packet has been received last, D_TXPOWER for a destination apparatus to which the own apparatus is intended to perform transmission next, or the like.

It is to be noted that, similarly as in the first embodiment of the present technology, combinations of margin values and interlocking parameters may be shared by the information processing apparatus (AP) 100 and the information processing apparatus (STA) 200. In this case, the combination information (candidate list of combinations of margin values and interlocking parameters) retained by the information processing apparatus (AP) 100 may be more advantageous information (another more advantageous list) than the combination information held by the information processing apparatus (STA) 200.

<6. Sixth Embodiment>

A sixth embodiment of the present technology indicates an example in which, based on the fifth embodiment of the present technology, a process for suppressing excessive decrease of the transmission power in response to a situation is added as a rule. By this, a contrivance by which the efficiency of the entire system is further improved can be provided.

In particular, the sixth embodiment of the present technology indicates an example in which, in the fifth embodiment of the present technology, restriction by a lower limit value to TXPOWER_capable described hereinabove with reference to FIG. 26 is embodied. Further, the sixth embodiment of the present technology indicates an example that provides a contrivance for improving the efficiency by taking the number of HE apparatus and legacy apparatus into account.

It is to be noted that the configuration of the information processing apparatus in the sixth embodiment of the present technology is substantially same as that of the information processing apparatus (AP) 100 and the information processing apparatus (STA) 200 depicted in FIGS. 1, 2 and so forth. Therefore, common portions to those in the first embodiment of the present technology are denoted by like reference characters to those of the first embodiment of the present technology and part of description of them is omitted.

Further, in the following, characteristic processes in the sixth embodiment of the present technology are described with reference to FIG. 24.

[Transmission Power Margin Determination Process (Step S741 Depicted in FIG. 24)]

The sixth embodiment of the present technology indicates an example in which, when to determine a transmission power margin, the information processing apparatus (AP) 100 utilizes information of the number of HE apparatus and the number of legacy apparatus.

The information processing apparatus (AP) 100 can determine a margin value with reference to various references. For example, the control unit 130 of the information processing apparatus (AP) 100 monitors the surroundings to measure an average strength of interference and can determine a margin value on the basis of the measured average strength of interference. For example, the control unit 130 of the information processing apparatus (AP) 100 can determine a high value when the average strength of interference is high with reference to a threshold value but can determine a low value when the average strength of interference is low with reference to the threshold value.

Further, the control unit 130 of the information processing apparatus (AP) 100 can determine a margin value on the basis of the number (or ratio) of HE apparatus and legacy apparatus from among subordinate apparatus. Also, for example, the control unit 130 of the information processing apparatus (AP) 100 may determine a transmission power margin value taking information of the number (or ratio) of HE apparatus and legacy apparatus that belong to a wireless network opened by another information processing apparatus (AP) into account. For example, the control unit 130 of the information processing apparatus (AP) 100 can determine a high margin value when the ratio of legacy apparatus to the overall apparatus number is high with reference to a threshold value but determine a low margin value when the ratio of legacy apparatus is low with reference to the threshold value.

Figure 27:
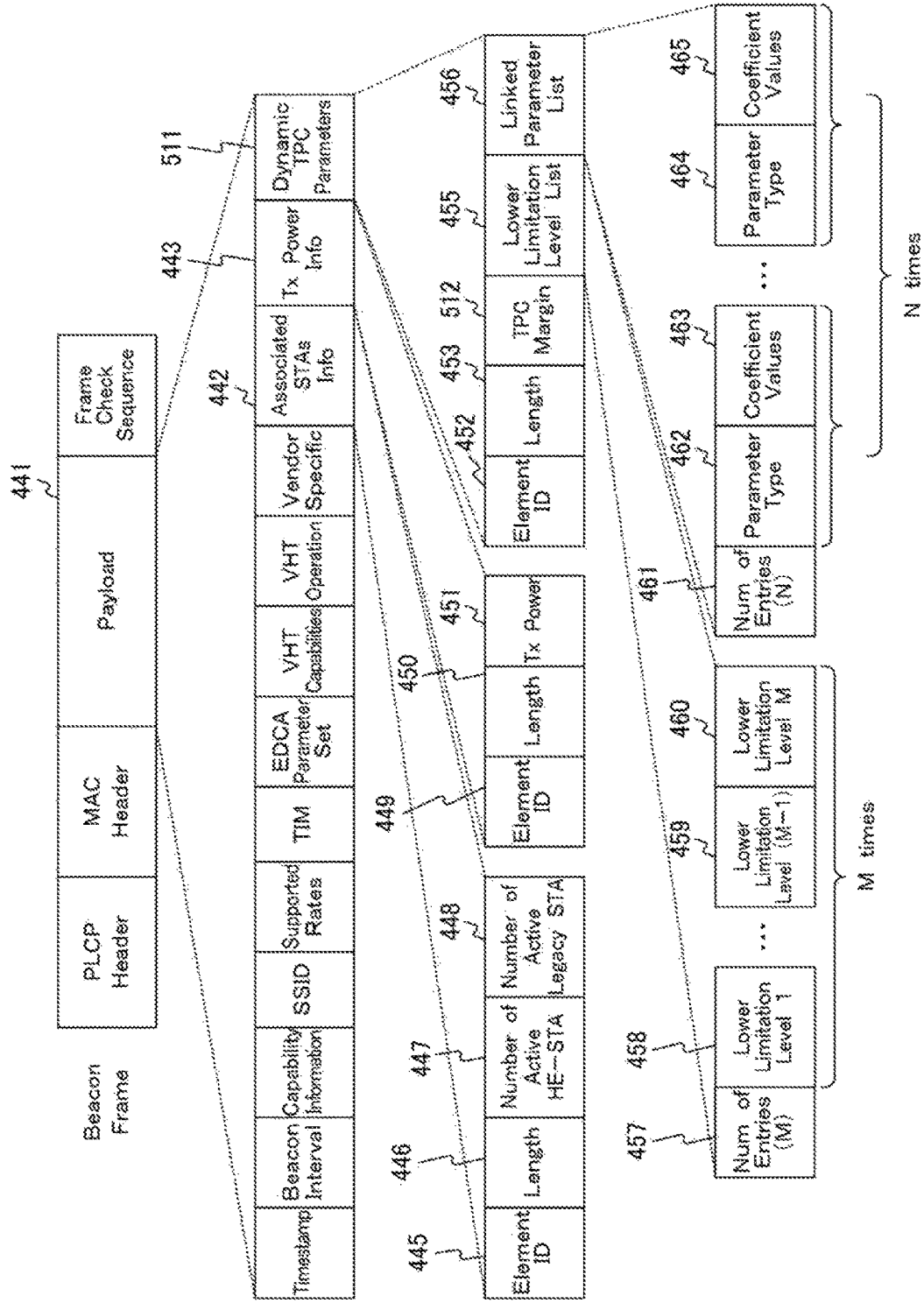
FIG. 27 is a view depicting an example of a format of a beacon frame exchanged between different information processing apparatuses in a sixth embodiment of the present technology.

Further, the control unit 130 of the information processing apparatus (AP) 100 can acquire the number of HE apparatus and legacy apparatus from among the subordinate apparatus from the information owned by the information processing apparatus (AP) 100. Further, the control unit 130 of the information processing apparatus (AP) 100 can acquire information of the number of HE apparatus and legacy apparatus of other wireless network from the substance of a beacon transmitted from an information processing apparatus (AP) of the other wireless network. An example of the format of the beacon in this case is depicted in FIG. 27.

Further, the sixth embodiment of the present technology indicates an example in which the information processing apparatus (AP) 100 determines a transmission power margin value and a subordinate apparatus (STA) determines a lower limit level that is a parameter that is used in a transmission power determination process. Here, the lower limit level is preferably determined on the basis of the strength of interference. An example of the determination process is described below.

For example, the control unit 130 of the information processing apparatus (AP) 100 measures an average strength of interference through a monitor and sets the value of a result of the measurement to I. Then, the control unit 130 of the information processing apparatus (AP) 100 sets a level with which a sufficient SINR can be ensured for the I and the noise power N as a lower limit level. Here, the lower limit level is represented by LL. Further, where the SINR with which a certain modulation and coding method (MCS) can ensure a sufficient transmission characteristic is represented by SINR(m) where m is an index to the MCS, the lower limit LL(m) corresponding to each m can be determined using an expression 31 given below. The following expression 31 is a representation in true values.

$$LL(m)=SINR(m)\times(I+N) \qquad \text{Expression 31}$$

It is to be noted that each LL(m) may have a value determined from a value obtained in accordance with the expression 31 taking a predetermined offset into account. Further, LL may not necessarily be provided by a quantity equal to the number of MCS to be used, but may be a value represented by LL, for example, where specific MCS is assumed.

[Interlocking Parameter Information Determination Process (Step S742 Depicted in FIG. 24)]

The interlocking parameter information determination process is similar to that in the fifth embodiment of the present technology, and therefore, description of the same is omitted here.

[Notification Process (Step S743 Depicted in FIG. 24)]

A format of a beacon frame when a margin value and an interlocking parameter are placed into a beacon frame similarly as in the sixth embodiment is depicted in FIG. 27.

[Example of Format of Beacon]

FIG. 27 is a view depicting an example of a format of a beacon frame exchanged between different information processing apparatus in the sixth embodiment of the present technology.

The example depicted in FIG. 27 is an example in which Dynamic TPC Parameters 511 is disposed in place of Dynamic CCA Parameters 444 depicted in FIG. 17. Further, the example depicted in FIG. 27 is an example in which, in Dynamic CCA Parameters 444 depicted in FIG. 17, TPC margin 512 is disposed in place of CCA Margin 454. Therefore, portions common to those in the example depicted in FIG. 17 are denoted by like reference characters, and description of them is omitted.

In TPC margin 512, a margin value (margin value for determining transmission power) determined by the transmission power margin determination process (step S741 depicted in FIG. 24) described hereinabove is placed.

[Transmission Power Determination Process (Step S744 Depicted in FIG. 24)]

The control unit 230 of the information processing apparatus (STA) 200 can acquire TXPOWER_capable in accordance with the expression 22 given hereinabove similarly as in the fifth embodiment of the present technology. Further, the control unit 230 of the information processing apparatus (STA) 200 can acquire a lower limit reception level R_LL on the basis of the lower level information LL(m) conveyed from the information processing apparatus (AP) 100 in the communication process (step S743 depicted in FIG. 24). It is to be noted that, although TXPOWER_capable itself is a lower limit value in setting of TXPOWER_updated, the arithmetic operation of this designates a lower limit to the value of TXPOWER_capable.

Here, from among LL(m) values, a maximum value that does not exceed R_ref (RSSI of a beacon depicted in FIG. 26) is determined as R_LL. Meanwhile, where R_ref is lower than any of LL(m) values, a minimum one of the LL(m) values is determined as R_LL. It is to be noted that the control unit 230 of the information processing apparatus (STA) 200 may determine R_LL after adding a predetermined offset shared with the information processing apparatus (AP) 100 to LL(m).

Then, the control unit 230 of the information processing apparatus (STA) 200 can update TXPOWER_capable using an expression 32 given below. It is to be noted that the following expression 32 is a logarithmic representation.

TXPOWER_capable=max(TXPOWER_capable, TXPOWER_ref−R_ref+R_LL)   Expression 32

The control unit 230 of the information processing apparatus (STA) 200 can change the transmission power within a range that is not less than the lower limit value TXPOWER_capable (namely, within a range within which it is not lower). Further, the value of the transmission power after changed is represented by TXPOWER_updated. Consequently, the possibility that a signal transmitted from the information processing apparatus (STA) 200 may be detected by the information processing apparatus (AP) 100 can be increased.

It is to be noted that the control unit 230 of the information processing apparatus (STA) 200 may determine TXPOWER_updated taking information of Associated STAs Info 442 (depicted in FIG. 27) received from the information processing apparatus (AP) 100 into account. For example, when the ratio of legacy apparatus with respect to the total apparatus number is high with reference to a threshold value, the control unit 230 of the information processing apparatus (STA) 200 can determine TXPOWER_updated to a rather high value. On the other hand, when the ratio of legacy apparatus with respect to the total apparatus number is low with reference to the threshold value, the control unit 230 of the information processing apparatus (STA) 200 can determine TXPOWER_updated to a rather low value.

[Interlocking Parameter Setting Process (S745 Depicted in FIG. 24)]

The interlocking parameter setting process is similar to that in the fifth embodiment of the present technology, and therefore, description is omitted here.

[Transmission Process and Reception Conformation Process (Step S746 Depicted in FIG. 24)]

The transmission process and the reception confirmation process are similar to those in the fifth embodiment of the present technology, and therefore, description of them is omitted here.

[Transmission Power Controlling Process (Step S747 Depicted in FIG. 24)]

The transmission power controlling process is similar to that in the fifth embodiment of the present technology, and therefore, description of the same is omitted here.

By performing such extension as in the sixth embodiment of the present technology for the fifth embodiment of the present technology in this manner, TXPOWER_capable can be set to a further higher value by the lower limit mechanism for TXPOWER_capable described above. Consequently, an adverse effect by excessive decrease of transmission power can be avoided. It is to be noted that the adverse effect here signifies a state in which, if the transmission power decreases more than necessary, then usable modulation becomes excessively low toward the data rate and the utilization efficiency of wireless resources as the entire system is decreased.

It is to be noted that the sixth embodiment of the present technology indicates an example in which two extension factors of the lower limit mechanism for TXPOWER_capable and correction in which information of the number (or ratio) of HE apparatus and legacy apparatus is taken into account are used. However, they need not necessarily be used in combination, but either one of them may be applied independently.

<7. Seventh Embodiment>

The first to sixth embodiments of the present technology indicate examples in which decision of whether or not a detected packet is a packet transmitted from a wireless network different from a wireless network to which an own apparatus belongs is performed utilizing COLOR information. However, the decision may be performed utilizing a BSSID in a MAC header.

For example, in the case of an A-MPDU in which a plurality of MPDUs are connected for transmission, each MPDU (A-MPDU sub frame) includes information of a BSSID and FCS (Frame Check Sequence) information for confirmation of credibility of the information. Therefore, when the substance of the FCS regarding an A-MPDU sub frame during reception and a CRC calculation result coincide with each other, even during reception of the A-MPDU, if the BSSID information is different from that belonging to the own apparatus at the point of time, then it can be decided that the detected packet is a packet transmitted from a wireless network different from the wireless network to which the own apparatus belongs. Also in such a case as just described, the extended CCA operation can be applied to subsequent processes.

In this manner, the seventh embodiment of the present technology indicates an example in which both the extended CCA operation that utilizes a PLCP header and the extended CCA operation that utilizes a MAC header described in the first to sixth embodiments of the present technology are used.

[Example of Format of Frame]

FIG. 28 is a view depicting an example of a format of a frame exchanged between different apparatus configuring the communication system 10 in the seventh embodiment of the present technology. In a of FIG. 28, an example of a format of a frame used in an extended CCA process that utilizes a MAC header is depicted. Meanwhile, in b of FIG. 28, an example of a format of a frame used in the first to sixth embodiments of the present technology (frame used in an extended CCA process that utilizes a PLCP header) is depicted.

The frame depicted in a of FIG. 28 is configured from Preamble 521, SIGNAL 522, Extension 523, Service 524, A-MPDU Subframe 530, 540 and 550 and Tail & Pad 525.

Meanwhile, the A-MPDU Subframe 530 is configured from MPDU Delimiter 531, MAC Header 532, MSDU (MAC service data unit) 533 and FCS 534. In MAC Header 532, information of a BSSID is included. It is to be noted that the configuration of A-MPDU Subframe 540 and 550 is similar to that of A-MPDU Subframe 530.

For example, where the CRC of the MPDU has no error, a wireless network to which an apparatus of the transmission source of a detected packet can be decided at the point of time of an arrow mark A on the basis of information of the BSSID included in MAC Header 532. In this case, an extended CCA operation can be performed as described hereinabove.

The frame depicted in b of FIG. 28 is configured from Preamble 521, SIGNAL 522, Extension 523, Service 524, PSDU 560 and Tail & Pad 525.

For example, if the CRC of SIGNAL 522 has no error, then a wireless network to which an apparatus of the transmission source of the detected packet belongs can be decided at the point of time of an arrow mark B on the basis of the COLOR information included in SIGNAL 522. In this case, an extended CCA operation can be performed as indicated in the first to sixth embodiments of the present technology.

[Example of Operation of Packet Detection/Reception Decision Process Upon Extended CCA Operation]

FIG. 29 is a view depicting an example of a relationship (process classification table) between processes performed by the information processing apparatus (AP) 100 and PLCP headers and MAC headers in the seventh embodiment of the present technology. In a of FIG. 29, an example of a process classification table where a decision is performed using a PLCP header is depicted. This process classification table is same as the process classification table depicted in FIG. 6.

In b of FIG. 29, an example of a process classification table where a decision is performed using a MAC header is depicted. The process classification tables are described in detail with reference to FIG. 30.

Figure 30:
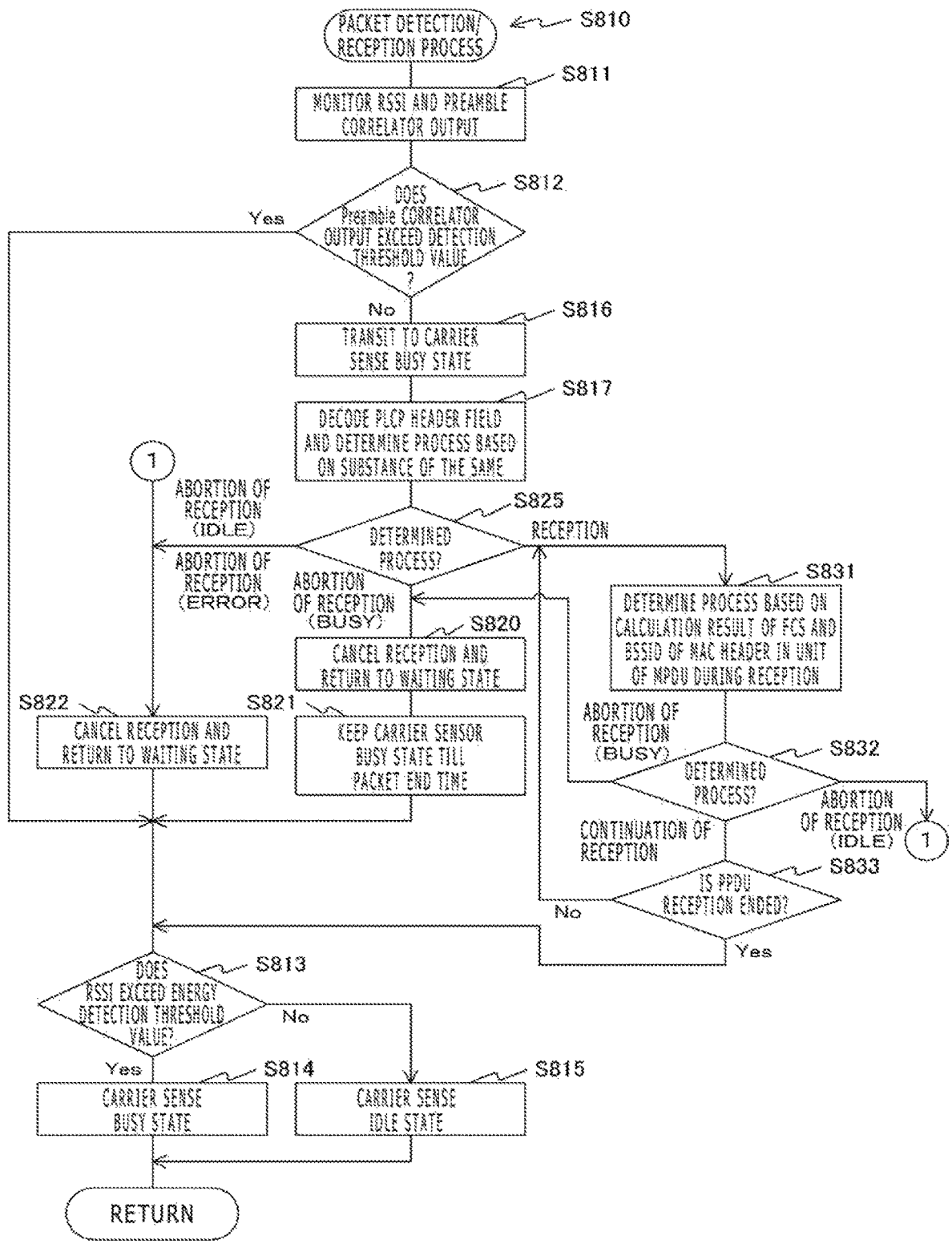
FIG. 30 is a flow chart illustrating a packet detection/reception decision process from within a transmission and reception process by the information processing apparatus (AP) 100 in the seventh embodiment of the present technology.

FIG. 30 is a flow chart depicting a packet detection/reception decision process (processing procedure at step S810 depicted in FIG. 3) within the transmission and reception processes by the information processing apparatus (AP) 100 in the seventh embodiment of the present technology. It is to be noted that, since FIG. 30 is a modification to part of FIG. 7, portions common to those in FIG. 7 are denoted by like reference characters and description of them is omitted. However, it is assumed that, in FIG. 30, the first process classification table depicted in a of FIG. 29 is used in place of the process classification table depicted in FIG. 6.

Further, in the packet detection/reception decision process depicted in FIG. 30, an example of the packet detection/reception decision process that permits also an extended CCA operation that utilizes a MAC header is depicted.

The control unit 130 of the information processing apparatus (AP) 100 collates read out information and the first process classification table depicted in a of FIG. 29 to determine a subsequent process (step S825).

If "reception" is selected as the subsequent process (step S825), then the control unit 130 of the information processing apparatus (AP) 100 collates the information in the MAC header being received and the second process classification table depicted in b of FIG. 29 to determine a subsequent process (step S831). In particular, the control unit 130 of the information processing apparatus (AP) 100 determines a subsequent process on the basis of a result of calculation of the FCS and the BSSID of the MAC header in a unit of an MPDU during reception (step S831).

In particular, the control unit 130 of the information processing apparatus (AP) 100 calculates a CRC for the FCS of the MAC header and confirms presence or absence of an error in a calculation result of the CRC for the FCS of the MAC header. Here, if the calculation result of the CRC for the FCS of the MAC header has an error, then the subsequent process is determined as "continuation of reception" as depicted in b of FIG. 29. On the other hand, if the calculation result of the CRC for the FCS of the MAC header does not have an error, then a process is determined on the basis of individual substances of the extended CCA threshold value and the BSSID in the MAC header.

In particular, if the value of the BSSID in the MAC header is equal to the value of the BSS to which the own apparatus belongs, then the subsequent process is determined as "continuation of reception."

On the other hand, if the value of the BSSID in the MAC header is different from that of the BSS to which the own apparatus belongs, then the subsequent process is determined as "abortion of reception." In this case, it is decided whether the correlator output strength (value of the Preamble correlator output) is lower than or else equal to or higher than the extended CCA threshold value. Then, if the correlator output strength is lower than the extended CCA threshold value, then the subsequent process is determined as "abortion of reception (IDLE)." On the other hand, if the correlator output strength is equal to or higher than the extended CCA threshold value, then the subsequent process is determined as "abortion of reception (BUSY)." It is to be noted that the value to be compared with the extended CCA threshold value may be a different index representative of a strength of the reception signal.

In this manner, the control unit 130 of the information processing apparatus (AP) 100 determines, as the subsequent process, one of "continuation of reception," "abortion of reception (IDLE)" and "abortion of reception (BUSY)" (step S831).

If "continuation of reception" is determined as the subsequent process (step S832), then the control unit 130 of the information processing apparatus (AP) 100 decides whether or not reception of the PPDU is ended (step S833). Then, if reception of the PPDU is not ended (step S833), then the processing returns to step 831. On the other hand, if reception of the PPDU is ended (step S833), then the processing advances to step S813.

On the other hand, if "abortion of reception (IDLE)" is determined as the subsequent process (step S832), then the processing advances to step S822. However, if "abortion of reception (BUSY)" is determined as the subsequent process (step S832), then the processing advances to step S820.

On the other hand, if "abortion of reception (IDLE)" is determined as the subsequent process, then the control unit 130 may make dealing with the backoff counter different from an ordinary decrementing process. Usually, while the carrier sense is in a busy state, the value of the backoff counter is kept, and after the carrier sense transits to the idle state, decrementing is resumed from the value. Therefore, for example, the dealing with the value with which decrementing is resumed can be changed in the following manner.

For example, the control unit 130 converts the reception time from transition to busy upon detection of the preamble of a packet to a point of time at which abortion of reception is decided into a number of time slots and subtracts the number of time slots from the value of the backoff counter, and then can start later decrementing using the value obtained by the subtraction as a restart value. In short, when the control unit 130 performs abortion of reception and renders the later carrier sense into an idle state by an extended CCS, it equivalently deals that, also within the time until abortion of reception is performed, the carrier sense has been idle retroactively. This example is depicted in FIG. 31.

[Example of Virtual Subtraction Process of Backoff Counter]

Figure 31:
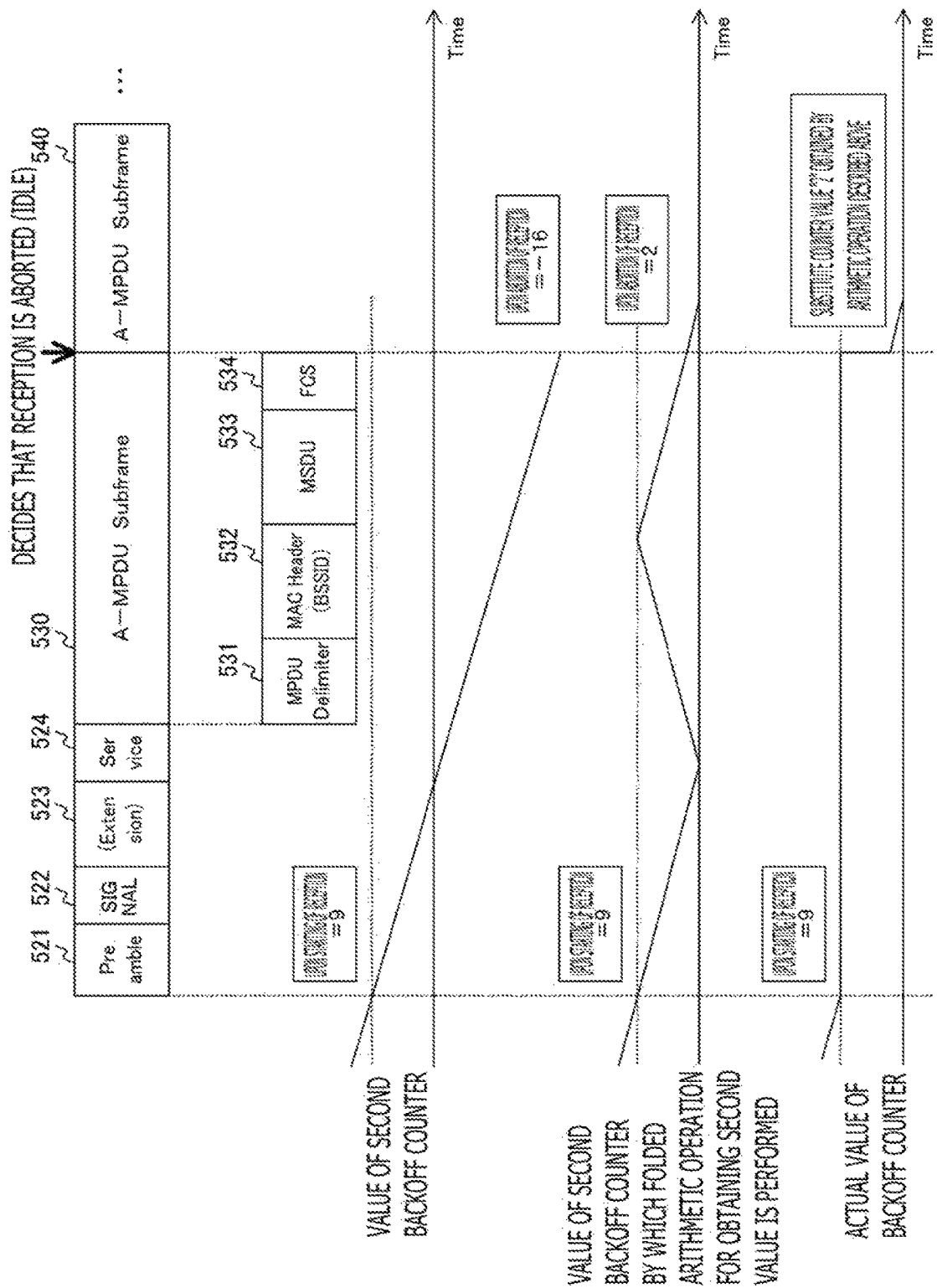
FIG. 31 is a view schematically depicting an example of a virtual subtraction process of a backoff counter by the information processing apparatus (AP) 100 in the seventh embodiment of the present technology.

FIG. 31 is a view schematically depicting an example of a virtual subtraction process of the backoff counter by the information processing apparatus (AP) 100 in the seventh embodiment of the present technology. It is to be noted that a frame depicted at the upper side in FIG. 31 (at the left side in the figure) corresponds to the frame depicted in a of FIG. 28. Further, in FIG. 31, a second backoff counter is defined in order to facilitate description.

In FIG. 31, an example is depicted in which the control unit 130 decides abortion of reception (IDLE) at the point of time of reception of FCS 534 of A-MPDU Subframe 530 at the top. In this case, if it is assumed that the control unit 130 transits to a busy state at the top of the preamble, then it substitutes the value of the backoff counter at the pint of time into the second backoff counter to convert the time from the top of the preamble to the abortion of reception into a number of time slots and then decrements the backoff counter by the number. Then, the value of the second backoff counter at the point of time of the abortion of reception is substituted into the backoff counter. Consequently, the backoff counter at the point of time of the abortion of reception becomes a value smaller than that in an ordinary operation, and the media access can be performed more efficiently. It is to be noted that, when abortion of reception (BUSY) is decided, the value of the second backoff counter is not substituted.

Here, the value of the second backoff counter sometimes becomes equal to or lower than 0 at the point of time of the abortion of reception as indicated at the upper stage in FIG. 31 (at the uppermost stage on the three time axes). In such a case as just described, the control unit 130 can set the value of the backoff counter to one of first to third values given below.

As the first value, the control unit 130 can set the value of the backoff counter to 0. In this case, after the channel state transits to the idle state, transmission is performed assuming that there is no waiting time by backoff.

As the second value, the control unit 130 can set the value of the backoff counter to a value between the value before decrementing and 0. In particular, when the channel state becomes a busy state, decrementing of the value of the second backoff counter is started, and when the value of the second backoff counter becomes 0, incrementing is started now. Then, when the value of the second backoff counter reaches the value upon starting of the decrementing, then decrementing is started again. While the channel state is a busy state, the control unit 130 sets the value of the backoff counter to a value obtained by repeating the processes described above.

For example, it is assumed that the value of the second backoff counter is 9 upon starting of reception as indicated at the stage of the value of the second backoff counter in FIG. 31. In this case, as depicted at an intermediate state of FIG. 31 (at a middle stage on the three time axes), the value of the second backoff counter is decremented, after it is set to 9, until 0 is reached, and is incremented, after 0 is reached, until 9 is reached. Thereafter, the value of the second backoff counter is decremented again after 0 is reached, and becomes 2 at the end of the busy state. Then, as depicted at the stage of the actual value of the backoff counter of FIG. 31 (at the lowermost stage among the three time axes), the value of the second backoff counter is set to the value of the backoff counter.

It is to be noted that, at the end of the busy state, the second value is calculated, and the calculated value may be set to the value of the backoff counter. For example, when the value of the second backoff counter is a negative value, the difference from 0 of the second backoff counter value (namely, an absolute value of the second backoff counter value). In this case, if the second backoff counter value is equal to or higher than the value before decrementing, then a value obtained by subtracting the difference from the value before decrementing from the value of the decrementing can be set to the second backoff counter value.

Further, the value of the backoff counter may be set to a value between the value before decrementing of the value of the backoff counter (namely, the initial value of the backoff counter) and 0, or may be set to a value between the value before decrementing of the value of the second backoff counter and 0.

As the third value, the control unit 130 can set the value of the backoff counter to a value between the value before decrementing and 0 by a method different from the setting method of the second value. For example, when a busy state comes to an end, the control unit 130 selects a value at random from among values between a value before decrementing of the backoff counter or the second backoff counter and 0. Then, the control unit 130 can set the selected value to the value of the backoff counter.

Here, after abortion of reception is performed to transit to an idle state, the waiting time for a predetermined period of time may not be provided. For example, the control unit 130 may start decrementing of the value of the backoff counter without providing waiting time by the IFS after the busy state ends. It is to be noted that naturally it cannot be denied that waiting time for a predetermined period of time is provided.

In this manner, the control unit 130 of the information processing apparatus (AP) 100 compares a network identifier added to the header of the data link layer in a packet and a network identifier of a network to which the own apparatus belongs. Then, the control unit 130 of the information processing apparatus (AP) 100 can identify, on the basis of a result of the comparison, a wireless network to which an apparatus from which the packet is transmitted belongs.

It is to be noted that FIG. 30 depicts an example that uses both an extended CCA operation that utilizes a PLCP header and an extended CCA operation that utilizes a MAC header.

However, there is no necessity to use both of the operations, but only a process for decision that utilizes, for example, a MAC header may be performed.

In this manner, according to the seventh embodiment of the present technology, an extended CCA operation can be applied also to a packet of a format in which the PLCP header does not have COLOR information.

It is to be noted that the first to seventh embodiments of the present technology may be partly or entirely combined or changed to make some other forms. For example, as indicated in the fifth and sixth embodiments of the present technology, based on transmission power control, the transmission power may be designated individually by the information processing apparatus (AP) as indicated by the third embodiment of the present technology.

Here, in a random access type wireless system, a technology that improves the wireless utilization efficiency is available. For example, a technology is available by which reception of a packet decided to be transmitted from a BSS different from a BSS to which an own apparatus belongs is aborted and the reception strength of the packet is compared with a certain criterion and then the carrier sense is dealt with as idle on the basis of a result of the comparison.

However, if the decision threshold value is raised, then there is the possibility that the fairness in transmission opportunity may be impaired between an apparatus whose decision threshold value is raised and another apparatus whose decision threshold value remains low.

Therefore, in the embodiment of the present technology, change of the decision threshold value (extended CCA threshold value) and change of a parameter that interlocks with the decision threshold value (wireless transmission parameter) are performed in a set. By this, the utilization efficiency of a wireless resource of the system can be improved while an influence on the fairness in transmission opportunity is suppressed. Further, thereupon, the decision threshold value can be set appropriately on the basis of link quality between the information processing apparatus (AP) and the information processing apparatus (STA). Further, a contrivance by which, even if an information processing apparatus (AP) sets such an invalid set value as may impair the fairness, this can be detected can be provided.

In this manner, according to the embodiment of the present technology, the fairness between different apparatus when an extended CCA operation is carried out can be ensured. Further, interference increase as the entire system when an extended CCA threshold value is carried out can be suppressed. Further, setting of an extended CCA threshold value according to the strength of a link of apparatus can be implemented. Further, testability in detection of setting of rule violation can be ensured.

Further, the information processing apparatus (AP) 100 and the information processing apparatus (STA) 200 in the embodiment of the present technology can be applied to apparatus that are used in various fields. For example, they can be applied to a wireless apparatus used in an automobile (for example, a car navigation system and a smartphone). Further, they can be applied, for example, to vehicle-to-vehicle communication and road-to-vehicle communication (V2X (vehicle to X)). Further, for example, they can be applied to a learning apparatus (for example, a tablet apparatus) used in the education field. Further, they can be applied, for example, to wireless apparatus used, for example, in the agriculture field (for example, a terminal of a cattle management system). Similarly, they can be applied to wireless apparatus used, for example, in the sports field, medical field and so forth.

<8. Applications>

The technology according to the present disclosure can be applied to various products. For example, the technology may be implemented as a mobile terminal such as a smartphone, a tablet PC (Personal Computer), a notebook PC, a portable game terminal or a digital camera, a fixed terminal such as a television receiver, a printer, a digital scanner or a network storage, or an automotive terminal such as a car navigation system. Further, the technology may be implemented as a terminal (also called MTC (Machine Type Communication) terminal) that performs M2M (Machine To Machine) communication such as an information processing apparatus (AP) 100, an information processing apparatus (STA) 200, a smart meter, a vending machine, a remote monitoring device or a POS (Point Of Sale) terminal. Furthermore, the information processing apparatus (AP) 100 or the information processing apparatus (STA) 200 may be a wireless communication module (for example, an integrated circuit module configured from one die) incorporated in such terminals as described above.

Meanwhile, the information processing apparatus (AP) 100 may be implemented as a wireless LAN access point (also called wireless base station) that has a router function or does not have a router function. Further, the information processing apparatus (AP) 100 may be implemented as a mobile wireless LAN router. Furthermore, the information processing apparatus (AP) 100 may be a wireless communication module incorporated in those apparatus (for example, an integrated circuit module configured from one die).

8-1. First Application Example

Figure 32:
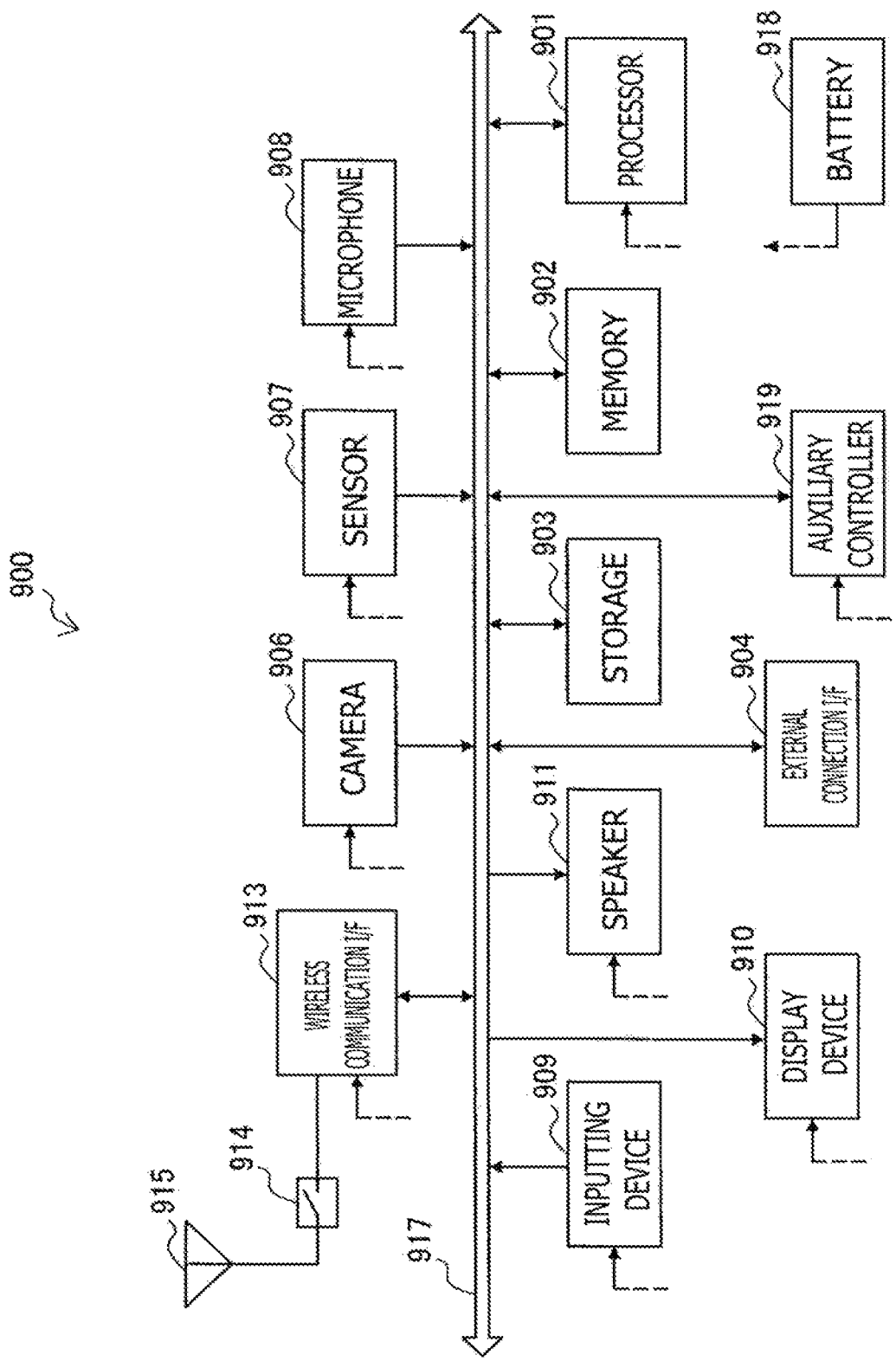
FIG. 32 is a block diagram depicting an example of a general configuration of a smartphone.

FIG. 32 is a block diagram depicting an example of a schematic configuration of a smartphone 900 to which the technology according to the present disclosure can be applied. The smartphone 900 includes a processor 901, a memory 902, a storage 903, an external connection interface 904, a camera 906, a sensor 907, a microphone 908, an inputting device 909, a display device 910, a speaker 911, a wireless communication interface 913, an antenna switch 914, an antenna 915, a bus 917, a battery 918 and an auxiliary controller 919.

The processor 901 may be, for example, a CPU (Central Processing Unit) or an SoC (System on Chip) and controls functions of the application layer and other layers of the smartphone 900. The memory 902 includes a RAM (Random Access Memory) and a ROM (Read Only Memory) and stores programs to be executed by the processor 901 and data. The storage 903 may include a storage medium such as a semiconductor memory or a hard disk. The external connection interface 904 is an interface for connecting an external device such as a memory card or a USB (Universal Serial Bus) device to the smartphone 900.

The camera 906 has an image pickup element such as a CCD (Charge Coupled Device) element or a CMOS (Complementary Metal Oxide Semiconductor) element and generates a picked up image. The sensor 907 can include a sensor group such as, for example, a position measurement sensor, a gyro sensor, a geomagnetic sensor and an acceleration sensor. The microphone 908 converts sound inputted to the smartphone 900 into a sound signal. The inputting device 909 includes, for example, a touch sensor that detects a touch with a screen of the display device 910, a keypad, a keyboard, a button, a switch and so forth and accepts an operation or an information input from a user. The display device 910 has a screen of a liquid crystal display (LCD) unit, an organic light emitting diode (OLED) display unit or the like and displays an output image of the smartphone 900. The speaker 911 converts a sound signal outputted from the smartphone 900 into sound.

The wireless communication interface 913 supports one or more of wireless LAN standards such as IEEE802.11a, 11b, 11g, 11n, 11ac and 11ad and executes wireless communication. The wireless communication interface 913 can communicate, in an infrastructure mode, with another apparatus through a wireless LAN access point. Further, in a direct communication mode such as the ad hoc mode or the Wi-Fi Direct mode, the wireless communication interface 913 can communicate directly with another apparatus. It is to be noted that, while, in Wi-Fi Direct, different from the ad hoc mode, although one of two terminals operates as an access point, communication is performed directly with each other between them. Typically, the wireless communication interface 913 can include a baseband processor, an RF (Radio Frequency) circuit, a power amplifier and so forth. The wireless communication interface 913 may be a one-chip module in which a memory in which a communication controlling program is stored, a processor that executes the program and related circuits are integrated. The wireless communication interface 913 may support, in addition to a wireless LAN method, a wireless communication method of any other type such as a short-range wireless communication method, a close proximity wireless communication method or a cellular communication method. The antenna switch 914 switches the connection destination of the antenna 915 among a plurality of circuits included in the wireless communication interface 913 (for example, circuits for different wireless communication methods). The antenna 915 has a single or a plurality of antenna elements (for example, a plurality of antenna elements configuring a MIMO antenna) and is used for transmission and reception of a wireless signal by the wireless communication interface 913.

It is to be noted that the smartphone 900 is not limited to the example of FIG. 32 and may include a plurality of antennae (for example, an antenna for a wireless LAN, an antenna for a close proximity wireless communication method or the like). In this case, the antenna switch 914 may be omitted from the configuration of the smartphone 900.

The bus 917 connects the processor 901, memory 902, storage 903, external connection interface 904, camera 906, sensor 907, microphone 908, inputting device 909, display device 910, speaker 911, wireless communication interface 913 and auxiliary controller 919 to each other. The battery 918 supplies power to the blocks of the smartphone 900 depicted in FIG. 32 through feed lines partially indicated by broken lines in FIG. 32. The auxiliary controller 919 causes, for example, in a sleep mode, minimum required functions of the smartphone 900 to operate.

In the smartphone 900 depicted in FIG. 32, the control unit 130 described with reference to FIG. 2 may be incorporated in the wireless communication interface 913. Further, at least some of the functions may be incorporated in the processor 901 or the auxiliary controller 919.

It is to be noted that the smartphone 900 may operate as a wireless access point (software AP) by execution of an access point function on the application level by the processor 901. Also, the wireless communication interface 913 may have a wireless access point function.

8-2. Second Application Example

Figure 33:
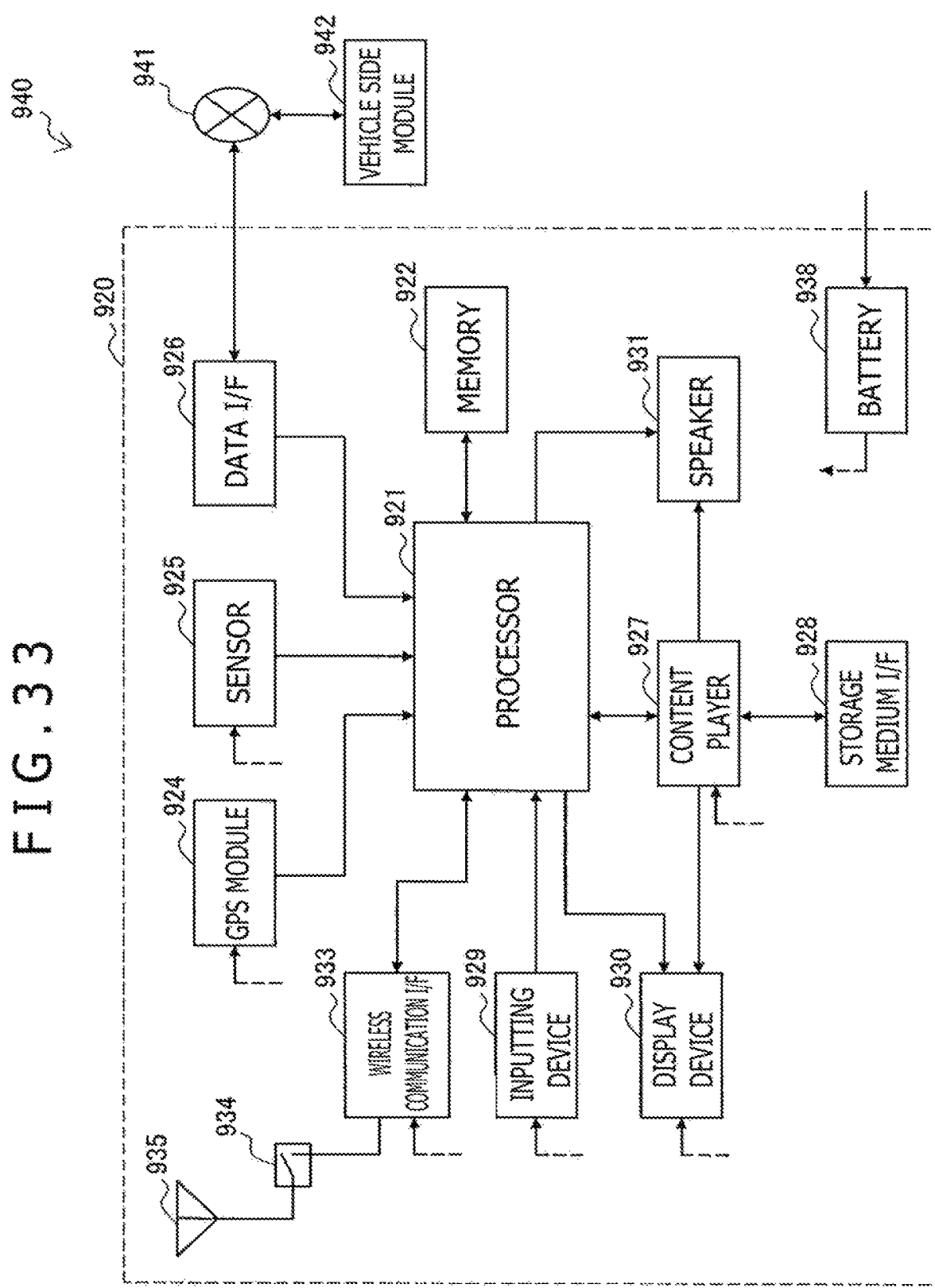
FIG. 33 is a block diagram depicting an example of a general configuration of a car navigation system.

FIG. 33 is a block diagram depicting an example of a schematic configuration of a car navigation system 920 to which the technology according to the present disclosure can be applied. The car navigation system 920 includes a processor 921, a memory 922, a GPS (Global Positioning System) module 924, a sensor 925, a data interface 926, a content player 927, a storage medium interface 928, an inputting device 929, a display device 930, a speaker 931, a wireless communication interface 933, an antenna switch 934, an antenna 935 and a battery 938.

The processor 921 may be, for example, a CPU or an SoC and controls the navigation function and other functions of the car navigation system 920. The memory 922 includes a RAM and a ROM and stores programs to be executed by the processor 921 and data.

The GPS module 924 measures the position (for example, latitude, longitude and height) of the car navigation system 920 using GPS signals received from GPS satellites. The sensor 925 can include a sensor group such as, for example, a gyro sensor, a geomagnetic sensor and an atmospheric pressure sensor. The data interface 926 is connected to an in-vehicle network 941, for example, through a terminal not depicted and acquires data generated by the vehicle side such as vehicle speed data.

The content player 927 reproduces a content stored in a storage medium (for example, a CD or a DVD) inserted in the storage medium interface 928. The inputting device 929 includes a touch sensor that detects a touch, for example, with a screen of the display device 930, a button, a switch and so forth and accepts an operation from a user or an information input. The display device 930 has a screen of an LCD unit, an OLED display unit or the like and displays an image of a navigation function or a reproduced content. The speaker 931 outputs sound of the navigation function or sound of a reproduced content.

The wireless communication interface 933 supports one or more of wireless LAN standards such as IEEE802.11a, 11b, 11g, 11n, 11ac and 11ad and executes wireless communication. The wireless communication interface 933 can communicate, in an infrastructure mode, with another apparatus through a wireless LAN access point. Further, in a direct communication mode such as the ad hoc mode or the Wi-Fi Direct mode, the wireless communication interface 933 can communicate directly with another apparatus. Typically, the wireless communication interface 933 can include a baseband processor, an RF circuit, a power amplifier and so forth. The wireless communication interface 933 may be a one-chip module in which a memory in which a communication controlling program is stored, a processor that executes the program and related circuits are integrated. The wireless communication interface 933 may support, in addition to a wireless LAN method, a wireless communication method of any other type such as a short-range wireless communication method, a close proximity wireless communication method or a cellular communication method. The antenna switch 934 switches the connection destination of the antenna 935 among a plurality of circuits included in the wireless communication interface 933. The antenna 935 has a single or a plurality of antenna elements and is used for transmission and reception of a wireless signal by the wireless communication interface 933.

It is to be noted that the car navigation system 920 is not limited to the example of FIG. 33 and may include a plurality of antennae. In this case, the antenna switch 934 may be omitted from the configuration of the car navigation system 920.

The battery 938 supplies power to the blocks of the car navigation system 920 depicted in FIG. 33 through feed lines partially indicated by broken lines in FIG. 33. Further, the battery 938 accumulates electric power supplied from the vehicle side.

In the car navigation system 920 depicted in FIG. 33, the control unit 130 described with reference to FIG. 2 may be incorporated in the wireless communication interface 933. Further, at least some of the functions may be incorporated in the processor 921.

Further, the wireless communication interface 933 may operate as the information processing apparatus (AP) 100 described hereinabove and provide wireless connection to a terminal had by a user who is on the vehicle.

Further, the technology according to the present disclosure may be implemented as an in-vehicle system (or vehicle) 940 including one or more of the blocks of the car navigation system 920 described hereinabove, the in-vehicle network 941 and a vehicle side module 942. The vehicle side module 942 generates vehicle side data such as a vehicle speed, an engine speed or failure information and outputs the generated data to the in-vehicle network 941.

8-3. Third Application

Figure 34:
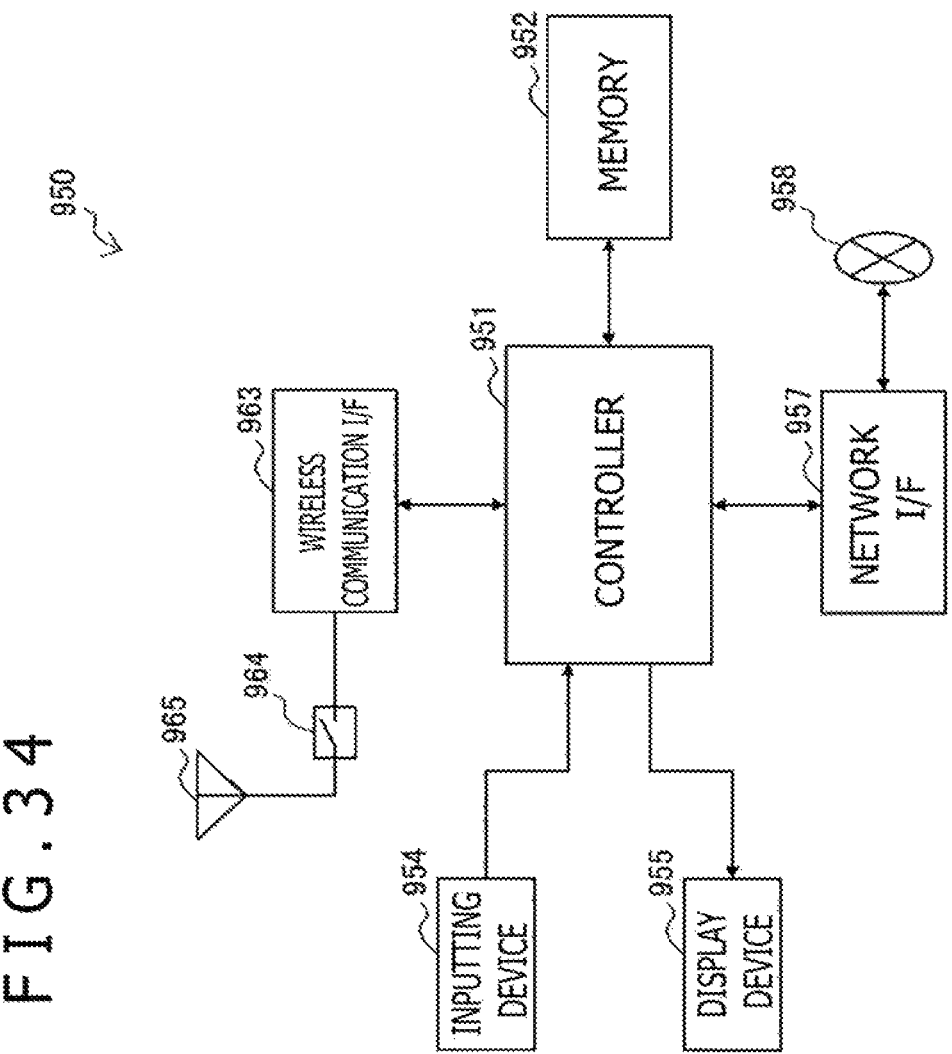
FIG. 34 is a block diagram depicting an example of a general configuration of a wireless access point.

FIG. 34 is a block diagram depicting an example of a schematic configuration of a wireless access point 950 to which the technology according to the present disclosure can be applied. The wireless access point 950 includes a controller 951, a memory 952, an inputting device 954, a display device 955, a network interface 957, a wireless communication network 963, an antenna switch 964 and an antenna 965.

The controller 951 may be, for example, a CPU or a DSP (Digital Signal Processor) and controls various functions of the IP (Internet Protocol) layer of the wireless access point 950 and upper layers (for example, functions for access limitation, routing, encryption, firewall, log management and so forth). The memory 952 includes a RAM and a ROM and stores programs to be executed by the controller 951 and various control data (for example, a terminal list, a routing table, an encryption key, security setting, a log and so forth).

The inputting device 954 includes, for example, a button, a switch or the like and accepts an operation from a user. The display device 955 includes an LED lamp or the like and displays an operation status of the wireless access point 950.

The network interface 957 is a wired communication interface for allowing the wireless access point 950 to connect to a wired communication network 958. The network interface 957 may have a plurality of connection terminals. The wired communication network 958 may be a LAN such as the Ethernet (registered trademark) or may be a WAN (Wide Area Network).

The wireless communication network 963 supports one or more of wireless LAN standards such as IEEE802.11a, 11b, 11g, 11n, 11ac and 11ad and serves as an access point to neighboring terminals to provide wireless connection. The wireless communication network 963 can typically include a baseband processor, an RF circuit, a power amplifier and so forth. The wireless communication network 963 may be a one-chip module in which a memory in which a communication controlling program is stored, a processor that executes the program and related circuits are integrated. The antenna switch 964 switches the connection destination of the antenna 965 among a plurality of circuits included in the wireless communication network 963. The antenna 965 has a single or a plurality of antenna elements and is used for transmission and reception of a wireless signal by the wireless communication network 963.

In the wireless access point 950 depicted in FIG. 34, the control unit 130 described with reference to FIG. 2 may be incorporated in the wireless communication network 963. Further, at least some of the functions may be incorporated in the controller 951.

It is to be noted that the embodiments described above indicate an example for embodying the present technology, and matters in the embodiments and matters to define the invention in the claims individually have a corresponding relationship. Similarly, matters to define the invention in the claims and matters in the embodiments of the present technology having same designations applied thereto individually have a corresponding relationship. However, the present technology is not limited to the embodiments and can be embodied by modifying the embodiment in various manners without departing from the subject matter of the present technology.

Further, any of the processing procedures described hereinabove in connection with the above-described embodiments may be grasped as a method having the series of procedures and may be grasped as a program for causing a computer to execute the series of procedures or as a recording medium in which the program is stored. As the recording medium, for example, a CD (Compact Disc), an MD (Mini Disc), a DVD (Digital Versatile Disc), a memory card, a blue ray disc (Blu-ray (registered trademark) Disc) and so forth can be used.

It is to be noted that the advantageous effects described herein are exemplary to the last and are not restrictive, and other advantages may be available.

It is to be noted that the present technology can take the following configurations.

(1)

An information processing apparatus, including:

a control unit that aborts, when a packet decided to be transmitted from a second network different from a first network to which the own apparatus belongs is detected, reception of the packet and deals with carrier sense as an idle state based on a reception strength of the packet.

(2)

The information processing apparatus according to (1) above, in which the control unit performs control for dealing with the carrier sense as an idle state based on a result of comparison between the reception strength of the packet and a first threshold value.

(3)

The information processing apparatus according to (1) or (2) above, in which the control unit identifies the second network to which an apparatus from which the packet is transmitted belongs based on a network identifier added to a header of a physical layer of the packet.

(4)

The information processing apparatus according to (3) above, in which the control unit identifies the second network based on a result of comparison between the network identifier added to the header of the physical layer of the packet and a network identifier of the first network.

(5)

The information processing apparatus according to (2) or (3) above, in which the control unit identifies the second network based on a result of comparison between a network identifier added to a header of a data link layer of the packet and a network identifier of the first network.

(6)

The information processing apparatus according to (2), in which the control unit performs control for transmitting information for specifying a set of first information used by a different apparatus belonging to the first network and used for determination of the first threshold value and a wireless transmission parameter that interlocks with the first information to the different apparatus.

(7)

The information processing apparatus according to (6), in which the control unit performs control for transmitting, as the first information, one of information for specifying the first threshold value and information for designating a range within which the first threshold value is to be changed by the different apparatus by which a reference frame is received based on a ratio between the information for specifying the first threshold value and a reception strength of the reference frame.

(8)

The information processing apparatus according to (6) or (7) above, in which the wireless transmission parameter is at least one of transmission power, transmission fixed waiting time, carrier sense random waiting time, a maximum frame time length, a usable channel bandwidth and a usable channel frequency.

(9)

The information processing apparatus according to any one of (1) to (8) above, in which the control unit performs control for changing, when a frame transmitted from a different apparatus belonging to the first network and destined for the own apparatus includes information regarding transmission power of the frame, transmission power for a reception response of the frame based on the information regarding the transmission power and transmitting the reception response.

(10)

The information processing apparatus according to (9) above, in which the reference frame is a beacon transmitted from an apparatus belonging to the first network.

(11)

The information processing apparatus according to any one of (6) to (8) above, in which the information processing apparatus shares information for specifying the set of the first information and the wireless transmission parameter with at least one of a different apparatus belonging to the first network and a different apparatus belonging to the second network.

(12)

The information processing apparatus according to any one of (2), (6) to (8) and (11) above, in which the control unit changes the first threshold value and performs control for transmitting data based on a wireless transmission parameter changed in response to the first threshold value after changed.

(13)

The information processing apparatus according to (12) above, in which the control unit changes the wireless transmission parameter in an interlocking relationship with the first threshold value.

(14)

The information processing apparatus according to any one of (2), (6) to (8) and (11) to (13) above, in which the control unit changes the first threshold value based on information included in a frame transmitted from a different apparatus belonging to the first network.

(15)

The information processing apparatus according to (14) above, in which the control unit performs control for changing the first threshold value based on a margin value included in the frame and a reception strength of the frame.

(16)

The information processing apparatus according to (15) above, in which the control unit performs control for changing the first threshold value within a range determined based on the margin value and the reception strength.

(17)

The information processing apparatus according to (12) above, in which the control unit performs control for determining the wireless transmission parameter based on information included in a frame transmitted from a different apparatus belonging to the first network and a changing amount of the first threshold value from a reference value.

(18)

The information processing apparatus according to any one of (12) to (17) above, in which the wireless transmission parameter is a parameter for setting transmission power, and the control unit performs, when the wireless transmission parameter is to be changed, control for including information regarding transmission power to be set with the wireless transmission parameter after changed into a frame to be transmitted to an apparatus belonging to the first network.

(19)

The information processing apparatus according to (17) above, in which the frame is a beacon transmitted from an apparatus belonging to the first network.

(20)

An information processing method, including:

a first procedure for aborting, when a packet decided to be transmitted from a second network different from a first network to which an own apparatus belongs is detected, reception of the packet; and a second procedure for dealing with carrier sense as an idle state based on a reception strength of the packet.

REFERENCE SIGNS LIST

10 Communication system
100 Information processing apparatus (AP)
110 Communication unit
111 Antenna
120 Storage unit
130 Control unit
200, 250 Information processing apparatus (STA)
210 Communication unit
230 Control unit
900 Smartphone
901 Processor
902 Memory
903 Storage
904 External connection interface
906 Camera
907 Sensor
908 Microphone
909 Inputting device
910 Display device
911 Speaker
913 Wireless communication interface
914 Antenna switch
915 Antenna
917 Bus
918 Battery
919 Auxiliary controller
920 Car navigation system
921 Processor
922 Memory
924 GPS module
925 Sensor
926 Data interface
927 Content player
928 Storage medium interface
929 Inputting device 930 Display device
931 Speaker
933 Wireless communication interface
934 Antenna switch
935 Antenna
938 Battery
941 Vehicle network
942 Vehicle side module
950 Wireless access point
951 Controller
952 Memory
954 Inputting device
955 Display device
957 Network interface
958 Wired communication network
963 Wireless communication interface
964 Antenna switch
965 Antenna

The invention claimed is:

1. An information processing apparatus, comprising circuitry configured to:
abort reception of a packet and deal with carrier sense as an idle state based on a reception strength of the packet when the packet decided to be transmitted from a second network different from a first network to which the information processing apparatus belongs is detected based on a COLOR information in the physical header of the packet,
wherein the circuitry controls dealing with the carrier sense as an idle state based on a result of comparison between reception of the packet and a first threshold value, and
continues with the reception of the packet when the packet is decided by the circuitry to be from the first network, wherein
the circuitry controls dealing with the carrier sense based on the result of comparison between the reception strength of the packet and the first threshold value, and
the circuitry is configured to change the first threshold value based on information included in a frame transmitted from a different apparatus belonging to the first network.

2. The information processing apparatus according to claim 1, wherein the circuitry identifies the second network to which an apparatus from which the packet is transmitted belongs based on a network identifier added to a header of a physical layer of the packet.

3. The information processing apparatus according to claim 2, wherein the circuitry identifies the second network based on a result of comparison between the network identifier added to the header of the physical layer of the packet and a network identifier of the first network.

4. The information processing apparatus according to claim 1, wherein the circuitry identifies the second network based on a result of comparison between a network identifier added to a header of a data link layer of the packet and a network identifier of the first network.

5. The information processing apparatus according to claim 1, wherein the circuitry controls transmitting information for specifying a set of first information used by a different apparatus belonging to the first network and used for determination of the first threshold value and a wireless transmission parameter that interlocks with the first information to the different apparatus.

6. The information processing apparatus according to claim 5, wherein the circuitry controls transmitting, as the first information, one of information for specifying the first threshold value and information for designating a range within which the first threshold value is to be changed by the different apparatus by which a reference frame is received based on a ratio between the information for specifying the first threshold value and a reception strength of the reference frame.

7. The information processing apparatus according to claim 5, wherein the wireless transmission parameter is at least one of transmission power, transmission fixed waiting time, carrier sense random waiting time, a maximum frame time length, a usable channel bandwidth and a usable channel frequency.

8. The information processing apparatus according to claim 1, wherein the circuitry is configured to change, when a frame transmitted from a different apparatus belonging to the first network and destined for the own apparatus includes information regarding transmission power of the frame, transmission power for a reception response of the frame based on the information regarding the transmission power and transmitting the reception response.

9. The information processing apparatus according to claim 8, wherein the reference frame is a beacon transmitted from an apparatus belonging to the first network.

10. The information processing apparatus according to claim 5, wherein the information processing apparatus shares information for specifying the set of the first information and the wireless transmission parameter with at least one of a different apparatus belonging to the first network and a different apparatus belonging to the second network.

11. The information processing apparatus according to claim 1, wherein the circuitry is configured to change the first threshold value and control transmission of data based on a wireless transmission parameter changed in response to the first threshold value after changed.

12. The information processing apparatus according to claim 11, wherein the circuitry is configured to change the wireless transmission parameter in an interlocking relationship with the first threshold value.

13. The information processing apparatus according to claim 1, wherein the circuitry is configured to change the first threshold value based on a margin value included in the frame and a reception strength of the frame.

14. The information processing apparatus according to claim 13, wherein the circuitry is configured to change the first threshold value within a range determined based on the margin value and the reception strength.

15. The information processing apparatus according to claim 11, wherein the circuitry is configured to determine the wireless transmission parameter based on information included in a frame transmitted from a different apparatus belonging to the first network and a changing amount of the first threshold value from a reference value.

16. The information processing apparatus according to claim 11, wherein
the wireless transmission parameter is a parameter for setting transmission power, and
the circuitry is configured to include information, when the wireless transmission parameter is to be changed, regarding transmission power to be set with the wireless transmission parameter after changed into a frame to be transmitted to an apparatus belonging to the first network.

17. The information processing apparatus according to claim 15, wherein the frame is a beacon transmitted from an apparatus belonging to the first network.

18. An information processing method, comprising:

aborting reception of a packet when the packet decided to be transmitted from a second network different from a first network to which the information processing apparatus belongs is detected based on a COLOR information in the physical header of the packet; and dealing with carrier sense as an idle state based on a reception strength of the packet and a result of comparison between reception of the packet and a first threshold value;

continuing with the reception of the packet when the packet is decided by circuitry to be from the first network;

using circuitry to deal with the carrier sense based on the result of comparison between the reception strength of the packet and the first threshold value, and changing with the circuitry the first threshold value based on information included in a frame transmitted from a different apparatus belonging to the first network.

* * * * *